US012353501B1

United States Patent
Omheni et al.

(10) Patent No.: US 12,353,501 B1
(45) Date of Patent: Jul. 8, 2025

(54) DISTRIBUTED NONLINEAR SUPPORT VECTOR MACHINES

(71) Applicant: SAS Institute Inc., Cary, NC (US)

(72) Inventors: Riadh Omheni, Raleigh, NC (US); Joshua David Griffin, Harrisburg, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/918,265

(22) Filed: Oct. 17, 2024

Related U.S. Application Data

(60) Provisional application No. 63/661,346, filed on Jun. 18, 2024.

(51) Int. Cl.
  *G06F 17/12* (2006.01)
  *G06F 17/16* (2006.01)

(52) U.S. Cl.
  CPC .............. *G06F 17/12* (2013.01); *G06F 17/16* (2013.01)

(58) Field of Classification Search
  CPC ................................. G06F 17/12; G06F 17/16
  USPC ....................................................... 706/12
  See application file for complete search history.

(56) References Cited

U.S. PATENT DOCUMENTS

| | | | |
|---|---|---|---|
| 10,360,517 B2 | 7/2019 | Koch | |
| 11,269,974 B1* | 3/2022 | Chaudhuri | G06Q 30/0241 |
| 2008/0201281 A1* | 8/2008 | Graf | G06N 20/10 |
| | | | 706/12 |
| 2019/0080253 A1 | 3/2019 | Lokare | |
| 2022/0124543 A1* | 4/2022 | Orhan | G06N 3/006 |

OTHER PUBLICATIONS

Kim, et al., "A distributed support vector machine learning over wireless sensor networks", IEEE Transactions on Cybernetics, vol. 45, No. 11, Nov. 2015 (Year: 2015).*
Doostmohammadian, et al., "Distributed support vector machines over dynamic balanced directed networks", IEEE Control systems letters, vol. 6, 2022 (Year: 2022).*
Huang, Xiaolin, et al. "Indefinite kernels in least squares support vector machines and principal component analysis." Applied and Computational Harmonic Analysis 43.1 (2017): 162-172.

(Continued)

*Primary Examiner* — Tsu-Chang Lee
(74) *Attorney, Agent, or Firm* — Bell & Manning, LLC

(57) ABSTRACT

A system and method include dividing training data into training data blocks, determining a support vector subset, distributing the training data blocks and the support vector subset to worker machines, receiving a first set of sub-results from worker machines, combining the first set of sub-results, solving a linear system, distributing a first set of variables to worker machines, receiving a second set of sub-results from worker machines, selecting a step size value and sending the selected step size value to worker machines, receiving updated values of the first set of variables and second set of variables from worker machines, receiving a maximum residual error value from worker machines, selecting a maximum value of the maximum residual error values, responsive to determining that selected maximum value satisfies an optimality condition, outputting a weight value and a bias value, and predicting a label using the weight value and the bias value.

30 Claims, 45 Drawing Sheets

(56) References Cited

OTHER PUBLICATIONS

Lee, Yuh-Jye and Olvi L. Mangasarian, RSVM: Reduced Support Vector Machines, pp. 1-17. 2010.

Xiao, Han, Kashif Rasul, and Roland Vollgraf. "Fashion-mnist: a novel image dataset for benchmarking machine learning algorithms." arXiv preprint arXiv:1708.07747 (2017).

Zhang, Kai, et al. "Scaling up kernel SVM on limited resources: A low-rank linearization approach." Artificial intelligence and statistics. PMLR, 2012. pp. 1425-1434.

Djuric, Nemanja, et al. "Budgetedsvm: A toolbox for scalable svm approximations." The Journal of Machine Learning Research 14.1 (2013): 3813-3817.

SAS Visual Analytics Programming Guide. Simple Analytics Action Set: Syntax. topK Action. SAS Help Center. https://documentation.sas.com/doc/en/pgmsascdc/v_055/casanpg/cas-simple-topk.htm.

cjlin1/libsvm. Github.com. Accessed Jun. 18, 2024. https://github.com/cjlin1/libsvm/blob/master/matlab/svmtrain.c.

Madeng, Nirmala. Predictive Modeling. Medium.com. Jan. 9, 2021. https://nirmala1.medium.com/predictive-modeling-cb5e82a7edd1.

SAS Institute Inc. 2016. SAS® Viya™ Data Mining and Machine Learning: Procedures Guide. Cary, NC: SAS Institute Inc.

Murray, Shani. UCI Machine Learning Repository to Receive $1.8 Million Upgrade. Oct. 25, 2019. https://ics.uci.edu/2019/10/25/uci-machine-learning-repository-to-receive-1-8-million-upgrade/.

Moser, Jeff. Allstate Insurance Company. Allstate claim prediction challenge. Kaggle, 2011.

Chih-Chung Chang and Chih-Jen Lin. LIBSVM: A library for support vector machines. ACM Trans. Intell. Syst. Technol., 2(3), May 2011.

Cortes, Corinna and Vapnik, Vladimir. Support-Vector Networks, Machine Learning, 20, 273-297 (1995).

\* cited by examiner

| Datasets | Training Size | Testing Size | # Features | # Classes |
|---|---|---|---|---|
| 2300 → adult | 19,537 | 16,231 | 14 | 2 |
| 2305 → fashion Mnist | 60,000 | 10,000 | 784 | 2 |
| 2310 → covtype | 464,810 | 116,202 | 54 | 2 |
| 2315 → suzy | 4,500,000 | 500,000 | 18 | 2 |
| 2320 → higgs | 10,500,000 | 500,000 | 28 | 2 |
| 2325 → allstate | 12,184,290 | 1,000,000 | 33 | 2 |

FIG. 23

DISTRIBUTED NONLINEAR SUPPORT VECTOR MACHINES

CROSS-REFERENCE TO RELATED APPLICATIONS

This application is a non-provisional of U.S. provisional application No. 63/661,346, filed on Jun. 18, 2024, the entirety of which is incorporated by reference herein.

BACKGROUND

Support Vector Machines (SVMs) are supervised machine learning algorithms that may be used for a variety of purposes such as classification, regression, and outlier detection. The main objective of an SVM is to find an optimal hyperplane or decision boundary in an N-dimensional space to separate data points into different classes. SVMs may be linear or non-linear. A linear SVM uses a linear decision boundary to separate data points into different classes. All data points that fall on one side of the linear decision boundary fall under one class while all data points that fall on the other side of the linear decision boundary fall under another class. A linear SVM is suitable when the data points are able to be precisely separated by a linear decision boundary. However, in most real-world applications, a linear decision boundary is not possible. In such cases, a non-linear SVM may be used. A non-linear SVM uses kernel functions to map data into a higher dimension where a linear decision boundary may become possible. However, existing non-linear SVM are inadequate for large scale data sets.

SUMMARY

In accordance with at least some aspects of the present disclosure, a non-transitory computer-readable medium having first computer-readable instructions stored thereon is disclosed. The first computer-readable instructions when executed by a first processor of a main machine of a non-linear support vector machine cause the first processor to: (A) receive training data comprising a first plurality of observation vectors; (B) divide the training data into P training data blocks, wherein P is a number of a plurality of worker machines operatively associated with the main machine to perform distributed computing, and wherein each of the P training blocks comprises a second plurality of observation vectors; (C) determine a support vector subset from the training data, wherein the support vector subset comprises a third plurality of observation vectors; (D) distribute (1) each of the P training data blocks to one of the plurality of worker machines; and (2) the support vector subset to each of the plurality of worker machines; (E) compute a first kernel matrix from the third plurality of observation vectors based on a kernel function; (F) receive a first set of sub-results from each of the plurality of worker machines; (G) combine the first set of sub-results to obtain an intermediary matrix, a vector value, a first scalar value, a second scalar value, and a weight residual value; (H) solve a linear system based on the first kernel matrix, the intermediary matrix, the vector value, the first scalar value, the second scalar value, and the weight residual value to compute values of a first set of variables; (I) distribute the values of the first set of variables and the first scalar value to each of the plurality of worker machines; (J) receive a second set of sub-results from each of the plurality of worker machines, wherein the second set of sub-results from each of the plurality of worker machines comprises values a step size value that is computed based on a second set of variables computed at each of the plurality of worker machines; (K) select one step size value from all of the step size values received in the second set of sub-results; (L) send the selected step size value to each of the plurality of worker machines; (M) receive updated values of the first set of variables and updated values of the second set of variables computed by each of the plurality of worker machines based on the values of the first set of variables in (H), the values of the second set of variables in (J), and the selected step size value in (K); (N) receive a maximum residual error value computed by each of the plurality of worker machines based on the first kernel matrix, the updated values of the first set of variables, and the updated values of the second set of variables; (O) select a maximum value from all of the maximum residual error values received from the plurality of worker machines; (P) responsive to determining that selected maximum value satisfies an optimality condition, execute (Q) or responsive to determining that the selected maximum value does not satisfy the optimality condition, distribute the updated values of the first set of variables and the updated values of the second set of variables to each of the plurality of worker machines and repeat (F)-(P); (Q) output a weight value and a bias value from the updated values of the first set of variables and the updated values of the second set of variables in (M); and (R) predict a label of each of a fourth plurality of observation vectors included in test data using the weight value and the bias value to classify the fourth plurality of observation vectors.

In accordance with at least some other aspects of the present disclosure, a system is disclosed. The system includes a first memory having first computer-readable instructions stored thereon and a first processor of a main machine of a non-linear support vector machine that executes the first computer-readable instructions to: (A) receive training data comprising a first plurality of observation vectors; (B) divide the training data into P training data blocks, wherein P is a number of a plurality of worker machines operatively associated with the main machine to perform distributed computing, and wherein each of the P training blocks comprises a second plurality of observation vectors; (C) determine a support vector subset from the training data, wherein the support vector subset comprises a third plurality of observation vectors; (D) distribute (1) each of the P training data blocks to one of the plurality of worker machines; and (2) the support vector subset to each of the plurality of worker machines; (E) compute a first kernel matrix from the third plurality of observation vectors based on a kernel function; (F) receive a first set of sub-results from each of the plurality of worker machines; (G) combine the first set of sub-results to obtain an intermediary matrix, a vector value, a first scalar value, a second scalar value, and a weight residual value; (H) solve a linear system based on the first kernel matrix, the intermediary matrix, the vector value, the first scalar value, the second scalar value, and the weight residual value to compute values of a first set of variables; (I) distribute the values of the first set of variables and the first scalar value to each of the plurality of worker machines; (J) receive a second set of sub-results from each of the plurality of worker machines, wherein the second set of sub-results from each of the plurality of worker machines comprises values a step size value that is computed based on a second set of variables computed at each of the plurality of worker machines; (K) select one step size value from all of the step size values received in the second set of sub-results; (L) send the selected step size value to each of the plurality of worker machines; (M) receive updated values of the first set of variables and updated values of the second set of variables computed by each of the plurality of worker machines based on the values of the first set of variables in (H), the values of the second set of variables in (J), and the selected step size value in (K); (N) receive a maximum residual error value computed by each of the plurality of worker machines based on the first kernel matrix, the updated values of the first set of variables, and the updated values of the second set of variables; (O) select a maximum value from all of the maximum residual error values received from the plurality of worker machines; (P) responsive to determining that selected maximum value satisfies an optimality condition, execute (Q) or responsive to determining that the selected maximum value does not satisfy the optimality condition, distribute the updated values of the first set of variables and the updated values of the second set of variables to each of the plurality of worker machines and repeat (F)-(P); (Q) output a weight value and a bias value from the updated values of the first set of variables and the updated values of the second set of variables in (M); and (R) predict a label of each of a fourth plurality of observation vectors included in test data using the weight value and the bias value to classify the fourth plurality of observation vectors.

In accordance with at least some other aspects of the present disclosure, a method is disclosed. The method includes (A) receiving, by a first processor of a main machine of a non-linear support vector machine executing first computer-readable instructions stored on a memory, training data comprising a first plurality of observation vectors, (B) dividing, by the first processor, the training data into P training data blocks, wherein P is a number of a plurality of worker machines operatively associated with the main machine to perform distributed computing, and wherein each of the P training blocks comprises a second plurality of observation vectors; (C) determining, by the first processor, a support vector subset from the training data, wherein the support vector subset comprises a third plurality of observation vectors; (D) distributing, by the first processor, (1) each of the P training data blocks to one of the plurality of worker machines; and (2) the support vector subset to each of the plurality of worker machines; (E) computing, by the first processor, a first kernel matrix from the third plurality of observation vectors based on a kernel function; (F) receiving, by the first processor, a first set of sub-results from each of the plurality of worker machines; (G) combining, by the first processor, the first set of sub-results to obtain an intermediary matrix, a vector value, a first scalar value, a second scalar value, and a weight residual value; (H) solving, by the first processor, a linear system based on the first kernel matrix, the intermediary matrix, the vector value, the first scalar value, the second scalar value, and the weight residual value to compute values of a first set of variables; (I) distributing, by the first processor, the values of the first set of variables and the first scalar value to each of the plurality of worker machines; (J) receiving, by the first processor, a second set of sub-results from each of the plurality of worker machines, wherein the second set of sub-results from each of the plurality of worker machines comprises values a step size value that is computed based on a second set of variables computed at each of the plurality of worker machines; (K) selecting, by the first processor, one step size value from all of the step size values received in the second set of sub-results; (L) sending, by the first processor, the selected step size value to each of the plurality of worker machines; (M) receiving, by the first processor, updated values of the first set of variables and updated values of the second set of variables computed by each of the plurality of worker machines based on the values of the first set of variables in (H), the values of the second set of variables in (J), and the selected step size value in (K); (N) receiving, by the first processor, a maximum residual error value computed by each of the plurality of worker machines based on the first kernel matrix, the updated values of the first set of variables, and the updated values of the second set of variables; (O) selecting, by the first processor, a maximum value from all of the maximum residual error values received from the plurality of worker machines; (P) responsive to determining that selected maximum value satisfies an optimality condition, executing, by the first processor, (Q) or responsive to determining that the selected maximum value does not satisfy the optimality condition, distributing, by the first processor, the updated values of the first set of variables and the updated values of the second set of variables to each of the plurality of worker machines and repeat (F)-(P); (Q) outputting, by the first processor, a weight value and a bias value from the updated values of the first set of variables and the updated values of the second set of variables in (M); and (R) predicting, by the first processor, a label of each of a fourth plurality of observation vectors included in test data using the weight value and the bias value to classify the fourth plurality of observation vectors.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 23 illustrates an example table showing details of example datasets used for running example experiments, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
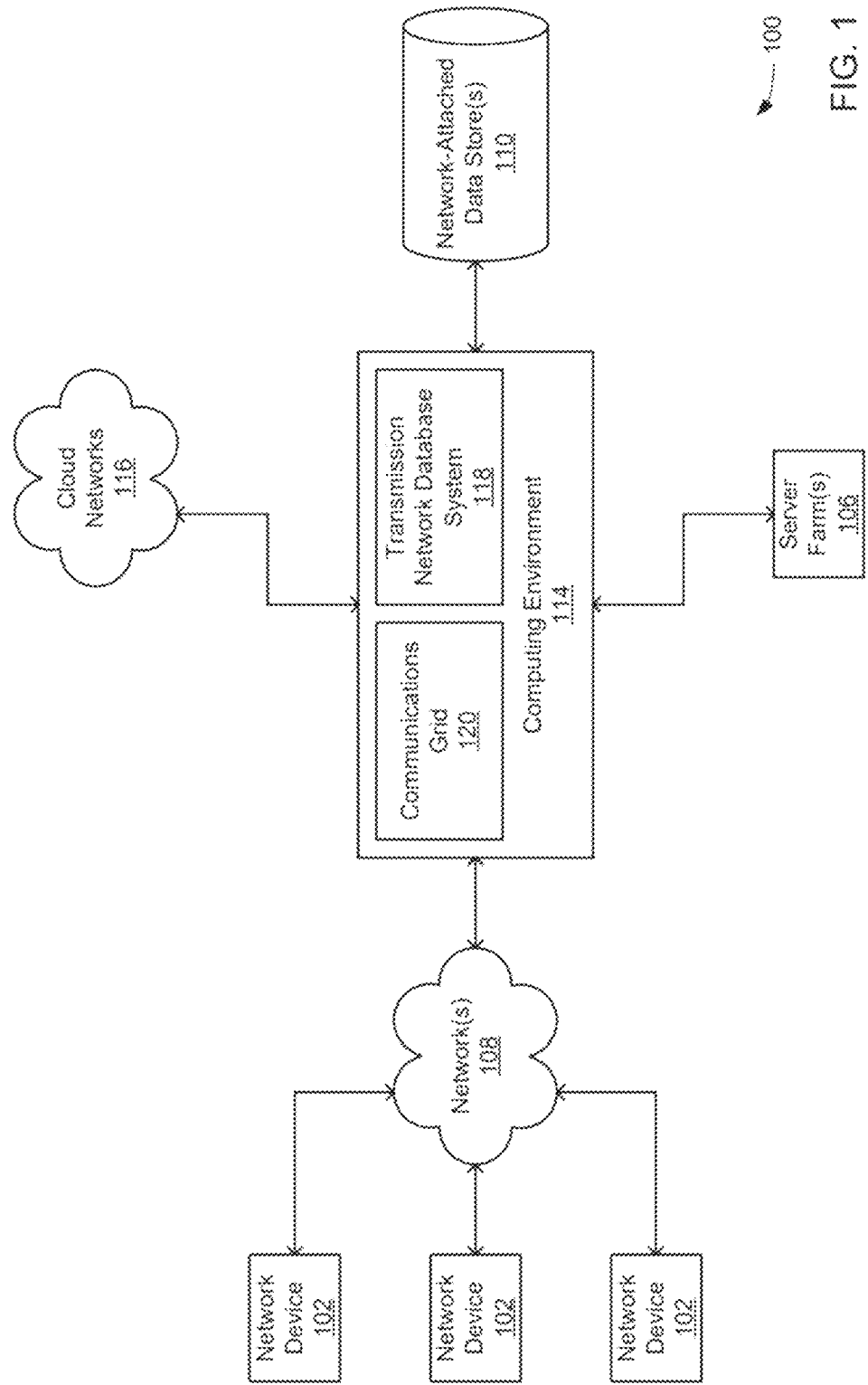
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
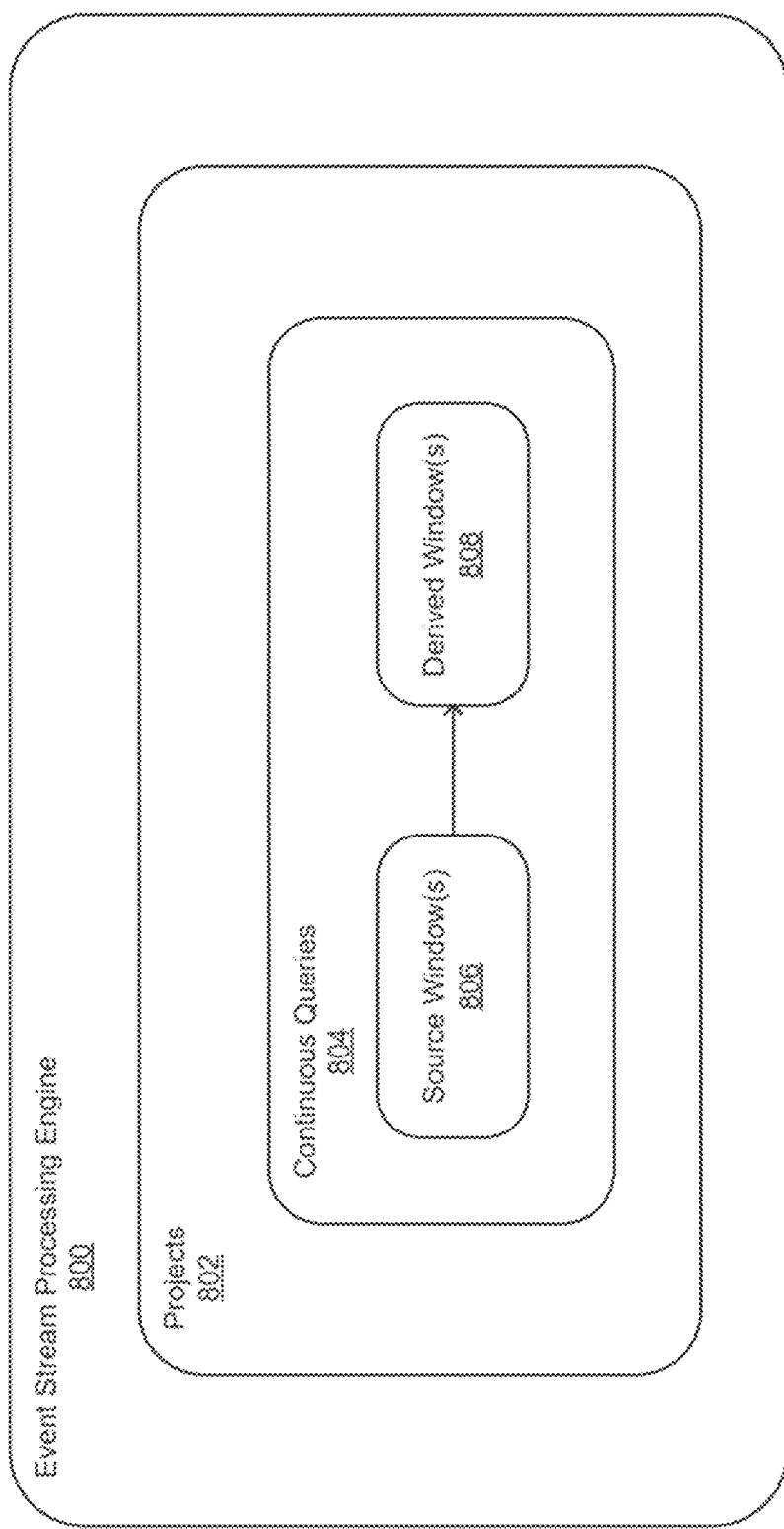
FIG. 8 illustrates a block diagram including components of an Event Stream Processing Engine (ESPE), according to embodiments of the present technology.
Figure 9:
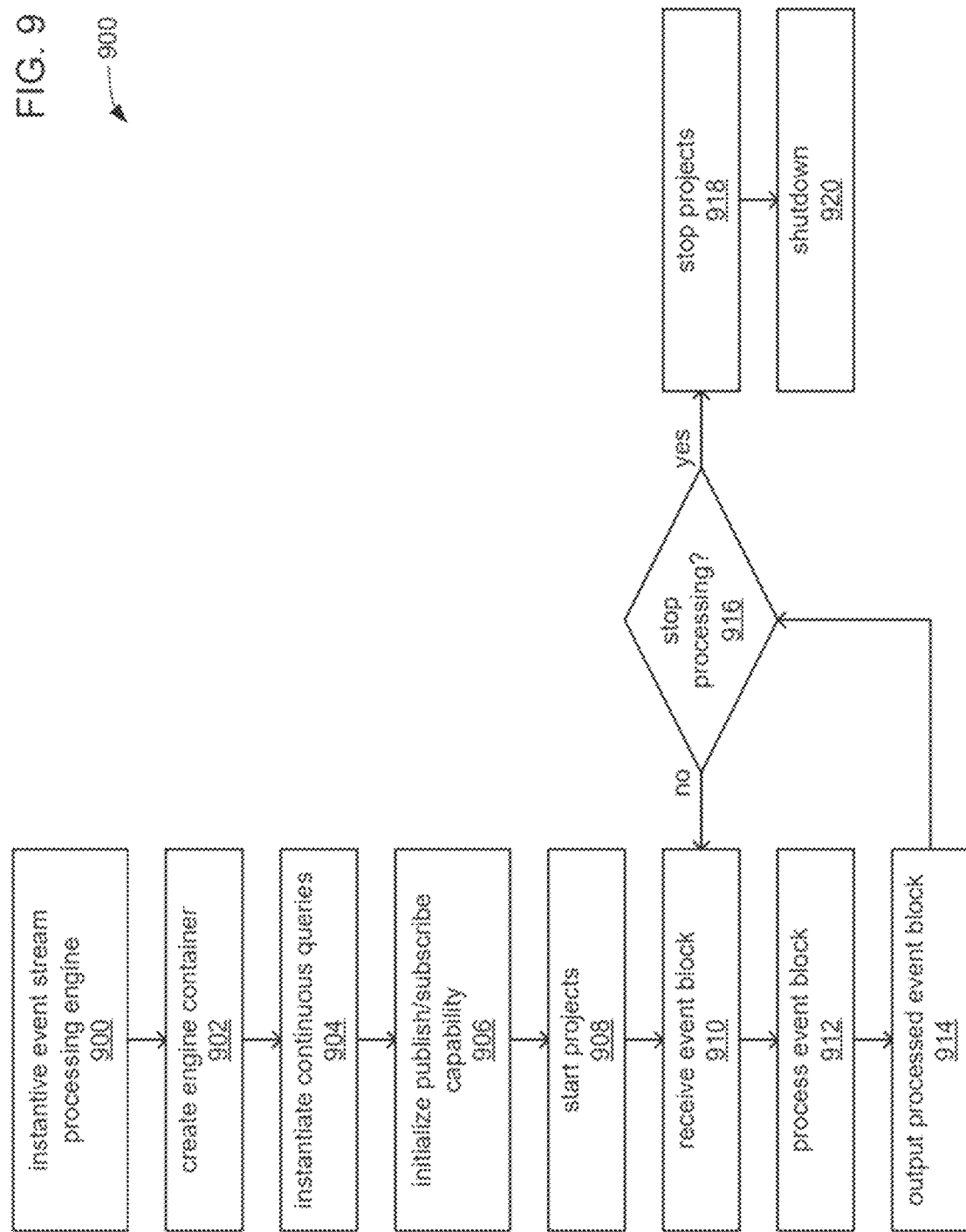
FIG. 9 illustrates a flow chart showing an example process including operations performed by an event stream processing engine, according to some embodiments of the present technology.
Figure 10:
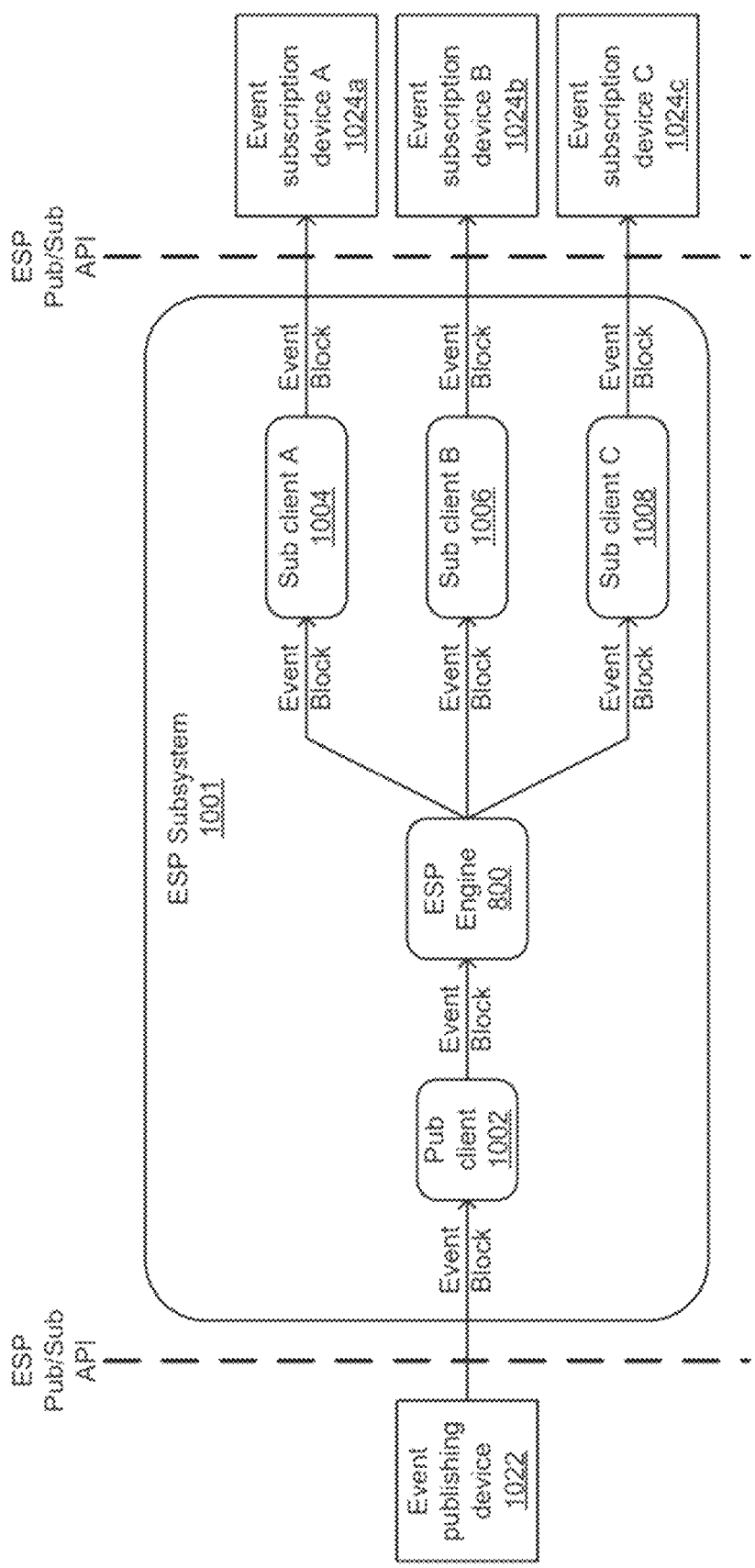
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models)

or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
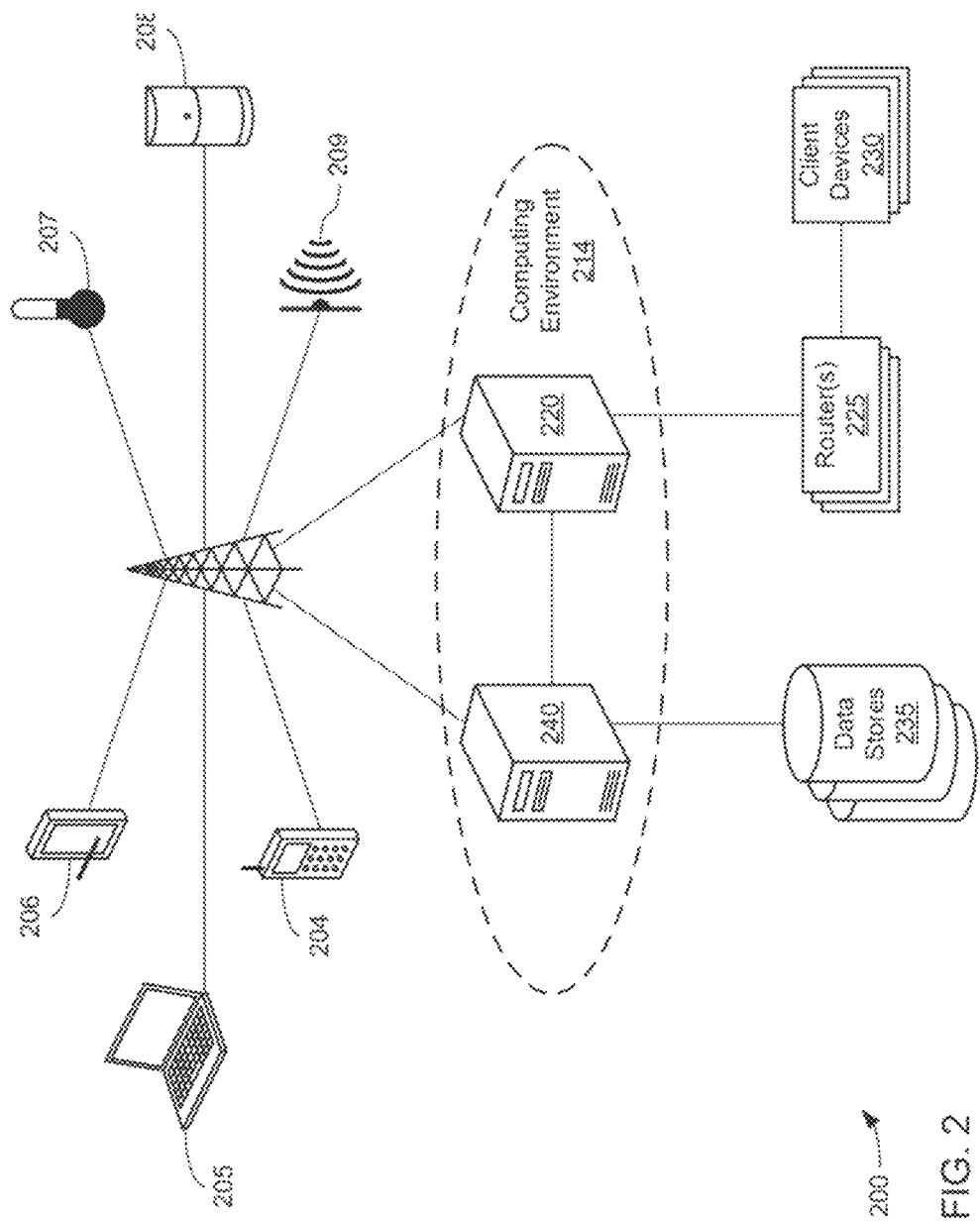
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
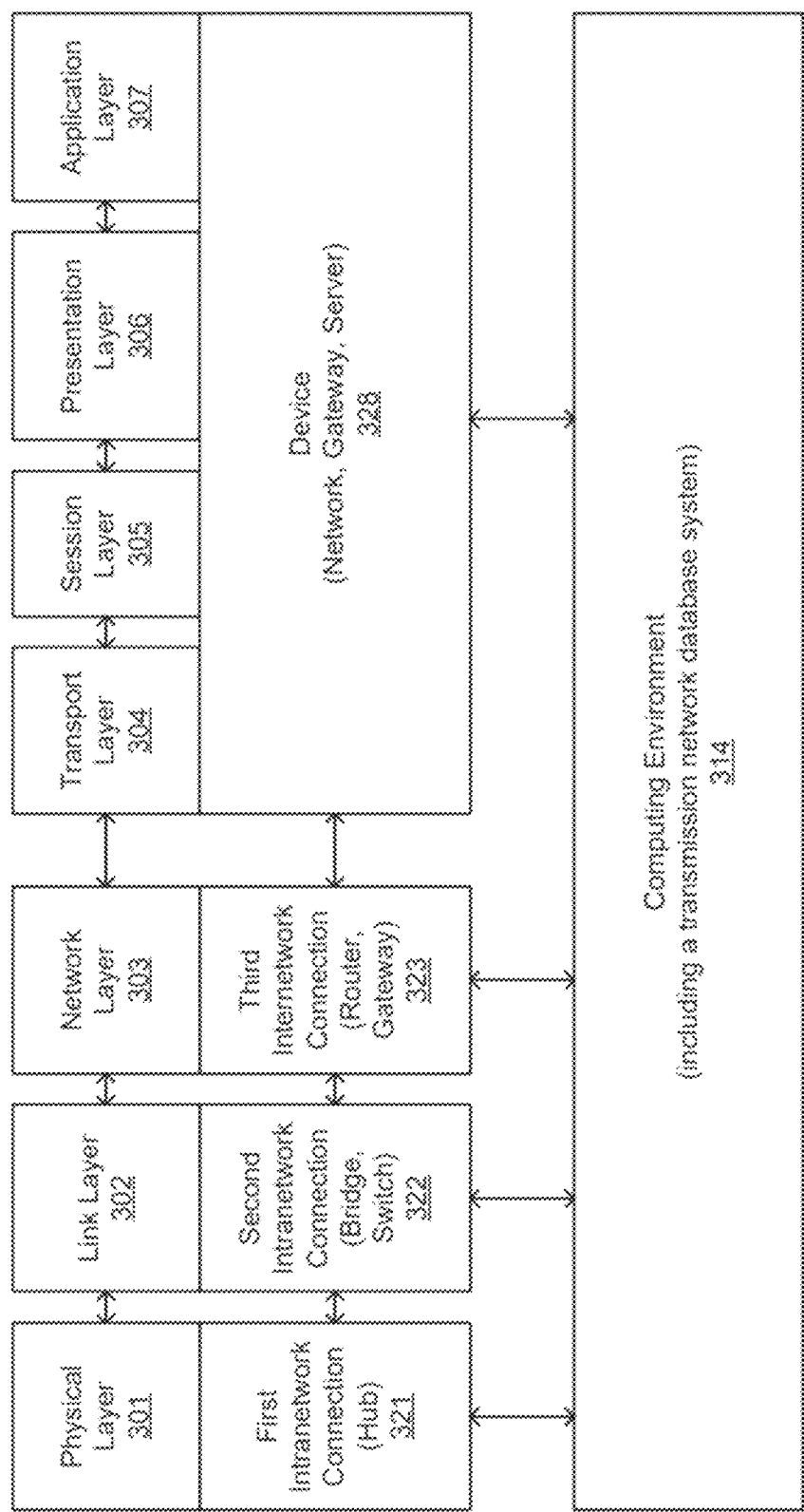
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in the same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
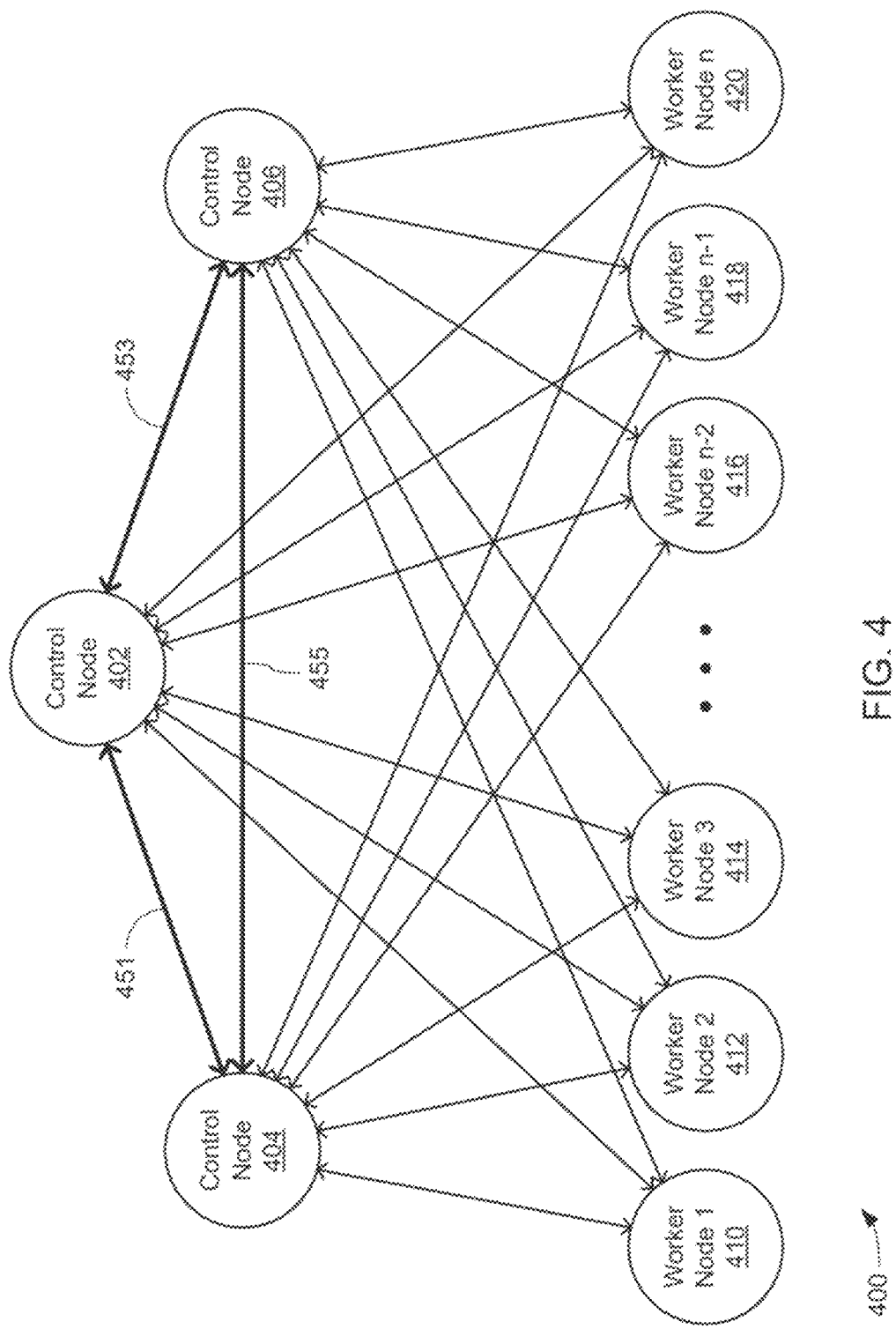
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
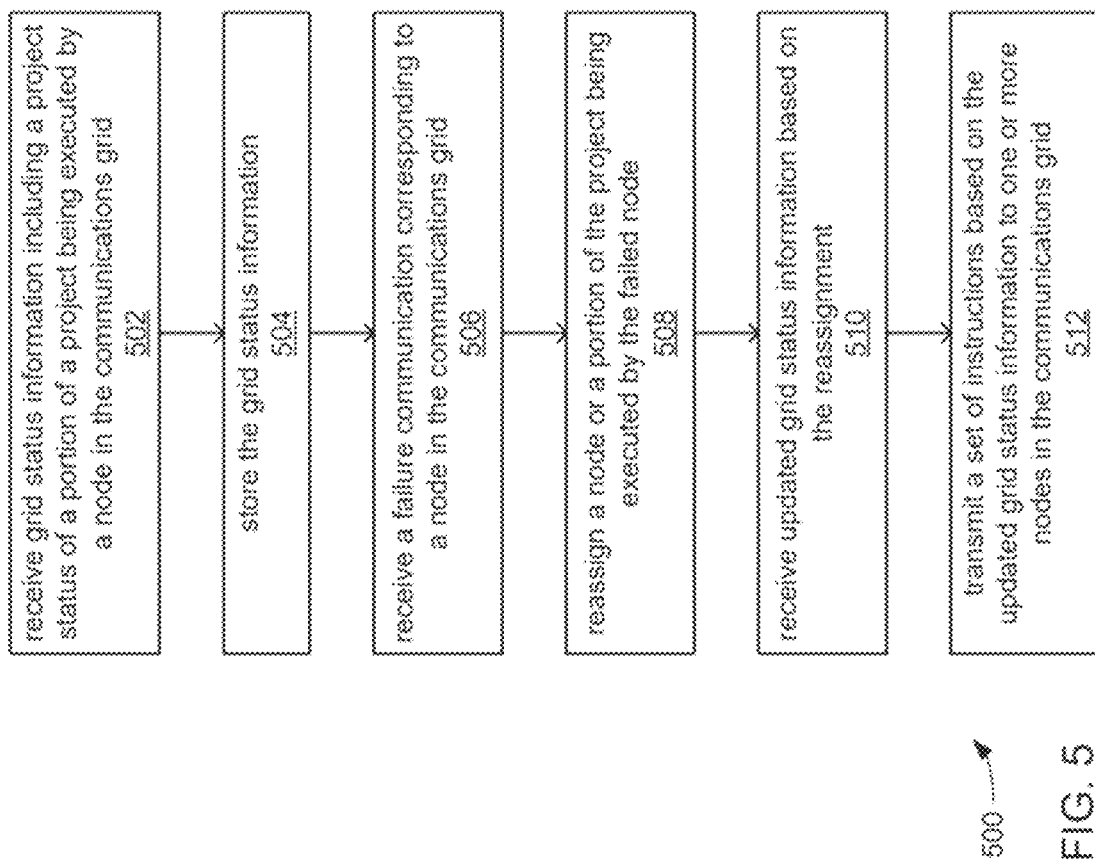
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
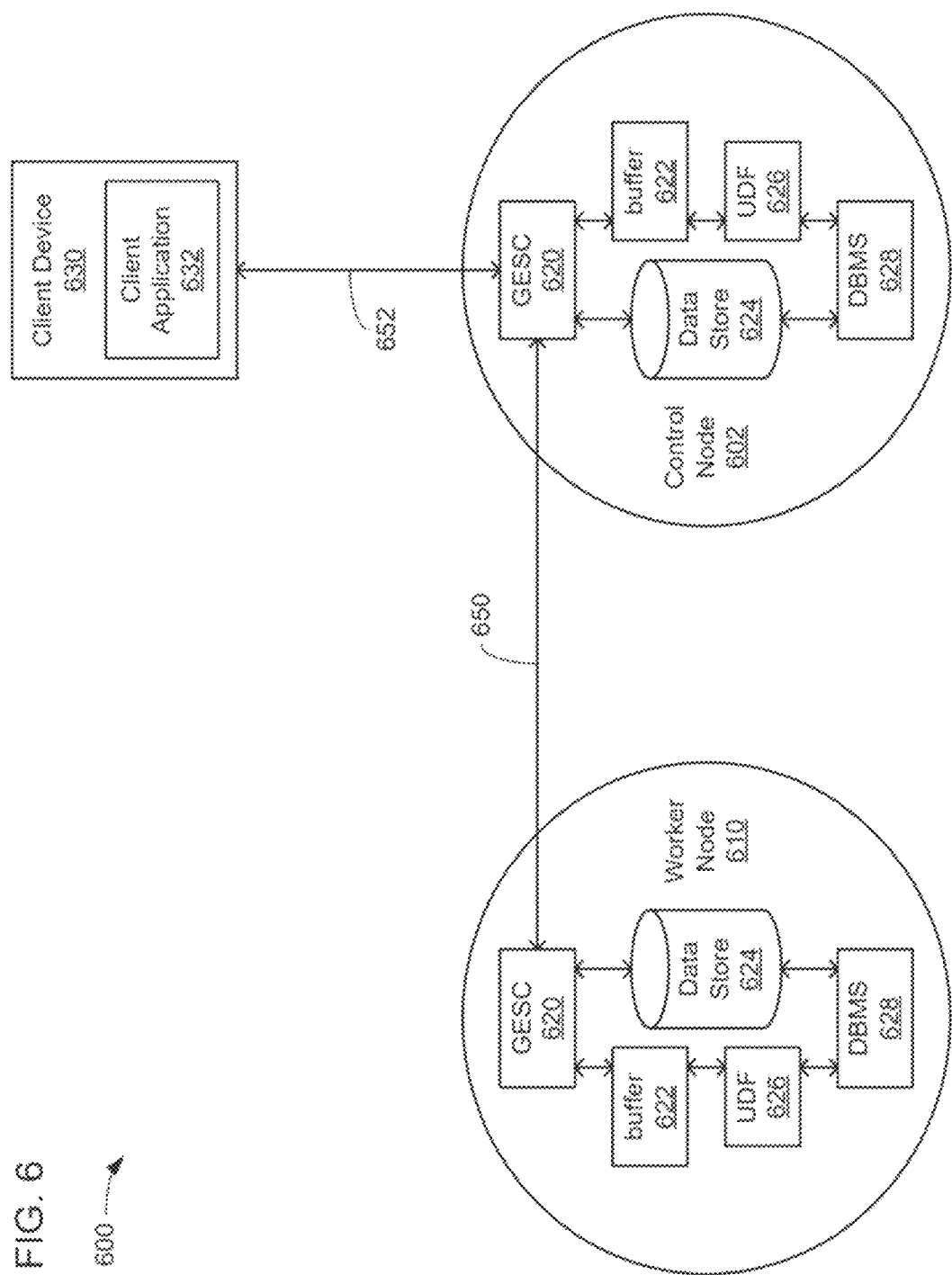
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
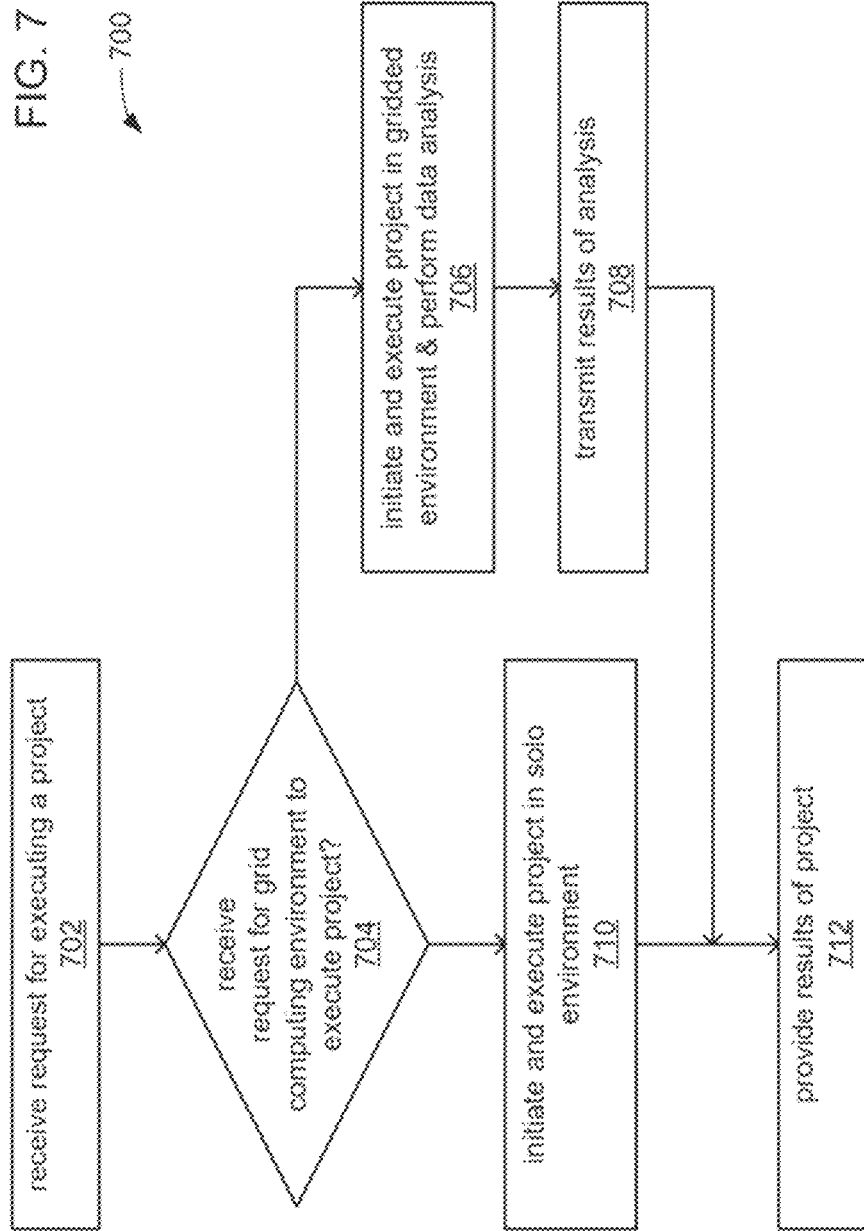
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
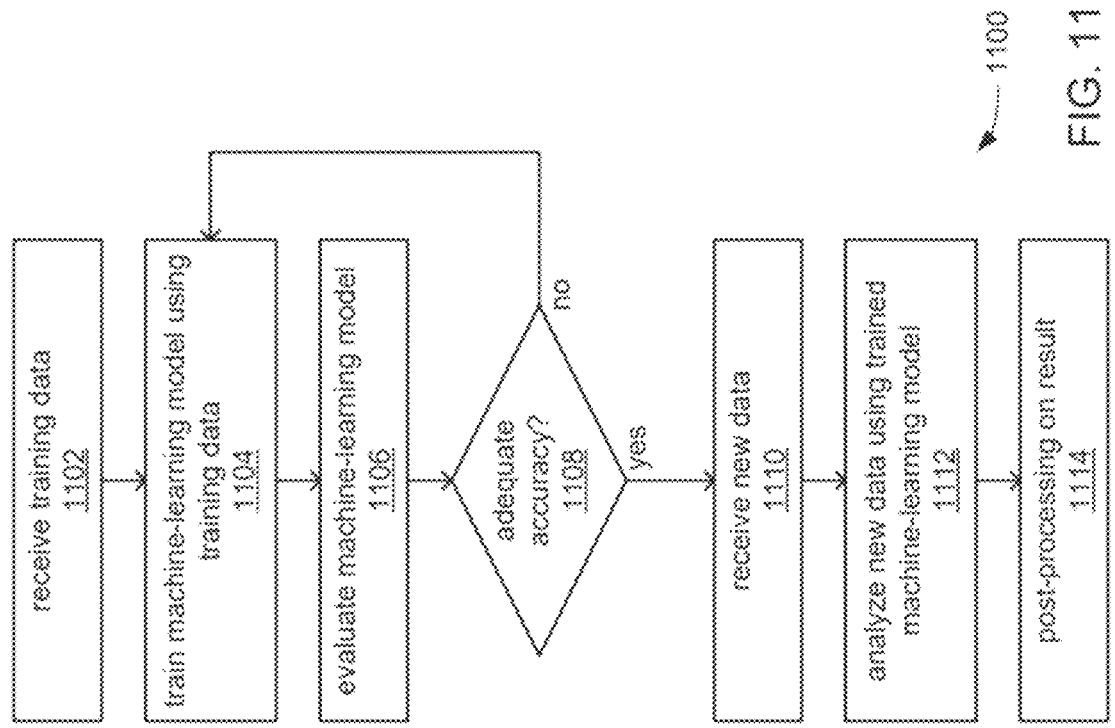
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
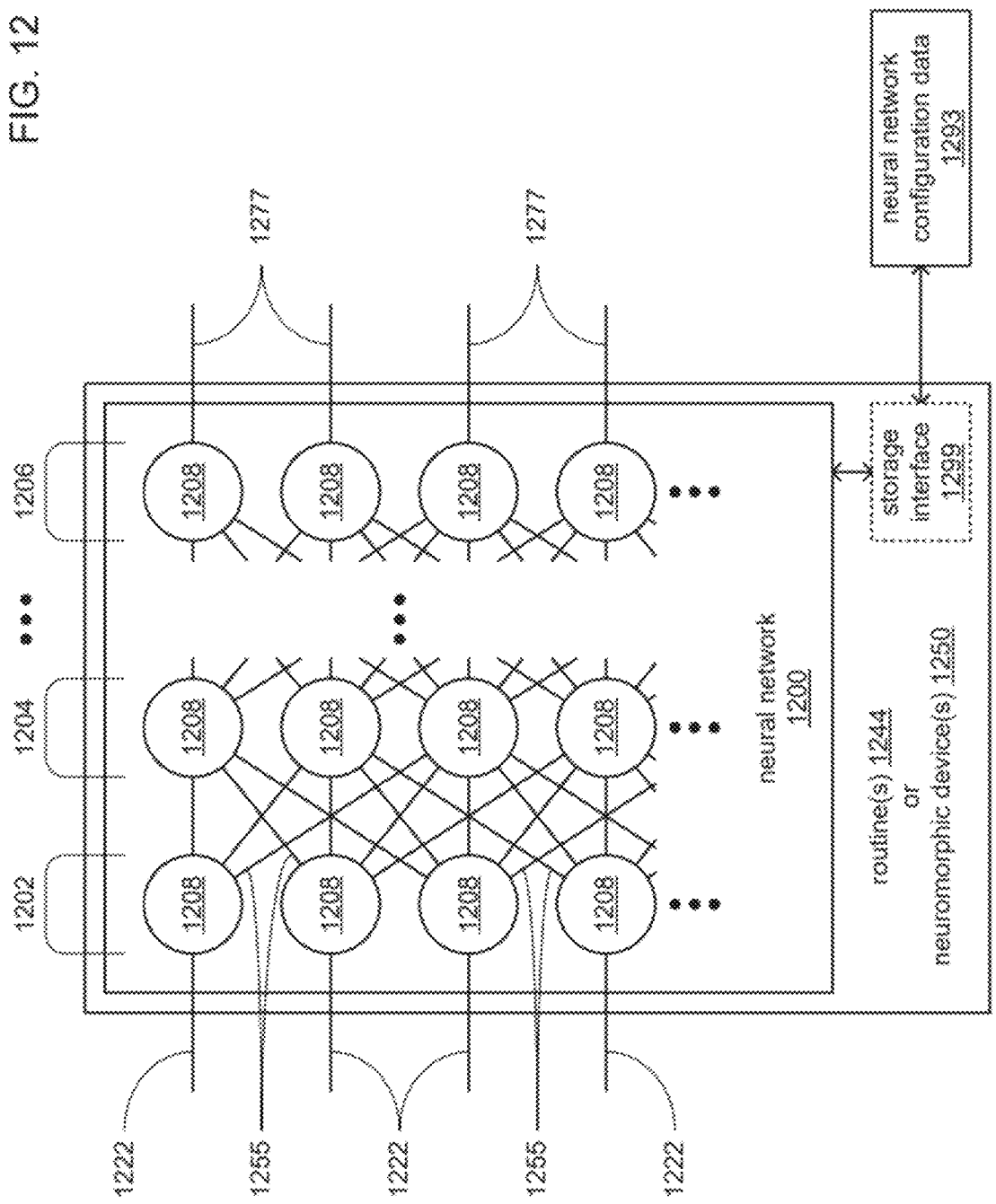
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
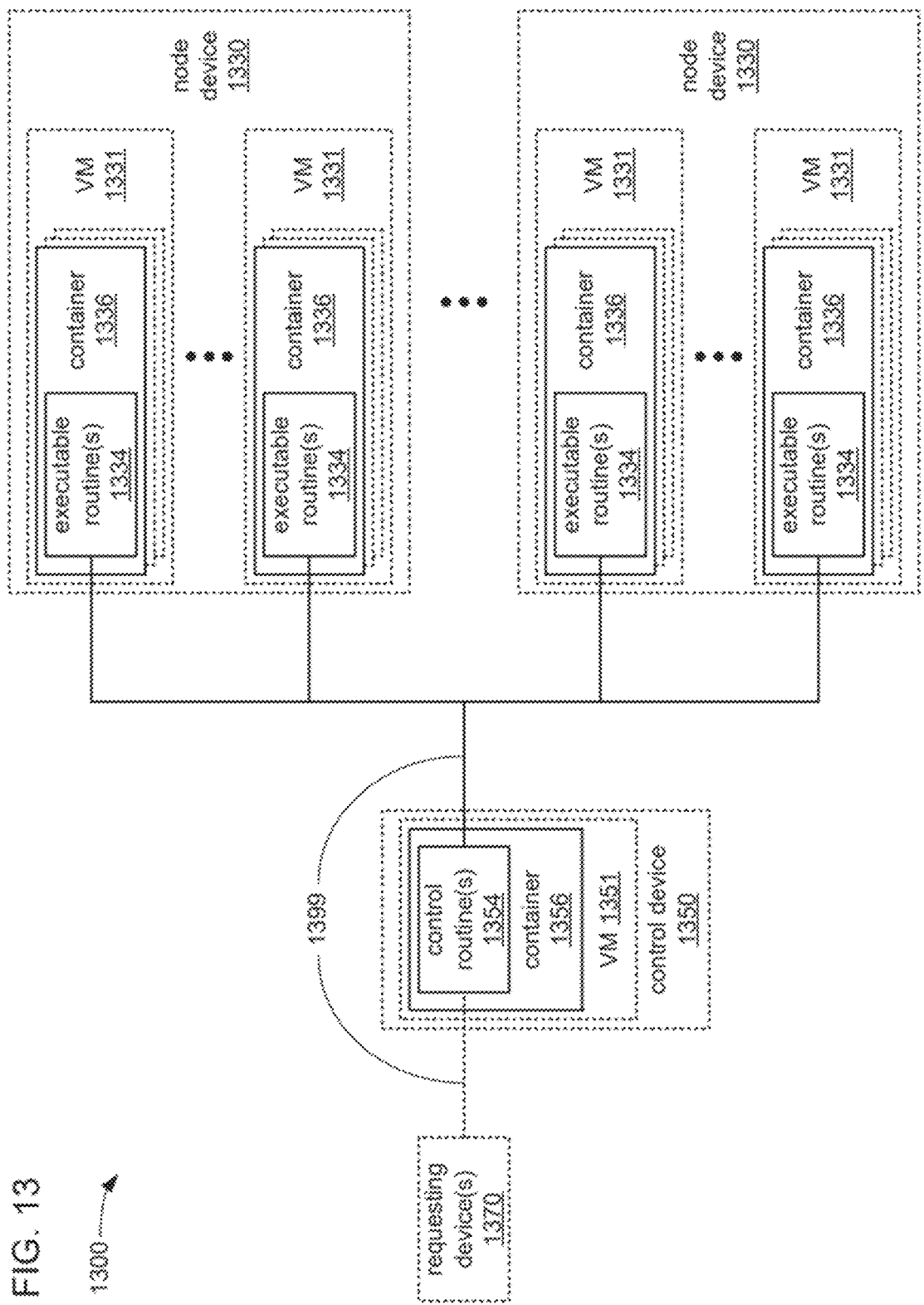
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions.

By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to a distributed large-scale non-linear Support Vectors Machine (SVM). The present disclosure provides an approach to train a non-linear SVM and use the trained non-linear SVM to classify datasets (e.g., test data). The proposed approach includes strategically selecting a subset of support vectors to determine a decision boundary and solving a non-linear optimization problem to determine optimal weight and bias values, thereby training the non-linear SVM for accurate classification. The present disclosure also provides a scalable mechanism to distribute computations to a cluster of computing machines to speed up processing.

Experimental results, outlined in greater detail below, indicate that the proposed approach provides acceptable accuracy compared to exact and approximate SVM solvers when training small and medium sized datasets. For large data, the proposed approach outperforms existing SVM techniques in terms of training time and solution quality. The results also show that the proposed approach scales very well as the number of computing nodes (e.g., the computing machines) increases.

SVM models may be used for data classification. Given a training dataset having observation vector and label pairs ($x_i$, $y_i$), where i=1, . . . , nobs, where nobs is the number of observation vectors in the training dataset, where $x_i \in R^{nftrs}$, where $R^{nftrs}$ is the set of variables in each observation vector, nftrs is the number of variables in each observation vector, and $y_i \in \{-1, 1\}$ indicates that a label for each observation vector could have values −1 or +1, the main goal for a non-linear SVM model is to find a hyperplane that separates the data points in the training dataset by solving a quadratic optimization program. In particular, the SVM model classifier $f(x)=\text{sign}(w_T\psi(x)+\beta)$ may be trained by solving the following optimization program:

$$\min_{\omega,\beta,\xi} \frac{1}{2}\|\omega\|^2 + \tau \sum_{i=1}^{nobs} \xi_i$$

such that $y_i(\omega^T \omega(x_i)+\beta) \geq 1-\xi_i, \xi_i \geq 0$, where
i=1, . . . ,nobs         Equation 1

In Equation 1 above, $\tau > 0$ is a penalty parameter, $\psi(x)$ is a function that maps observation vector, x, to itself (for linear SVM) and into a higher dimensional space for non-linear SVM, $\beta$ is a bias value, $\omega^T$ is a transpose of weight value $\omega$, and $\xi$ is a slack variable to transform an inequality constraint into an equality constraint. In Equation 1, $\omega$, $\beta$, $\xi$ are primal variables. In some embodiments, the penalty parameter, $\tau$, may be determined by using k-fold cross validation. In other embodiments, the penalty parameter, $\tau$, may be determined in other ways. In some embodiments, a default value of the penalty parameter, $\tau$, may be used as $\tau=(2\times10^{-6}\times \text{nftrs})^{-1}$.

Equation 1 above corresponds to a primal formulation of an SVM model. For non-linear SVM models, $\psi(x)$ may map x into any higher or potentially infinite higher dimensional space, making solving Equation 1 very hard. Because the resulting hyper-dimension may be too large or infinite, in the non-linear SVM, a dual formulation of the SVM model may be used. The dual formulation of the SVM model may be defined by:

$$\min_\alpha \frac{1}{2}\alpha^T Q\alpha - \sum_{i=1}^{nobs}\alpha_i$$

such that $\alpha^T y=0$, $0\leq\alpha\leq\tau$      Equation 2

In Equation 2 above, Q is a dense matrix having nobs× nobs elements such that $Q_{ij}=y_iy_jK(x_i, x_j)$ and $K(x_i, x_j)=\psi(x_i)^T\psi(x_j)$. $K(x_i, x_j)$ is a kernel matrix that may be computed using a kernel function defining $\psi(x)$. $\alpha$ in Equation 2 above is a dual variable. Solving Equation 2 above is a challenging task for large-scale datasets due to the size of the dense matrix Q. Generally speaking, larger the number of observation vectors in a training dataset, the larger is the size of the dense matrix Q.

To resolve the difficulty of handling large-scale datasets, a reduced SVM or RSVM formulation may be used. Instead of using all of the observation vectors in the training dataset (as used in Equations 1 and 2), the RSVM model preselects a subset of the observation vectors. This preselected subset of the observation vectors may be referred to as a support vector subset (also referred to herein as a support vector). In some cases, the RSVM model randomly selects the support vector subset. For example, in some cases, RSVM may randomly select 10% of the training dataset as the support vector subset. Using the support vector subset, the RSVM model then solves Equation 1 above of a smaller size. The optimal solution of Equation 2 for the RSVM model satisfies the following:

$$\omega=\Sigma_{i\in Z}y_i\alpha_i\psi(x_i)$$      Equation 3

In Equation 3 above, Z contains indices of the support vector subset. In particular, each observation vector in the training dataset may be assigned an index. In some embodiments, the training dataset may be arranged in an observation vector matrix having a plurality of rows and a plurality of columns. Each row of the observation vector matrix may be serially assigned an index to uniquely identify that observation vector. The observation vector matrix, also referred to herein as a training matrix, $X_r \in R^{nobs \times nftrs}$ with corresponding labels $y_r \in R^{nobs \times 1}$. The training matrix, $X_r$, includes all of the observation vectors in the training dataset. The support vector subset may similarly be arranged in a support vector matrix, $X_z$ where $X_z \in R^{n_z \times nftrs}$, where $n_z$ is the size of the support vector subset and $n_z=|Z|$.

Using the RSVM model, the primal formulation defined in Equation 1 may be reduced to (e.g., by substituting Equation 3 into Equation 1):

$$\min_{\mu_z,\beta,\xi}\frac{1}{2}\mu_z^T K_{zz}\mu_z + \frac{1}{2}\beta^2 + \tau e^T\xi$$

such that $K_{rz}\mu_z+\beta y_r\geq e-\xi$, $\xi\geq 0$      Equation 4

In Equation 4 above, $\mu_z$ is the weight value and equal to $y_z\odot\alpha_z$ corresponding to indices from Z and y is the label assigned to the associated observation vector. For example, $y_r$ denotes a label assigned to an observation vector in the training matrix, $X_r$, while $y_z$ denotes a label assigned to an observation vector in the support vector matrix, $X_z$. $K_{zz}$ and $K_{rz}$ are kernel matrices comparing Z with itself and $X_r$, respectively. In other words, $K_{zz}$ is kernel matrix computed between observation vectors in the training matrix, $X_z$, while $K_{rz}$ is a kernel matrix computed between observation vectors in the training matrix, $X_r$, and the support vector matrix, $X_z$.

In some embodiments, the kernel matrices $K_{zz}$ and $K_{rz}$ may be defined by a kernel function such as a Radial Basis Function (RBF), defined by:

$$k(x, y) = \exp\left(\frac{-\|x-y\|^2}{2\rho^2}\right)$$      Equation 5

In Equation 5, k(x, y) is a kernel function, x and y correspond to appropriate rows from the training matrix, $X_z$ and $X_r$, while $\rho>0$ denotes a kernel parameter. In some embodiments, the kernel parameter, $\rho$, may be determined by using k-fold cross validation. In some embodiments, the kernel parameter, $\rho$, may be determined in other ways. In some embodiments, a default value of the kernel parameter, $\rho$, may be used as $\rho=(\sqrt{nftrs})^{-1}$.

As the number of observation vectors grows, solving Equation 4 also becomes expensive (e.g., in terms of the amount of computing resources need, the amount of time needed). Some existing techniques attempt to solve Equation 4 for large-scale datasets by approximating the kernel matrix, $K_{zz}$ with an identity matrix (e.g., a square matrix in which all elements of the principal diagonal are one and all other elements are zero), thereby reducing Equation 4 to a linear SVM formulation that may be readily solved. However, using an identity matrix reduces the accuracy of the SVM model. Another existing technique attempts to sole Equation 4 for large-scale datasets by using an Eigen decomposition of the kernel matrix, $K_{zz}$ to transform Equation 4 into an equivalent linear SVM model. However, using the Eigen decomposition also reduces the accuracy of the SVM model. The Eigen decomposition is also unstable, causing the values to shift frequently. Further, these existing techniques (using identity matrix or Eigen decomposition) still take too long to solve. Further, these existing techniques are only suitable up to a certain number of observation vectors. Once the number of observation vectors grows too large, these techniques are unable to produce results, for example, due to computing systems running out of memory. Thus, existing techniques of solving Equation 4 for a non-linear SVM model are inadequate.

Moreover, solving Equation 4 for a nonlinear SVM is particularly challenging because each row (or column) of the kernel matrix, $K_{zz}$ depends on all observation vectors. In other words, kernel matrix, $K_{zz}$, may only be computed if observation vectors $x_i$ and $x_j$ are present on the same computing machine. Requiring all the observation vectors to be on the same computing machine not only creates memory bottlenecks, computations are performed at a slower pace. To avoid such problems, existing solutions either use a smaller subset of observation vectors for computing the kernel matrix, $k_{zz}$, or stop computing before an optimal solution is reached. For example, some existing solutions may stop training the non-linear SVM model after the training has occurred for a particular time (e.g., impose a time constraint), when a specific amount of memory has been consumed (e.g., impose a maximum memory constraint), etc. These constraints compromise the performance of the non-linear SVM model and prevent the non-linear SVM from reaching an optimal solution (e.g., an optimal value of the weight and bias values).

The present disclosure provides technical solutions to the technical problems above by providing a non-linear SVM model which is highly accurate, may be trained faster than conventional mechanisms, and may be easily scalable as the number of observation vectors grows. The present disclosure does not rely on using a smaller subset of observation vectors for computing the kernel matrix, $k_{zz}$. Rather, the distributed computing mechanism of the proposed approach is able to use distributed computing and use all of the observation vectors to compute the kernel matrix, $k_{zz}$. Further, because the proposed approach is distributed, the computations may easily be scaled (e.g., by adding additional computing machines) for increasing observation vector sizes.

The present disclosure provides a primal-dual interior-point algorithm in which the support vector subset is strategically sampled (instead of random) to increase performance of the non-linear SVM model and determine the decision boundary. The efficient distributed primal-dual interior-point algorithm of the present disclosure for large-scale nonlinear SVM achieves scale performance without needing to use an identity matrix or using Eigen decomposition, thereby simplifying computations and preventing need to transform Equation 4 by using unstable numerical inversions or kernel types that are not suitable.

Thus, the present disclosure provides practical applications (e.g., technical improvements) that are rooted in technology to train an SVM model for making accurate classifications. The proposed approach cannot be practically performed in the human mind. Nor can it be practically performed using pen and paper. Real-world applications (e.g., handwriting recognition, image classification, facial recognition, pattern recognition, text categorization, drug analysis, quality control, protein structure prediction, protein function prediction, genomics, bioinformatics, generalized predictive control, etc.) often have large-scale datasets (e.g., over a million observation vectors). A machine learning model cannot be trained in the human mind or using pen and paper. In fact, as detailed below, for large-scale datasets, inventors found that even computerized training using conventional techniques was unable to produce results (e.g., train the SVM model). Thus, a human mind (or using pen and paper) is incapable of training an SVM model. The concepts of the present disclosure are not directed to any observations, evaluations, judgments, or opinions that a human mind can practically perform. A human mind is not equipped to train machine learning models to accurately classify data.

Further, the present disclosure does not recite a mathematical concept, but is rather based on or involves mathematical concepts. In other words, the present disclosure is not directed to mathematical relationships, any specific mathematical formulas or equations, or any particular mathematical calculations. Rather, the present disclosure is directed to systems and methods that involve training a machine learning model to increase accuracy, reduce the amount of computing resources needed, and train the machine learning model much faster than the conventional techniques. Thus, the present disclosure also provides improvements in computer related technology and the present disclosure is integrated into a practical application. The non-linear SVM model of the present disclosure may be used in the real-world applications for a variety of purposes. For example, the present disclosure may be used to distinguish face and non-face portions of images of persons, classify proteins and cancers, detect protein remote homology, classify text into subject categories such as weather, politics, etc., validate signatures on documents, improve weather predictions, and other applications. The list of applications provided herein is only an example and not intended to limit the disclosure in any way.

Figure 14:
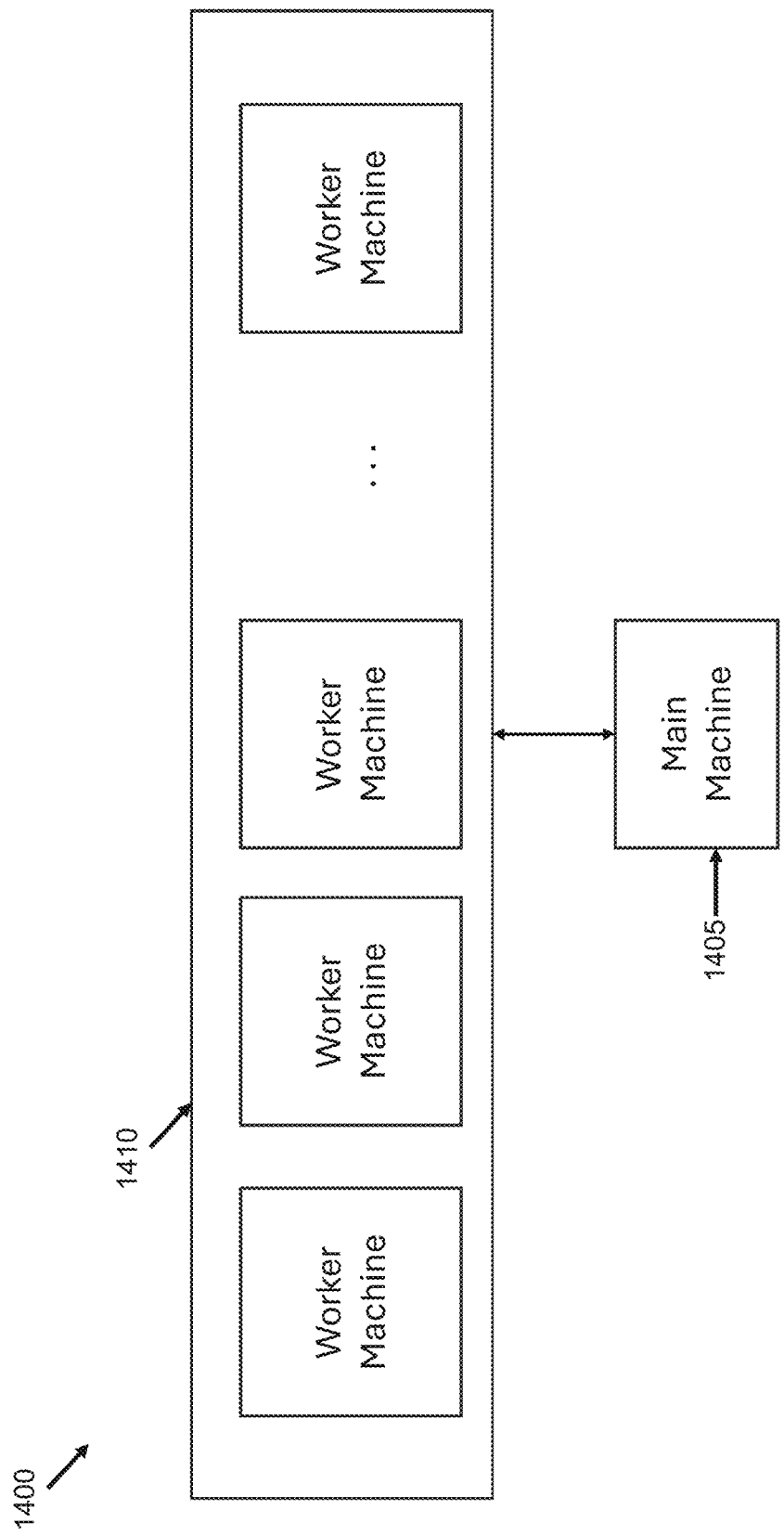
FIG. 14 illustrates a block diagram of an example distributed computing system, according to embodiments of the present technology.

Referring to FIG. 14, an example distributed computing system 1400 is shown, in accordance with some embodiments of the present disclosure. The distributed computing system 1400 provides a distributed architecture for classifying datasets. The distributed computing system 1400 may include a main machine 1405 communicatively and operatively connected (e.g., via a network) to a plurality of worker machines 1410. The main machine 1405 and each of the plurality of worker machines 1410 may include one or more discrete computing devices or machines. In some embodiments, the main machine 1405 and the plurality of worker machines 1410 may be communicatively and operatively connected via any type of suitable wired or wireless, public or private network, including cellular network, local area network, wide area network such as the Internet or the World Wide Web, Bluetooth®, or any other suitable network.

Figure 15:
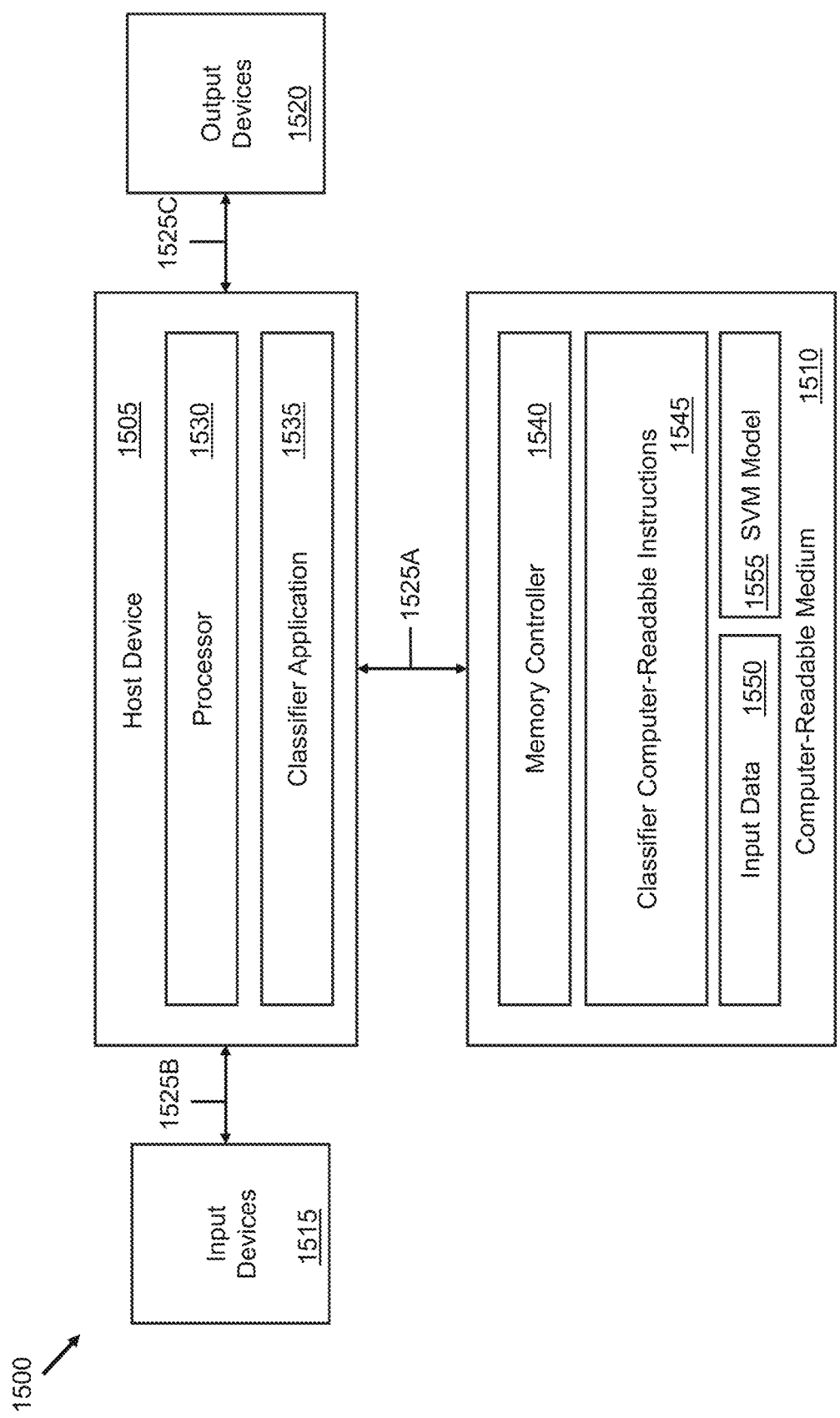
FIG. 15 illustrates a block diagram of an example computing device of the distributed computing system of FIG. 14, according to embodiments of the present technology.

The main machine 1405 and each of the plurality of worker machines 1410 may include computing devices of any form factor such as a desktop, a smart phone, a server computer, a laptop, a personal digital assistant, an integrated messaging device, a tablet computer, or any other suitable computing device. An example of the main machine 1405 and a worker machine of the plurality of worker machines 1410 is shown in FIG. 15. The main machine 1405 may be configured to send data and commands to, as well as receive data and commands from, each of the plurality of worker machines 1410. Each of the plurality of worker machines 1410 may be configured to receive data and commands from, as well as send data and commands to, the main machine 1405. Each of the plurality of worker machines 1410 may also be communicatively and operatively connected to each other. Each of the plurality of worker machines 1410 may be configured to send data and commands to, as well as receive data and commands from, other worker machines. Although four worker machines are shown in FIG. 14, in other embodiments, any number of worker machines may be provided.

Each of the plurality of worker machines 1410 may be similarly or differently configured than other worker machines. For example, in some embodiments, one or more of the plurality of worker machines 1410 may have different amounts of available memory, different types of available memory, different number and types of processing cores, different form factors, etc. Further, in some embodiments, one or more of the plurality of worker machines 1410 may be remotely located (e.g., in different geographic locations) from other worker machines and/or from the main machine 1405. In some embodiments, the main machine 1405 may be similarly or differently configured than the plurality of worker machines 1410. The distributed computing system 1400 is easily scalable. For example, an additional number of worker machines may be added to the plurality of worker machines 1410 to further distribute the computing operations. The main machine 1405 may serve as a controller that controls which operations each of the plurality of worker machines 1410 perform and when. By virtue of distributing computations, each worker machine of the plurality of worker machine may be a commodity computer which together may perform complex and computationally intensive operations in a relatively small amount of time. Further, by distributing computing, the hardware burden on any one of the plurality of worker machines 1410 may be reduced and computing bottlenecks may be avoided.

Turning now to FIG. 15, a block diagram of an example classifier system 1500 is shown, in accordance with some embodiments of the present disclosure. The classifier system 1500 may be part of, or otherwise associated with, the computing environment 114. The classifier system 1500 includes a host device 1505 associated with a computer-readable medium 1510. The host device 1505 may be configured to receive input from one or more input devices 1515 and provide output to one or more output devices 1520. The host device 1505 may be configured to communicate with the computer-readable medium 1510, the input devices 1515, and the output devices 1520 via appropriate communication interfaces, buses, or channels 1525A, 1525B, and 1525C, respectively. The classifier system 1500 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1505.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the classifier system 1500) may be implemented by multiple computing devices in a distributed environment, and vice versa.

The input devices 1515 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1505 and that allows an external source, such as a user, to enter information (e.g., data) into the host device and send instructions to the host device 1505. Similarly, the output devices 1520 may include a variety of output technologies such as external memories, printers, speakers, displays, microphones, light emitting diodes, headphones, plotters, speech generating devices, video devices, and any other output peripherals that are configured to receive information (e.g., data) from the host device 1505. The "data" that is either input into the host device 1505 and/or output from the host device may include any of a variety of textual data, numerical data, alphanumerical data, graphical data, video data, sound data, position data, combinations thereof, or other types of analog and/or digital data that is suitable for processing using the classifier system 1500.

The host device 1505 may include a processor 1530 that may be configured to execute instructions for running one or more applications associated with the host device 1505. In some embodiments, the instructions and data needed to run the one or more applications may be stored within the computer-readable medium 1510. The host device 1505 may also be configured to store the results of running the one or more applications within the computer-readable medium 1510. One such application on the host device 1505 may be a classifier application 1535. The classifier application 1535 may be used to train a classification model such as an SVM model 1555 and then automatically classify data using the trained SVM model. Depending on whether the classifier system 1500 is part of the main machine 1405 or the plurality of worker machines 1410, the classifier application 1535 may be configured to perform different computations for training the SVM model and classifying a dataset using the trained SVM model. The SVM model 1555 may be a non-linear SVM model. The SVM model 1555 may include data related to, and associated with, executing the SVM model (e.g., SVM Model description).

The classifier application 1535 may be executed by the processor 1530. The instructions to execute the classifier application 1535 may be stored within the computer-readable medium 1510. To facilitate communication between the host device 1505 and the computer-readable medium 1510, the computer-readable medium may include or be associated with a memory controller 1540. Although the memory controller 1540 is shown as being part of the computer-readable medium 1510, in some embodiments, the memory controller may instead be part of the host device 1505 or another element of the classifier system 1500 and operatively associated with the computer-readable medium 1510. The memory controller 1540 may be configured as a logical block or circuitry that receives instructions from the host device 1505 and performs operations in accordance with those instructions. For example, to execute the classifier application 1535, the host device 1505 may send a request to the memory controller 1540. The memory controller 1540 may read the instructions associated with the classifier application 1535. For example, the memory controller 1540 may read classifier computer-readable instructions 1545 stored within the computer-readable medium 1510 and send those instructions back to the host device 1505. In some embodiments, those instructions may be temporarily stored within a memory on the host device 1505. The processor 1530 may then execute those instructions by performing one or more operations called for by those instructions.

The computer-readable medium 1510 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1510. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1510 may also be configured to store input data 1550. When the classifier system 1500 is implemented in the main machine 1405, the input data 1550 may include training data that is used to train the SVM model by the classifier application 1535. The input data 1550, when the classifier system 1500 is implemented in the main machine 1405, may also include training data blocks, support vector subset, one or more training parameters, one or more variables and/or results computed by the main machine and/or by the plurality of worker machines 1410, the test data which is classified using the trained SVM model, a description of the SVM model (e.g., classification model description), and any other data that is received or sent by the main machine during training of the SVM model and during classification of the test data. When the classifier system 1500 is implemented in the plurality of worker machines 1410, the input data 1550 may include data that is received, computed, and/or sent by those worker machines. For example, in some embodiments, the input data 1550 on the plurality of worker machines 1410 may include one or more training parameters, training data blocks, support vector subset, one or more variables and/or results computed by the main machine and/or by the plurality of worker machines 1410, test data blocks, and any other data that is received or sent by the plurality of worker machines during training of the SVM model 1555 and during classification of the test data.

It is to be understood that only some components of the classifier system 1500 are shown and described in FIG. 15. However, the classifier system 1500 may include other components such as various batteries and power sources, networking interfaces, routers, switches, external memory systems, controllers, etc. Generally speaking, the classifier system 1500 may include any of a variety of hardware, software, and/or firmware components that are needed or considered desirable in performing the functions described herein. Similarly, the host device 1505, the input devices 1515, the output devices 1520, and the computer-readable medium 1510, including the memory controller 1540, may include hardware, software, and/or firmware components that are considered necessary or desirable in performing the functions described herein.

Figure 16:
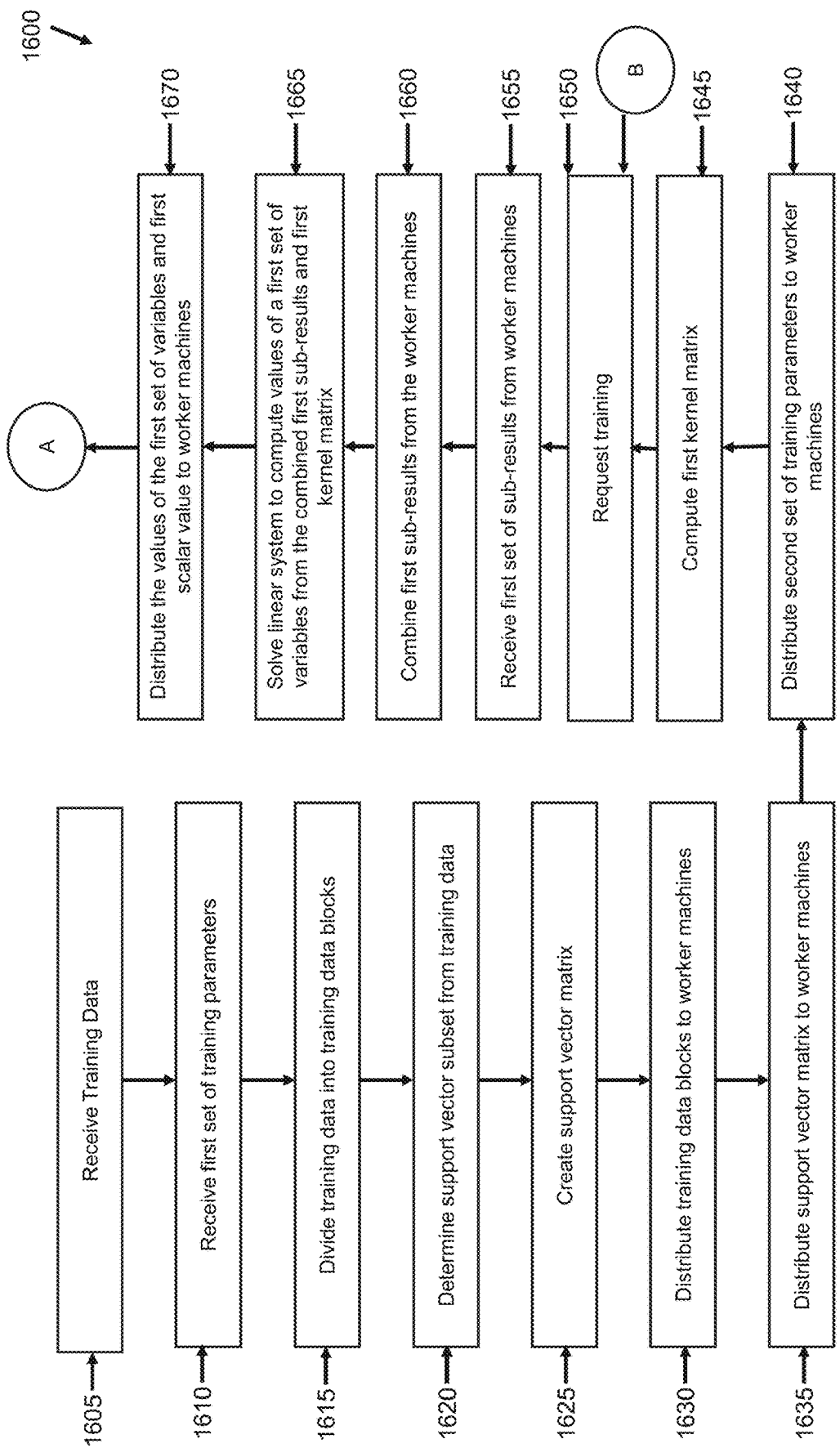
FIG. 16 illustrates a flowchart showing an example process performed by a main machine of the distributed computing system of FIG. 15 for training a non-linear SVM for classification purposes, according to embodiments of the present technology.
Figure 16:
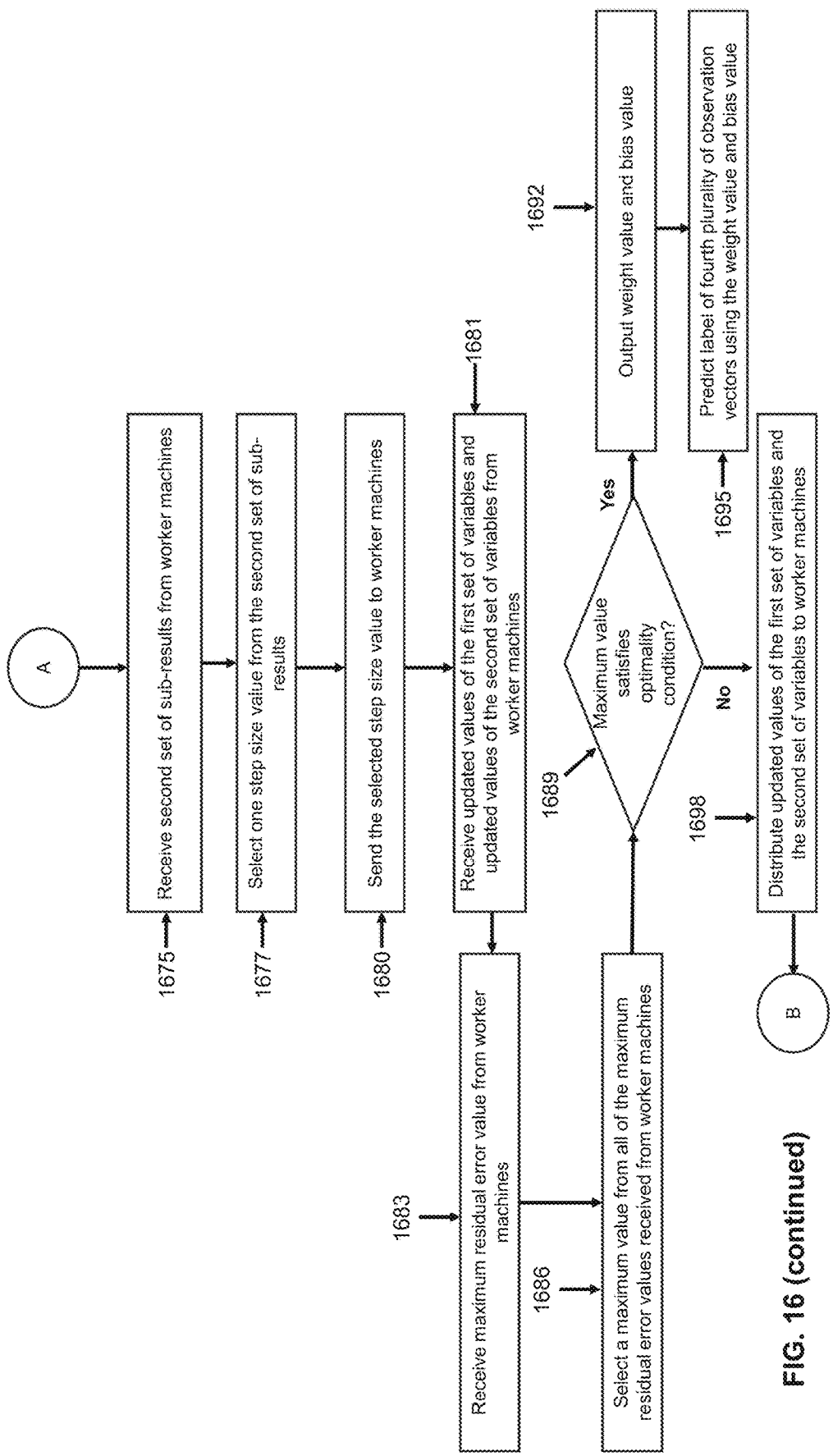

Turning now to FIG. 16, an example flowchart outlining operations of a process 1600 is shown, in accordance with some embodiments of the present disclosure. The process 1600 may be used to train the SVM model 1555. In particular, the process 1600 may be used to identify optimal weight and bias values for the SVM Model 1555. The operations of the process 1600 may be performed on the main machine 1405. The process 1600 may be executed by one or more processors (e.g., the processor 1530) associated with the classifier application 1535 on the main machine 1405. In particular, one or more processors may execute computer-readable instructions (e.g., the classifier computer-readable instructions 1545) to train the SVM model. The process 1600 may include other or additional operations depending upon the embodiment.

To train the SVM model 1555, the processor receives training data at operation 1605. The training data may be the input data 1550. In some embodiments, the training data may include data captured as a function of time. For example, in some embodiments, the training data may be captured at different time points, periodically, intermittently, when an event occurs, etc. In some embodiments, the training data may include data captured at a high data rate such as 200 or more observation vectors per second or other suitable rates. In some embodiments, the training data may be a collection of data (e.g., images, text files, emails, etc.) in one or more formats. In some embodiments, the training data may include data captured under normal and abnormal operating conditions. Further, in some embodiments, the training data may be received directly or indirectly from the source and may or may not be pre-processed in some manner. For example, in some embodiments, the training data may be pre-processed using an event stream processor such as the SAS® Event Stream Processing Engine (ESPE), developed and provided by SAS Institute Inc. of Cary, N.C., USA. For example, in some embodiments, the training data may be generated as part of the Internet of Things (IoT) where things (e.g., machines, devices, phones, sensors) may be connected to networks and the data from these things collected and processed within the things and/or external to the things. In some embodiments, the training data may reside in the cloud or in an edge device.

In some embodiments, the training data may include any type of content represented in any computer-readable format such as binary, alphanumeric, numeric, string, markup language, etc. The content may include textual information, numeric information, etc. that further may be encoded using various encoding techniques as understood by a person of skill in the art. The training data may be stored in various compressed formats such as a coordinate format, a compressed sparse column format, a compressed sparse row format, etc. The training data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools. In some embodiments, the training data may be stored using various data structures including one or more files of a file system, a relational database, one or more tables of a system of tables, a structured query language database, etc.

The training data may be stored using any suitable data structure including one or more files of a file system, a relational database, one or more tables of a system of tables, a structured query language database, etc. In some embodiments, all of the training data may be stored in one location. In other embodiments, the training data may be distributed across multiple locations. For example, the training data may be stored in a cube distributed across a grid of computers. As another example, the training data may be stored in a multi-node Hadoop® class. For instance, Apache™ Hadoop® is an open-source software framework for distributed computing supported by the Apache Software Foundation. As another example, the training data may be stored in a cloud of computers and accessed using cloud computing technologies, as understood by a person of skill in the art. The SAS® LASR™ Analytic Server may be used as an analytic platform to enable multiple users to concurrently access data stored in the training data. The SAS Viya open, cloud-ready, in-memory architecture also may be used as an analytic platform to enable multiple users to concurrently access data stored in the training data. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations. The main machine 1405 may coordinate access to the training data from the location(s) at which the training data is stored.

The training data may include a plurality of observation vectors (e.g., a first plurality of observation vectors). Each of the plurality of observation vectors may include variable values of a plurality of variables or features, and a number of the plurality of variables in each of the plurality of observation vectors may be nftrs. In some embodiments, the plurality of observation vectors may be arranged in a matrix (e.g., an observation vector matrix) having a plurality of rows and a plurality of columns. Each row of the plurality of rows may be referred to as an "observation vector" or "observation record." Each column of the plurality of columns may be associated with one variable of the plurality of variables. Thus, the training data may include rows $i=1, 2, \ldots, N$, where N is the number of observation vectors (e.g., the first plurality of observation vectors), and for columns, j=1, 2, ..., nftrs, where nftrs is the number of variables in each observation vector. In some embodiments, the number of observation vectors in the training data may be in the hundreds or thousands or millions depending on the application. Likewise, in some embodiments, the number of variables in each observation vector may be in the hundreds or thousands or millions depending on the application. In other embodiments, the data on the rows and columns may be transposed.

A variable in an observation vector may identify a property, element, or feature, factor, or otherwise characteristic of something. The variables may be dependent on the specific application. For example, if the application involves operation of a vehicle, the variables may include a type of vehicle, an oil pressure, a speed, a gear indicator, a gas tank level, a tire pressure for each tire, an engine temperature, a radiator level, etc. One or more variables in some embodiments may include time and/or date, or other measurable parameters. Each variable may be associated with a variable value or data value. In some embodiments, the variable values may be provided by a field expert. In other embodiments, the variable values may be gathered in other ways.

Further, each observation vector in the training data may include a label, y $_i$. The label may be a class or category, characteristic, target, or other indication of the classification of the associated observation vector. In some embodiments, the label may be Boolean (e.g., 0 or 1, −1 or +1, etc.). For example, when the classification is to classify images as cats or dogs, a label +1 may indicate that an image shows a dog, while a label −1 may indicate that an image shows a cat. It is to be understood that any examples used herein are only for explanation purposes and not intended to be limiting in any way. In some embodiments, in the observation vector matrix, a column for the label may be added. The value in the label column of a particular row may indicate the label of the observation vector in that row. Thus, the training data may include observation vectors that have been labeled or classified, for example, by a human being or by other machine learning labeling/classification process.

Thus, at the operation 1605, the processor may receive the training data (or an indicator indicating location(s) from which to access the training data), including the labels for each observation vector in the training data (or an indicator indicating location(s) from which to access the labels). In some embodiments, not all variables in the training data may be desired to be used. Thus, in some embodiments, at the operation 1605, the processor may also receive an indicator of which variables of the training data to use (or receive only the data associated with the variables to be used).

At operation 1610, the processor receives a first set of training parameters. The first set of training parameters may include one or more values that may be used during training of the SVM model 1555. For example, the first set of training parameters may include a size of a support vector subset, n$_z$. As indicated above, the reduced SVM model of the present disclosure uses a subset of the training data—referred to as the support vector subset—to train the SVM model 1555. The size of the support vector subset, n$_z$ may indicate a number of observation vectors (e.g., a third plurality of observation vectors) from the training data to use for training the SVM model. For example, in some embodiments, the size may indicate using 100,000 observation vectors of the training data having 10 million observation vectors. In other embodiments, the size may be indicated as a percentage of the total number of observation vectors in the training data. For example, the size may indicate using 10% of the observation vectors in the training data.

The first set of training parameters may include identification of a kernel function to use for training the SVM model 1555. For example, the processor may receive a name of a kernel function to use. In some embodiments, a Radial Basis Function (RBF) kernel function may be used to train the SVM model 1555. In some embodiments, the RBF kernel function may be defined as in Equation 5.

In other embodiments, linear, polynomial, or sigmoid kernel functions may be used. A linear kernel function may be defined as:

$$K(x_i, x_j) = x_i^T x_j \qquad \text{Equation 6}$$

A polynomial kernel function may be defined as:

$$K(x_i, x_j) = (cx_i^T x_j + r)^d, \gamma > 0 \qquad \text{Equation 7}$$

A sigmoid kernel function may be defined as:

$$K(x_i, x_j) = \tanh(\gamma x_i^T x_j + r) \qquad \text{Equation 8}$$

In the equations above, y, p d, r, c are kernel parameters, $K(x_i, x_j)$ is a kernel function, $x_i$ and $x_j$ are $i^{th}$ and $j^{th}$ observation vectors.

In other embodiments, exponential, matern, periodic, or other suitable kernel functions may be used.

The first set of training parameters may also include any kernel parameters that are used in the kernel function that is desired to be used. For example, if the RBF kernel function is being used, the first set of training parameters may include the value of the kernel parameter used in the RBF kernel function. In some embodiments, default values for the kernel parameters may be set. The first set of training parameters may also include the value of a penalty parameter. The first set of training parameters may include other or additional parameters that may be needed in training the SVM model.

At operation 1615, the processor divides the training data of the operation 1605 into training data blocks. In particular, the processor divides the training data into P training data blocks, where P is a number of the plurality of worker machines 1410 operatively associated with the main machine 1405. Each of the P training blocks includes a second plurality of observation vectors that is a subset of the first plurality of observation vectors included in the training data. The second plurality of observation vectors is less than the first plurality of observation vectors. In some embodiments, the processor may evenly divide the training data into the P training data blocks. For example, if there are 10 worker machines and the training data includes 1,000,000 observation vectors (first plurality of observation vectors), each training data block may include 1,000,000/10=100,000 second plurality of observation vectors. If the first plurality of observation vectors does not include a number of the first plurality of observation vectors that may be evenly divided into P blocks (e.g., the last training block ends up having fewer observation vectors than the remaining training blocks), the processor may add additional observation vectors to the training data such that the last training data block has the same number of observation vectors as the other training data blocks. In some embodiments, the processor may add dummy observation vectors to the last training data block or pad the observation vectors of the last training data block with zeroes. For example, with 10 worker machines, if the training data includes 999,999 observation vectors, the first 9 worker machines may each include 100,000 observation vectors and the last worker machine may include 99,999 observation vectors −1 less than the other worker machines. In this case, the processor may add one more observation vector (whether dummy or actual) or add 0 to the last observation vector such that the last worker machine has the same number of observation vectors as the remaining worker machines.

Thus, if the training data is represented by the observation vector or training data matrix, $X_r$, the processor may divide the $X_r$ observation vectors into P training data blocks ($X_1$, $X_2$, $X_3$, . . . . $X_P$) as follows:

$$X_r = (X_1^T X_2^T \ldots X_P^T)^T$$

where $X_i \in R^{nlocalp \times nftrs}$ for all $i=1, \ldots, P$  Equation 7

In the equation above, nftrs indicates the number of variables in each observation vector (e.g., number of columns) and $nlocal_i$ indicates the number of observation vectors (e.g., the second plurality of observation vectors) on worker machine i, for all i=1, 2, . . . . P. Each $X_i$ includes a second plurality of observation vectors. In some embodiments, each $X_i$ may include a matrix having a plurality of rows equal to the number of the second plurality of observation vectors and a plurality of columns for the variables of each observation vector. The number of columns in each $X_i$ may be the same as the number of columns in the training data $X_r$, but the number of rows in $X_i$ may be less than the number of rows in the training data $X_r$ (e.g., because $X_i$ is a subset of $X_r$).

The training data also includes a label for each observation vector in the training data, $X_r$. Thus, as part of dividing the training data into the P training data blocks, the processor may also divide the training labels, $y_r$, into P label blocks as follows:

$$y_r = \begin{pmatrix} y_{r1} \\ y_{r2} \\ \vdots \\ y_{rp} \end{pmatrix}$$  Equation 8

In some embodiments, each of $y_{r1}$, $y_{r2}$, . . . , $y_{rp}$ may be a vector of training labels corresponding to the observation vectors (e.g., the second plurality of observation vectors) in each training data block. For example, $y_{r1}$ may be a vector of all training labels corresponding to the observation vectors in $X_1$. $y_{r2}$ may be a vector of all training labels corresponding to the observation vectors in $X_2$ and so on.

At operation 1620, the processor determines a support vector subset, $X_z$, from the training data, $X_r$. The support vector subset may include a third plurality of observation vectors that is a subset of the first plurality of observation vectors. Thus, the third plurality of observation vectors may be less than the first plurality of observation vectors in the training data. In some embodiments, the third plurality of observation vectors may be less than or same as the number of observation vectors in the second plurality of observation vectors (e.g., each training data block). In some embodiments, the number of observation vectors in the third plurality of observation vectors may be based on the size, $n_z$, of the support vector subset received as part of the first set of training parameters at the operation 1610. For example, if the size of the support vector subset, $n_z$, indicates 10,000 observation vectors, the third plurality of observation vectors may include 10,000 observation vectors.

The support vector subset may be selected in multiple ways from the first plurality of observation vectors. The observation vectors that are selected in the support vector subset reflect the characteristics of the observation vectors in the training data. For example, if the training data includes images from both cats and dogs, the support vector subset includes images from both cats and dogs as well (as opposed to having images of only cats or only dogs). Similarly, if the images in the training data include a mix of 60% cat images and 40% dog images, the support vector subset may be desired to have a similar mix (e.g., 60% cat images and 40% dog images). To preserve such characteristics of the training data in the support vector subset, a random sampling method may not be suitable. Rather, in some embodiments, a stratified sampling technique may be used, discussed in FIG. 19 below. In other embodiments, even stratified sampling may not be suitable enough to preserve the characteristics of the training data in the support vector subset accurately. In such instances, more strategic sampling techniques discussed in FIGS. 17 and 18 may be used.

At operation 1625, the processor creates a support vector matrix in which the support vector subset of the operation 1620 is arranged. The support vector matrix includes a plurality of rows, with each row corresponding to one observation vector of the third plurality of observation vectors. The support vector matrix may also include a plurality of columns for the variables of each observation vector. The number of columns in the support vector matrix may be the same as the number of columns in the training data X, but the number of rows in the support vector matrix may be less than the number of rows in the training data X, (e.g., because $X_z$ is a subset of $X_r$). Thus, at the operation 1625, the processor selects candidate rows of $X_r$ to create the support vector subset $X_z$.

At operation 1630, the processor distributes the training data blocks (including the training label vector) of the operation 1615 to the plurality of worker machines 1410. For example, the processor may distribute each of the P training data blocks to one of the plurality of worker machines. In some embodiments, the main machine 1405 may send the P training data blocks to each of the plurality of worker machines 1410 in a single broadcast. In other embodiments, the main machine 1405 may send the P training data blocks to the plurality of worker machines 1410 in other ways. In some embodiments, instead of sending the actual data of the training data block, the main machine 1405 may provide the location of the training data block to the respective worker machine, and the worker machine may retrieve their training data block from the location. After the broadcast, each worker machine of the plurality of worker machines 1410 includes one of the P training data blocks.

At operation 1635, the processor distributes the support vector matrix to each of the plurality of worker machines 1410. In some embodiments, the main machine 1405 may send the support vector matrix to each of the plurality of worker machines 1410 in a single broadcast. In other embodiments, the main machine 1405 may send the support vector matrix to the plurality of worker machines 1410 in other ways. After the broadcast, each worker machine of the plurality of worker machines 1410 has the same support vector matrix. In some embodiments, instead of sending the actual data of the support vector matrix, the main machine 1405 may provide the location of the support vector matrix to each of the plurality of worker machines 1410, and those worker machines may retrieve the support vector matrix from the location. In some embodiments, the main machine 1405 may send the support vector matrix or the location of the support vector matrix to one worker machine and that worker machine may transmit the support vector matrix or the location to other worker machines.

Therefore, after the broadcast of the operations 1630 and 1635, each worker machine has a different training data block and the same support vector matrix.

At operation 1640, the processor distributes a second set of training parameters to each of the plurality of worker machines 1410. The second set of training parameters may be a subset of the first set of training parameters of the operation 1610. For example, in some embodiments, the main machine 1405 may transmit information related to the kernel function to be used and the kernel parameter to each of the plurality of worker machines 1410. In other embodiments, the main machine 1405 may distribute other or additional training parameters that may be needed by each worker machine to perform computations discussed herein.

At operation 1645, the processor computes a first kernel matrix, $K_{zz}$, based on the kernel function (e.g., the RBF kernel function). When the RBF kernel function is used, each element of the first kernel matrix, $K_{zz}$, may be computed from the third plurality of observation vectors included in the support vector matrix of the operation 1625 using Equation 5. Thus, the first kernel matrix is computed between observation vectors x and y in the support vector subset, $X_z$. In particular, the processor may compute the first kernel matrix such that $K_{zz} \triangleq K(X_z, X_z) \in R^{n_z \times n_z}$ is the first kernel matrix in which $K_{zz}$ is the first kernel matrix formed by using a kernel function $K(X_z, X_z)$ such as an RBF kernel function of Equation 5. $X_z$ is an observation vector from the support vector matrix. Thus, the first kernel matrix is computed between elements of the support vector subset. This first kernel matrix is a small matrix that may be efficiently formed using a cache-efficient matrix computation.

At operation 1650, the processor requests training of the non-linear SVM model 1555 from the plurality of worker machines 1410. In some embodiments, the main machine 1405 may broadcast a request to each of the plurality of worker machines 1410 to start the training process of the non-linear SVM model 1555. In other embodiments, the main machine may request training from the plurality of worker machines 1410 in other ways. In some embodiments, the operations 1645 and 1650 may occur simultaneously or the operation 1645 may occur after the operation 1650.

At operation 1655, in response to requesting the training at the operation 1650, the main machine 1405 receives a first set of sub-results from each of the plurality of worker machines 1410. In particular, each of the plurality of worker machines 1410 may send the main machine values of a second kernel matrix block, a vector block value, a first scalar block value, a second scalar block value, and a weight residual block value. The operations performed on each of the plurality of worker machines 1410 are discussed below.

At operation 1660, the processor combines the first set of sub-results to obtain an intermediary matrix, a vector value, a first scalar value, a second scalar value, and a weight residual value. In particular, the processor may combine the second kernel matrix blocks from each of the plurality of worker machines 1410 to obtain the intermediary matrix, combine the vector block values from each of the plurality of worker machines to obtain the vector value, combine the first scalar block values from each of the plurality of worker machines to obtain the first scalar value, combine the second scalar block values from each of the plurality of worker machines to obtain the second scalar value, and combine the weight residual block values from each of the plurality of worker machines to obtain the weight residual values. In some embodiments, the processor may combine the first set of sub-results from the plurality of worker machines 1410 by appending the results from the various worker machines. In some embodiments, the processor may combine the first set of sub-results from the plurality of worker machines 1410 by adding the sub-results from each of the plurality of worker machines 1410, etc.

At operation 1665, the processor solves a linear system based on the first kernel matrix, the intermediary matrix, the vector value, the first scalar value, the second scalar value, and the weight residual value to compute values of a first set of variables. In particular, a primal-dual Lagrangian function associated with Equation 4 may be defined as:

$$\mathcal{L}(\mu_z, \beta, \xi, \theta, \sigma, \gamma) = \qquad \text{Equation 9}$$
$$\frac{1}{2}\mu_z^T K_{zz} \mu_z + \frac{1}{2}\beta^2 + \tau e^T \xi - \gamma^T (K_{rz}\mu_z + \beta y_r - e + \xi) - \sigma^T \xi - \gamma^T \theta$$

In Equation 9 above, $\theta \in R^{nobs}$ is a vector of slack variables, $\xi$ is also a slack variable (e.g., from Equation 1), $\mu_z$ is the weight value to be optimized, $\beta$ is the bias value to be optimized, $\sigma, \gamma \in R^{nobs}$ correspond to Lagrange multipliers, and $\tau$ is a penalty parameter (e.g., from Equation 1).

The first-order optimality conditions, called Karush-Kuhn-Tucker (KKT) conditions of Equation 4 may be given by:

$$r_{\mu_z} := K_{zz}\mu_z - K_{rz}^T \gamma = 0 \qquad \text{Equation 10}$$

$$r_\beta := \beta - \gamma_r^T = 0 \qquad \text{Equation 11}$$

$$r_\xi := \tau e - \gamma - \sigma = 0 \qquad \text{Equation 12}$$

$$r_\theta := K_{rz}\mu_z + \beta y_r - e + \xi - \theta = 0 \qquad \text{Equation 13}$$

$$r_\sigma := \Sigma \Xi e = 0 \qquad \text{Equation 14}$$

$$r_\gamma := \tau \Xi e = 0 \qquad \text{Equation 15}$$

where $\xi, \theta, \sigma, \gamma \geq 0$

In Equations 10-15 above, $\mu_{\mu_z}, r_\beta, r_\xi, r_\theta, r_\sigma,$ and $r_\gamma$ are residual values or residuals, $\Sigma, \Xi, \Theta, \Gamma$ are diagonal matrices of the corresponding named vectors, and e is a vector of all ones. Interior-point methods may be applied to Equations 10-15 where the residuals $r_\sigma$ and $r_\gamma$ are perturbed in order to maintain $\xi, \theta, \sigma, \gamma > 0$. The Newton system for Equations 10-15 may be given by:

$$K_{zz}\Delta\mu_z - K_{rz}^T \Delta\gamma = -r_{\mu_z} \qquad \text{Equation 16}$$

$$\Delta\beta - y_r^T \Delta\gamma = -r_\beta \qquad \text{Equation 17}$$

$$-\Delta\gamma - \Delta\sigma = -\eta_\xi \qquad \text{Equation 18}$$

$$K_{rz}\Delta\mu_z + y_r\Delta\beta + \Delta\xi - \Delta\theta = -r_\theta \qquad \text{Equation 19}$$

$$\Sigma\Delta\xi + \Xi\Delta\sigma = -r_\sigma \qquad \text{Equation 20}$$

$$\Gamma\Delta\theta + \Theta\Delta\gamma = -r_\gamma \qquad \text{Equation 21}$$

To efficiently solve Equation 4, Equations 16-21 may be transformed to a condensed equivalent form of size $n_z \times n_z$, instead of solving the $(4nobs+n_z+1) \times (4nobs+n_z+1)$ size of the Equations 16-21. To obtain the condensed equivalent form, Equations 16-21 may be reduced by eliminating $\Delta\theta$ and $\Delta\sigma$ using Equations 20 and 21 to obtain:

$$\begin{pmatrix} K_{zz} & 0 & 0 & -K_{rz}^T \\ 0 & 1 & 0 & -y_r \\ 0 & 0 & \Xi^{-1}\Sigma^{-1}\Sigma & -I \\ K_{rz} & y_r & I & \Gamma^{-1}\Theta \end{pmatrix} \begin{pmatrix} \Delta\mu_z \\ \Delta\beta \\ \Delta\xi \\ \Delta\gamma \end{pmatrix} = -\begin{pmatrix} r_{\mu_z} \\ r_\beta \\ r_\xi + \Xi^{-1}r_\sigma \\ r_\theta + \Gamma^{-1}r_\gamma \end{pmatrix} \quad \text{Equation 22}$$

Then, $\Delta\xi$ may be eliminated using Equations 21 and 22 to obtain:

$$\begin{pmatrix} K_{zz} & 0 & -K_{rz}^T \\ 0 & 1 & -y_r \\ K_{rz} & y_r & \Omega \end{pmatrix} \begin{pmatrix} \Delta\mu_z \\ \Delta\beta \\ \Delta\gamma \end{pmatrix} = -\begin{pmatrix} r_\mu \\ r_\beta \\ r_\omega \end{pmatrix} \quad \text{Equation 23}$$

In Equation 22 above, I is an identity matrix and $\Omega$, $r_\omega$ may be defined as:

$$\Omega = \Gamma^{-1}\Theta + \Sigma^{-1}\Xi \quad \text{Equation 24}$$

$$r_\omega = r_\theta + \Gamma^{-1}r_\gamma - \Sigma^{-1}\Xi(r_\xi + \Xi^{-1}r_\sigma) \quad \text{Equation 25}$$

In addition, $\Delta\gamma$ and $\Delta\beta$ may be eliminated to obtain the desired $n_z \times n_z$ system as follows:

$$\phi\Delta\mu_z = -r_\phi \quad \text{Equation 26}$$

where $$\phi = K_{zz} + K_{rz}^T\Omega^{-1}K_{rz} - \frac{1}{1 + y_r^T\Omega^{-1}y_r}K_{rz}^T\Omega^{-1}y_r y_r^T\Omega^{-1}K_{rz} \quad \text{Equation 27}$$

$$r_\phi = r_{\mu_z} + K_{rz}^T\Omega^{-1}r_\omega + \frac{(r_\beta + y_r^T\Omega^{-1}r_\omega)}{1 + y_r^T\Omega^{-1}y_r}K_{rz}^T\Omega^{-1}y_r \quad \text{Equation 28}$$

Equation 26 may be defined as the linear system that the main machine 1405 solves at the operation 1665. In particular, the main machine 1405 may solve Equation 26 to obtain the value of $\Delta\mu_z$. After factoring matrix $\phi$ and obtaining the value of $\Delta\mu_z$ from solving Equation 26, the main machine 1405 may compute the value of $\Delta\beta$ as follows:

$$\Delta\beta = -\frac{1}{1 + y_r^T\Omega^{-1}y_r}\left(r_\beta + y_r^T\Omega^{-1}r_\omega + y_r^T\Omega^{-1}K_{rz}\Delta\mu_z\right) \quad \text{Equation 29}$$

The first set of variables may be $\Delta\mu_z$ and $\Delta\beta$. The main machine 1405 may compute the values of the first set of variables, $\Delta\mu_z$ and $\Delta\beta$, from Equations 26-29 above. Further, as discussed above, each of the plurality of worker machines 1410 compute the values of the second kernel matrix block, the vector block value, the first scalar block value, the second scalar block value, and the weight residual block value. Referring to the equations above, the second kernel matrix block may be the $(K_{rz})_i^T\Omega_i^{-1}(K_{rz})_i$ value from Equation 27 computed on worker machine, i. The vector block value may be the $(K_{rz})_i^T\Omega_i^{-1}y_{r_i}$ from Equation 28 computed on worker machine, i. The first scalar block value may be the $y_{r_i}y_{r_i}^T\Omega_i^{-1}$ value from Equation 27 computed on worker machine, i. The second scalar block value may be the $y_{r_i}^T\Omega_i^{-1}r_{\omega_i}$ value from Equation 28 computed on worker machine, i. The weight residual value may be the $r_{\omega_i}$ value from Equation 28 computed on worker machine, i.

Thus, each of the plurality of worker machines 1410 may compute the values of second kernel matrix block, the vector block value, the first scalar block value, the second scalar block value, and the weight residual block value and send the computed values to the main machine 1405, which receives the values at the operation 1655 and combines the values from each of the plurality of worker machines at the operation 1660 to obtain the intermediary matrix $(K_{rz}^T\Omega^{-1}K_{rz})$, the vector value $(K_{rz}^T\Omega^{-1}y_r)$, the first scalar value $(y_r y_r^T\Omega^{-1})$, the second scalar value $(y_r^T\Omega^{-1}r_\omega)$, and the weight residual value $(r_\omega)$. Using the intermediary matrix $(K_{rz}^T\Omega^{-1}K_{rz})$, the vector value $(K_{rz}^T\Omega^{-1}y_r)$, the first scalar value $(y_r y_r^T\Omega^{-1})$, the second scalar value $(y_r^T\Omega^{-1}r_\omega)$, and the weight residual value $(r_\omega)$, the main machine 1405 then solves Equation 26 and computes the values for the first set of variables, $\Delta\mu_z$ and $\Delta\beta$, from Equations 26-29 above.

At operation 1670, the main machine 1405 distributes the values of the first set of variables, $\Delta\mu_z$ and $\Delta\beta$, and the first scalar value $(y_r y_r^T\Omega^{-1})$, to each of the plurality of worker machines 1410. At operation 1675, in response to sending the values of the first set of variables, $\mu\mu_z$ and $\Delta\beta$, and the first scalar value $(y_r y_r^T\Omega^{-1})$, the main machine 1405 receives a second set of sub-results from each of the plurality of worker machines 1410. The second set of sub-results from each of the plurality of worker machines 1410 may include a step size value that is computed based on a second set of variables computed at each of the plurality of worker machines.

In particular, each of the plurality of worker machines 1410 may compute values of the second set of variables. In some embodiments, the second set of variables may include $\Delta\xi_i$, $\Delta\theta_i$, $\Delta\sigma_i$, and $\Delta\gamma_i$. Each worker machine, i, of the plurality of worker machines 1410 may compute values of these second set of variables. For example, each worker machine, i, of the plurality of worker machines 1410 may compute the value of $\Delta\gamma$ as follows:

$$\Delta\gamma = -\Omega^{-1}(r_\omega + K_{rz}\Delta\mu_z + y_r\Delta\beta) \quad \text{Equation 30}$$

Each worker machine, i, of the plurality of worker machines 1410 may compute the value of the search direction, $\Delta\xi$ as follows from Equations 18 and 20:

$$\Delta\xi = -\Sigma^{-1}\Xi(r_\xi + \Xi^{-1}r_\sigma - \Delta\gamma) \quad \text{Equation 31}$$

Each worker machine, i, of the plurality of worker machines 1410 may compute the value of $\Delta\theta$ and $\Delta\sigma$ as follows:

$$\Delta\theta = -\Gamma^{-1}(r_\gamma + \Theta\Delta\gamma) \quad \text{Equation 32}$$

$$\Delta\sigma = -\Xi^{-1}(r_\sigma + \Sigma\Delta\xi) \quad \text{Equation 33}$$

Upon computing the values of the second set of variables from Equations 30-33 above, each worker machine, i, of the plurality of worker machines 1410 may also compute the values of primal-dual step sizes. For example, each worker machine, i, of the plurality of worker machines 1410 may compute the primal step size value as follows:

$$\alpha_p^{max} = \min\left\{1, -\kappa \min_{j:\Delta\xi_j<0}\left\{\frac{\xi_j}{\Delta\xi_j}\right\}, -\kappa \min_{j:\Delta\theta_j<0}\left\{\frac{\theta_j}{\Delta\theta_j}\right\}\right\} \quad \text{Equation 34}$$

Each worker machine, i, of the plurality of worker machines 1410 may compute the dual step size value as follows:

$$\alpha_d^{max} = \min\left\{1, -\kappa \min_{j:\Delta\sigma_j<0}\left\{\frac{\sigma_j}{\Delta\sigma_j}\right\}, -\kappa \min_{j:\Delta\gamma_j<0}\left\{\frac{\gamma_j}{\Delta\gamma_j}\right\}\right\} \quad \text{Equation 35}$$

Each worker machine, i, of the plurality of worker machines 1410 may compute the primal and dual step size value using Equations 34 and 25 by using the fraction-to-the-boundary rule where $\kappa \in (0, 1)$. In some embodiments, $\kappa$ may be set to 0.99. In Equations 34 and 35, j is an index. For example, $\xi_j$ corresponds to the $j^{th}$ element of the vector associated with $\xi$.

Thus, at the operation 1675, the main machine 1405 receives the computed values of the second set of variables, $\Delta\xi_i$, $\Delta\theta_i$, $\Delta\sigma_i$, and $\Delta\gamma_i$, as well as the computed values of $\alpha_p^{max}$ and $\alpha_d^{max}$ from each of the plurality of worker machines 1410. At operation 1677, the main machine 1405 selects one step size value from all of the step size values received in the second set of sub-results at the operation 1675. In particular, the main machine 1405 may select one primal step value from all primal step size values received from the plurality of worker machines 1410 and one dual step size value from all of the dual step size values received from the plurality of worker machines. In some embodiments, the main machine 1405 may select the highest value from all of the received dual step size values as the selected dual step size value and the highest value from all of the received primal step size values as the selected primal step size value. In other embodiments, the main machine 1405 may select another value as the selected primal step size and the selected dual step value. In some embodiments, the main machine 1405 may compute an average (or another function) on the received primal and dual steps size values to select the dual step size and the primal step size value.

At operation 1680, the main machine 1405 sends the selected step size value to each of the plurality of worker machines 1410. In particular, the main machine 1405 sends the selected primal step size value and the selected dual step size value to each of the plurality of worker machines 1410. Responsive to receiving the selected dual step size value and the primal step size value, each of the plurality of worker machines 1410 computes updated values for each of the first set of variables and each of the second set of variables based on the values of the first set of variables, the values of the second set of variables, and the selected step size value. For example, each of the plurality of worker machines 1410 may compute updated values of the first set of variables, $\Delta\mu_z$ and $\Delta\beta$, and the second set of variables, $\Delta\xi_i$, $\Delta\theta_i$, $\Delta\sigma_i$, and $\Delta\gamma$; as follows:

$$\mu_z^+ = \mu_z + \alpha_p^{max}\Delta\mu_z \quad \text{Equation 36}$$

$$\beta^+ = \beta + \alpha_p^{max}\Delta\beta \quad \text{Equation 37}$$

$$\xi^+ = \xi + \alpha_p^{max}\Delta\xi \quad \text{Equation 38}$$

$$\theta^+ = \theta + \alpha_p^{max}\Delta\theta \quad \text{Equation 39}$$

$$\sigma^+ = \sigma + \alpha_d^{max}\Delta\sigma \quad \text{Equation 40}$$

$$\gamma^+ = \gamma + \alpha_d^{max}\Delta\gamma \quad \text{Equation 41}$$

In Equations 36-41 above, $\mu_z^+$ is the updated value of $\mu_z$, $\beta^+$ is the updated value of $\beta$, $\xi^+$ is the updated value of $\xi$, $\theta^+$ is the updated value of $\theta$, $\sigma^+$ is the updated value of $\sigma$, and $\gamma^+$ is the updated value of $\gamma$. Further, in Equations 36-41 above, the $\alpha_p^{max}$ value is the selected primal step size value selected at the operation 1677 and $\alpha_d^{max}$ value is the selected dual step size value selected at the operation 1677.

At operation 1681, the main machine 1405 receives the updated values of the first set of variables and updated values of the second set of variables computed by each of the plurality of worker machines 1410. At operation 1683, the processor of the main machine 1405 receives a maximum residual error value computed by each of the plurality of worker machines 1410 based on the first kernel matrix, the updated values of the first set of variables, and the updated values of the second set of variables. In some embodiments, each of the plurality of worker machines 1410 computes the values of $r_{\mu_z}$, $r_\beta$, $r_\xi$, $r_\theta$, $r_\sigma$, and $r_\gamma$ using Equations 10-15. Each of the plurality of worker machines 1410 may also compute an infinity norm of each of the residual values $r_{\mu_z}$, $r_\beta$, $r_\xi$, $r_\theta$, $r_\sigma$, and $r_\gamma$. Each of the plurality of worker machines 1410 may then send their computed residual values $r_{\mu_z}$, $r_\beta$, $r_\xi$, $r_\theta$, $r_\sigma$, and $r_\gamma$ and the computed infinity norm, to the main machine 1405. Upon receiving these values, the processor on the main machine 1405 may check, based on these values, if Equations 42 and 43 below are satisfied.

At operation 1686, the processor of the main machine 1405 selects a maximum value from all of the maximum residual error values received from the plurality of worker machines 1410 at the operation 1683. The main machine 1405 may then use the selected maximum value to determine if an optimal solution to Equation 26 has been found. The values of $\Delta\mu_z$ and $\Delta\beta$ at which the optimal solution to Equation 26 is found are determined to be the optimal values of the weight $\Delta\mu_z$ and bias $\Delta\beta$. Thus, at operation 1689, the processor determines if the selected maximum value satisfies an optimality condition. In some embodiments, the optimality condition is satisfied when the variables $\mu_z$, $\beta$, $\xi$, $\theta$, $\gamma$, and $\sigma$ satisfy Equations 42 and 43 below:

$$\|r\|_\infty \le \varepsilon \quad \text{Equation 42}$$

$$\frac{\sigma^T\xi + \gamma^T\theta}{nobs} \le \varepsilon \quad \text{Equation 43}$$

In Equations 42 and 43 above, r is the selected maximum value at the operation 1686 from all of the maximum residual error values received from the plurality of worker machines 1410 at the operation 1683 and $\varepsilon$ is a constant or threshold value that may be predefined to a suitable value, for example, $\varepsilon = 10^{-3}$. In other embodiments, other values of $\varepsilon$ may be used. The $\mu_z$, $\beta$, $\xi$, $\theta$, $\gamma$, and $\sigma$ satisfy Equations 42 and 43 when $\varepsilon > 0$ and $r = (r_{\mu_z}, r_\beta, r_\xi, r_\theta)$. In some embodiments, each of the plurality of worker machines 1410 may compute the value of $$\frac{\sigma^T\xi + \gamma^T\theta}{nobs}$$

from Equation 43 in parallel and send the computed value to the main machine 1405.

If the processor determines that the above conditions are satisfied, the process 1600 proceeds to operation 1692 where the processor outputs the $\mu_z^+$ value and the $\beta^+$ value from Equations 36 and 37, respectively, as the respective optimal values of $\mu_z$ and $\beta$. On the other hand, if the processor determines that the selected maximum value at the operation 1686 from all of the maximum residual error values received from the plurality of worker machines 1410 at the operation 1683 does not satisfy Equations 42 and 43, the process 1600 proceeds to operation 1698 where the processor distributes the updated values of the first set of variables and the updated values of the second set of variables computed using Equations 36-41 to each of the plurality of worker machines 1410 and repeats the training process by looping back to the operation 1650.

Once the optimal values of $\mu_z$ and $\beta$ are found, at operation 1695, the processor uses those values to predict a label of each of a fourth plurality of observation vectors included in test data to classify the fourth plurality of observation vectors.

Figure 17:
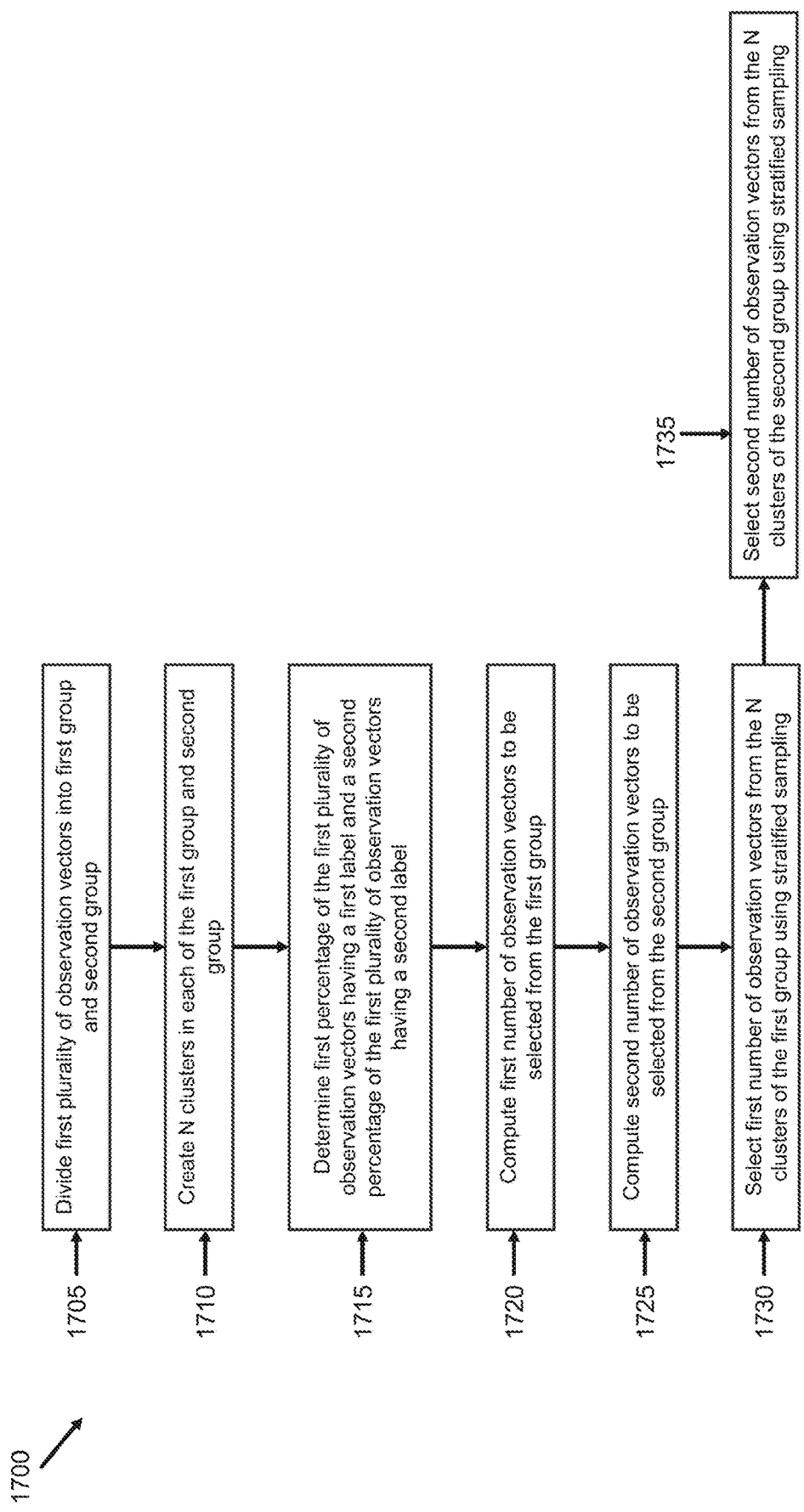
FIG. 17 illustrates a flowchart showing an example process for selecting a support vector subset used in the process of FIG. 16, according to embodiments of the present technology.

Referring to FIG. 17, an example flowchart outlining operations of a process 1700 is shown, in accordance with some embodiments of the present disclosure. The process 1700 may be used to select the support vector subset at the operation 1620. The operations of the process 1700 may be performed on the main machine 1405. The process 1700 may be executed by one or more processors (e.g., the processor 1530) associated with the classifier application 1535 on the main machine 1405. In particular, one or more processors may execute computer-readable instructions (e.g., the classifier computer-readable instructions 1545) to select the support vector subset. The process 1700 may include other or additional operations depending upon the embodiment.

At operation 1705, the processor divides the first plurality of observation vectors into a first group and a second group. The first plurality of observation vectors include the training the data, $X_r$. Thus, the processor divides all of the training data into a first group and a second group. In some embodiments, the processor may divide the training data into a greater number of groups. In general, the number of groups may be dependent upon the number of different classes (e.g., different values of labels) of the observation vectors. For a binary classification (e.g., where a label has one of two values), the training data may be divided into two groups. Where the label may assume one of three values, the training data may be divided into three groups, and so on. Assuming binary classification such that the training data is divided into the first group and the second group, all observation vectors in the first group have a first label and all observation vectors in the second group have a second label. For example, if the label values are −1 and +1, then all observation vectors in the training data that have a −1 label are in the first group and all observation vectors in the training data that have a +1 label are in the second group.

At operation 1710, the processor creates N clusters from the observation vectors in each of the first group and the second group. In some embodiments, N may be a predefined value (e.g., 10). For example, if N=10, the processor may further divide the observation vectors in the first group into 10 clusters and divide the observation vectors in the second group into 10 clusters. In some embodiments, each cluster may have an equal (or substantially equal) number of observation vectors. For example, if the first group has 100,000 observation vectors and N=10, each cluster in the first group may have 10,000 observation vectors.

At operation 1715, the processor determines a first percentage of the first plurality of observation vectors having the first label and a second percentage of the first plurality of observation vectors having the second label. In some embodiments, the support vector subset is desired to have the same mix or percentage of the labels as in the original training data. For example, if there are 60%−1 labels in the training data and 40%+1 labels in the training data, the support vector subset may be desired to have observation vectors with the same percentage of labels. Thus, at the operation 1715, the processor determines the percentage of the first label in the training data and the percentage of the second label in the training data. In some embodiments, the processor may determine the percentage by determining a first total number of observation vectors that have the first label in the training data and a second total number of observation vectors that have the second label in the training data. The processor may then divide the first number by the total number of observation vectors in the training data and multiply the result by 100 to obtain the first percentage. The processor may similarly divide the second number by the total number of observation vectors in the training data and multiply the result by 100 to obtain the second percentage.

At operation 1720, the processor computes a first number of observation vectors to be selected from the N clusters of the first group based on the first percentage and a predefined size of the support vector subset. For example, if there are 100,000 observation vectors in the first group and the first percentage is 40%, the processor may determine that (40/100)*100,000=40,000 observation vectors are to be selected from the first group. Further, assuming N=10, the processor may determine that 40,000/10=4,000 observation vectors are to be selected from each cluster of the first group.

At operation 1725, the processor computes a second number of observation vectors to be selected from the N clusters of the second group based on the second percentage and the predefined size of the support vector subset. For example, if there are 100,000 observation vectors in the second group and the second percentage is 60%, the processor may determine that (60/100)*100,000=60,000 observation vectors are to be selected from the first group. Further, assuming N=10, the processor may determine that 60,000/10=6,000 observation vectors are to be selected from each cluster of the second group.

At operation 1730, the processor selects the first number of observation vectors from the N clusters in the first group and at operation 1735, the processor selects the second number of observation vectors from the N clusters in the second group to form the third plurality of observation vectors in the support vector subset. In some embodiments, to select the first number of observation vectors from the first group and to select the second number of observation vectors from the second group, the processor may perform a stratified sampling in each of the N clusters in each of the first group and the second group. In other embodiments, to select the first number of observation vectors from the first group and to select the second number of observation vectors from the second group, the processor may perform a random sampling in each of the N clusters in each of the first group and the second group. In other embodiments, the processor may use other sampling techniques to select the first number of observation vectors and the second number of observation vectors.

Figure 18:
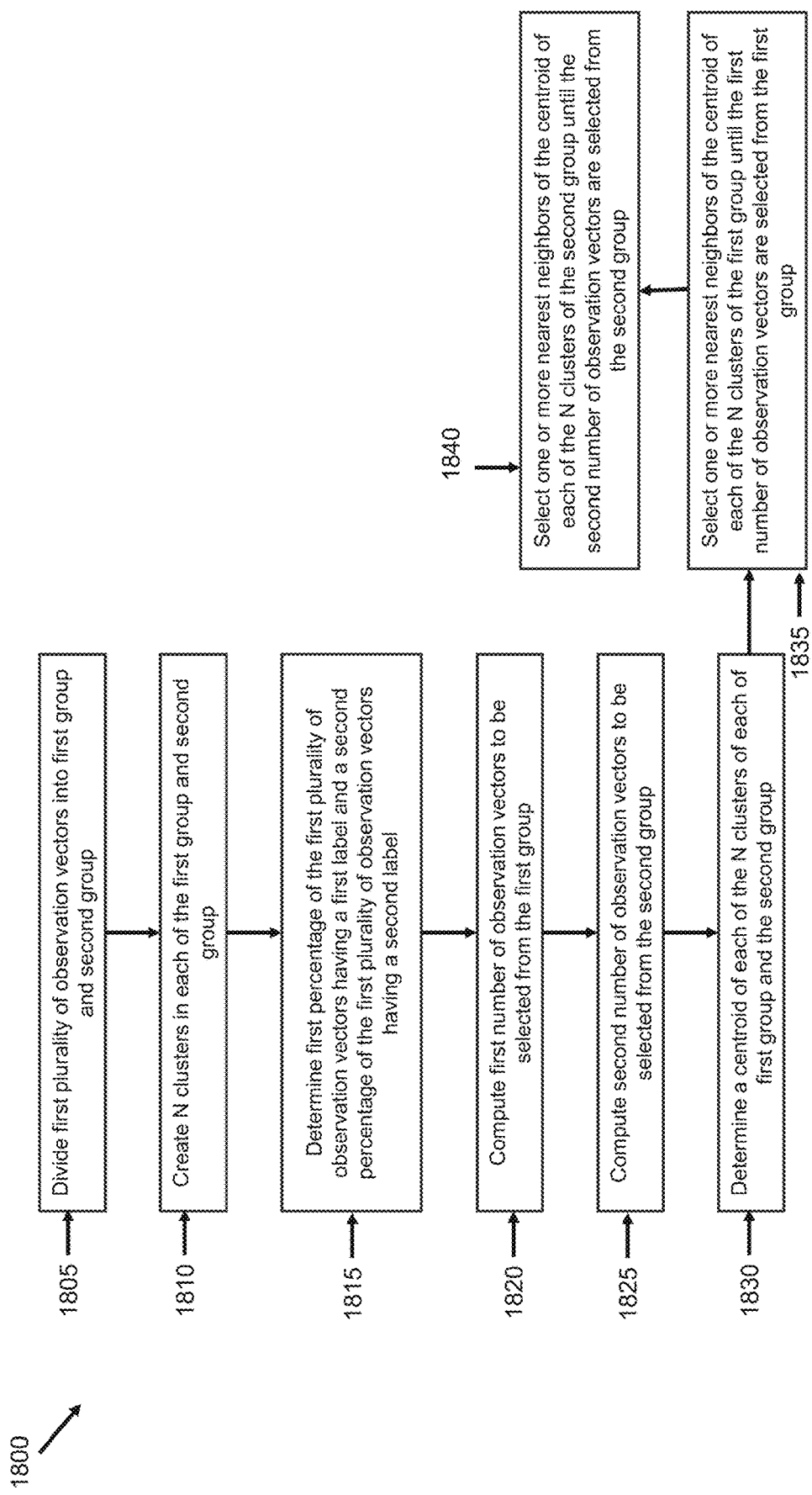
FIG. 18 illustrates a flowchart showing another example process for selecting a support vector subset used in the process of FIG. 16, according to embodiments of the present technology.

Referring to FIG. 18, an example flowchart outlining operations of a process 1800 is shown, in accordance with some embodiments of the present disclosure. The process 1800 may be used to select the support vector subset at the operation 1620. The operations of the process 1800 may be performed on the main machine 1405. The process 1800 may be executed by one or more processors (e.g., the processor 1530) associated with the classifier application 1535 on the main machine 1405. In particular, one or more processors may execute computer-readable instructions (e.g., the classifier computer-readable instructions 1545) to select the support vector subset. The process 1800 may include other or additional operations depending upon the embodiment.

At operation 1805, the processor divides the first plurality of observation vectors into a first group and a second group, as discussed above at the operation 1705. At operation 1810, the processor creates N clusters from the observation vectors in each of the first group and the second group, as discussed above at the operation 1710. At operation 1815, the processor determines a first percentage of the first plurality of observation vectors having the first label and a second percentage of the first plurality of observation vectors having the second label, as discussed above at the operation 1715. At operation 1820, the processor computes a first number of observation vectors to be selected from the N clusters of the first group based on the first percentage and a predefined size of the support vector subset, as discussed above at the operation 1720. At operation 1825, the processor computes a second number of observation vectors to be selected from the N clusters of the second group based on the second percentage and the predefined size of the support vector subset, as discussed above at the operation 1725.

At operation 1830, the processor determines a centroid of each of the N clusters of each of the first group and the second group. In some embodiments, the processor may determine the centroid using a KCLUS Procedure provided by SAS Institute Inc. of Cary, North Carolina. The KCLUS Procedure uses a k-means algorithm to perform cluster analysis on the basis of distances computed from one or more variables to find the centroid. Additional details of the KCLUS Procedure may be found in Chapter 10 of the "SAS® Viya™ Data Mining and Machine Learning Procedures Guide," the entirety of which is incorporated by reference herein. In other embodiments, the processor may determine the centroid using other procedures or mechanisms.

At operation 1835, the processor selects one or more nearest neighbors of the centroid of each of the N clusters of the first group until the first number of observation vectors are selected from the first group. At operation 1840, the processor selects one or more nearest neighbors of the centroid of each of the N clusters of the second group until the second number of observation vectors are selected from the second group. In some embodiments, the processor may select the one or more nearest neighbors using a topK Action Set provided by SAS Institute Inc. of Cary, North Carolina. The topK Action Set returns the top-K and bottom-K distinct values of each variable included in a variable list based on a user-specified ranking order. Additional details of the topK Action Set may be found in the "SAS Visual Analytics Programming Guide," the entirety of which is incorporated by reference herein. In some embodiments, the processor may determine how many nearest neighbors of the centroid to select based on the number of observation vectors to be selected from each cluster. For example, if 4000 observation vectors are to be selected from a cluster, the processor may identify 4000 nearest neighbors of the centroid in that cluster. In other embodiments, the processor may use other mechanisms or procedures to select the one or more nearest neighbors.

Figure 19:
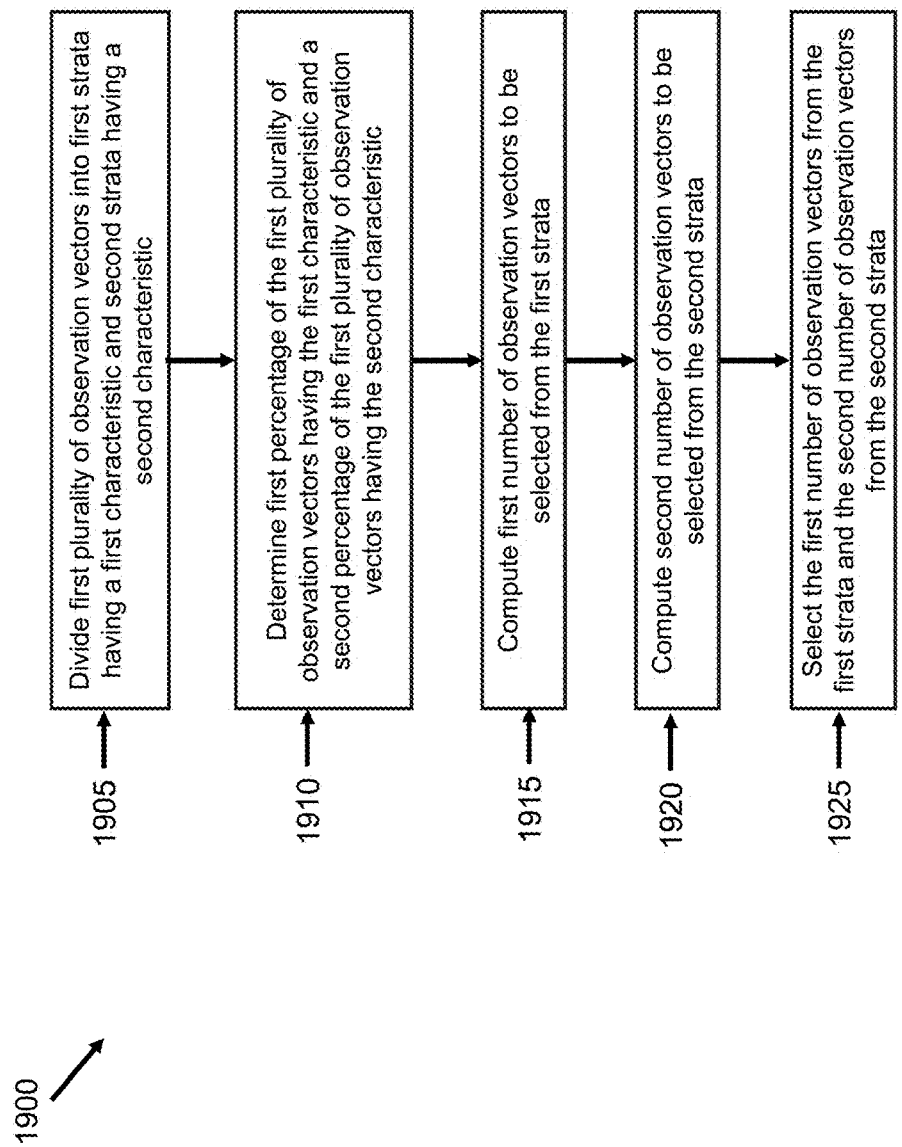
FIG. 19 illustrates a flowchart showing another example process for selecting a support vector subset used in the process of FIG. 16, according to embodiments of the present technology.

Referring to FIG. 19, an example flowchart outlining operations of a process 1900 is shown, in accordance with some embodiments of the present disclosure. The process 1900 may be used to select the support vector subset at the operation 1620. The operations of the process 1900 may be performed on the main machine 1405. The process 1900 may be executed by one or more processors (e.g., the processor 1530) associated with the classifier application 1535 on the main machine 1405. In particular, one or more processors may execute computer-readable instructions (e.g., the classifier computer-readable instructions 1545) to select the support vector subset. The process 1900 may include other or additional operations depending upon the embodiment.

At operation 1705, the processor divides the first plurality of observation vectors into a first strata and a second strata. The first plurality of observation vectors includes the training the data, $X_t$. Thus, the processor divides all of the training data into a first strata and a second strata. In some embodiments, the processor may divide the training data into a greater number of strata. In general, the number of strata may be dependent upon the number of different characteristics by which the observation vectors are desired to be sampled. For two characteristics, the training data may be divided into two strata. For three characteristics, the training data may be divided into three strata, and so on. The characteristics may be any desired characteristics observed in the observation vectors. In some embodiments, the characteristics may be the label associated with each observation vector. In some embodiments, the characteristics may be the age, name, address, zip code, gender, amount, color, population, or any other suitable indicia by which the observation vectors are desired to be sampled. All observation vectors in the first strata have a first characteristic and all observation vectors in the second strata have a second characteristic.

At operation 1910, the processor determines a first percentage of the first plurality of observation vectors having the first characteristic and a second percentage of the first plurality of observation vectors having the second characteristic. The operation 1910 is similar to the operation 1715 using characteristics instead of labels. At operation 1915, the processor computes a first number of observation vectors to be selected from the first strata based on the first percentage and a predefined size of the support vector subset, similar to the operation 1720 using characteristics instead of labels. At operation 1920, the processor computes a second number of observation vectors to be selected from the second strata based on the second percentage and the predefined size of the support vector subset, similar to the operation 1725 using characteristics instead of labels.

At operation 1925, the processor selects the first number of observation vectors from the first strata and the second number of observation vectors from the second strata to form the third plurality of observation vectors in the support vector subset, similar to the operations 1730 and 1735, using characteristics instead of labels.

Figure 20:
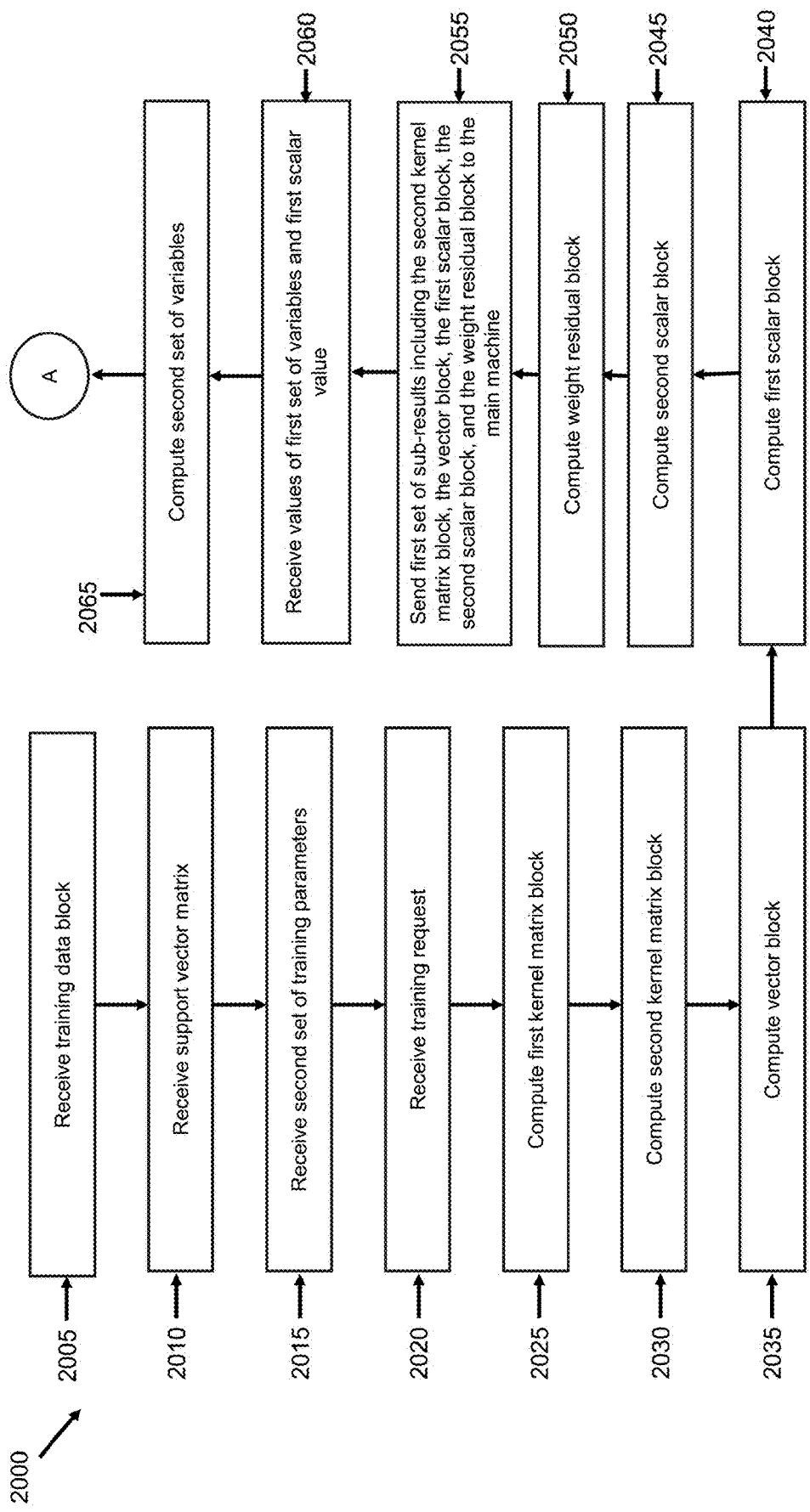
FIG. 20 illustrates a flowchart showing an example process performed by a worker machine of the distributed computing system of FIG. 15 for training a non-linear SVM for classification purposes, according to embodiments of the present technology.
Figure 20:
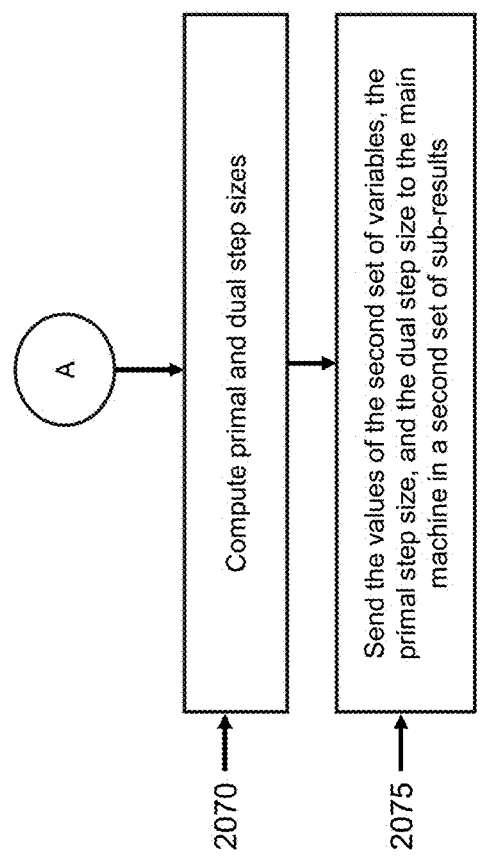

Turning now to FIG. 20, an example flowchart outlining operations of a process 2000 is shown, in accordance with some embodiments of the present disclosure. The process 2000 may be used to train the SVM model 1555. In particular, the process 2000 may be used to identify optimal weight and bias values for the SVM Model 1555. The operations of the process 2000 may be performed on each of the plurality of worker machines 1410. The process 2000 may be executed by one or more processors (e.g., the processor 1530) associated with the classifier application 1535 on each of the plurality of worker machines 1410. In particular, one or more processors of each of the plurality of worker machines 1410 may execute computer-readable instructions (e.g., the classifier computer-readable instructions 1545) to train the SVM model 1555. The process 2000 may include other or additional operations depending upon the embodiment. In some embodiments, each of the plurality of worker machines 1410 may perform the operations of the process 2000 in parallel responsive to receiving commands and/or data from the main machine 1405 during execution of the process 1600. The description below is with respect to one worker machine. However, all of the plurality of worker machines 1410 perform the same operations in parallel.

At operation 2005, the processor (e.g., of the worker machine) receives the training data block sent by the main machine 1405 at the operation 1630. At operation 2010, the processor receives the support vector matrix sent by the main machine 1405 at the operation 1635. At operation 2015, the processor receives the second set of training parameters sent by the main machine at the operation 1640. At operation 2020, the processor receives the training request sent by the main machine 1405 at the operation 1650.

Responsive to receiving the training request at the operation 2020, at operation 2025, the processor computes a first kernel matrix block. In some embodiments, the processor may compute the first kernel matrix block using the RBF kernel function:

$$K(x, y) = \exp\left(\frac{-\|x-y\|^2}{2\rho^2}\right)$$ Equation 44

In Equation 44 above, $K(x, y)$ is the first kernel matrix block, $K_{rz}$, x is an observation vector from the training data block received at the operation 2005, y is an observation block from the support vector matrix received at the operation 2010, and p is a kernel parameter greater than 0. Thus, each of the plurality of worker machines 1410 computes the first kernel matrix block:

$$(K_{rz})_i \triangleq K(X_i, X_z) \in R^{nlocal_i \times n_z}, i=1, \ldots p$$ Equation 45

In Equation 45 above, $(K_{rz})_i$ is the first kernel matrix block, $K_{rz}$ computed on worker machine, i using kernel function $K(X_i, X_z)$, $X_i$ is an observation vector from the training data block, $X_z$ is an observation vector from the support vector matrix, $nlocal_i$ is the number of observation vectors on worker machine i, $n_z$ is the size of the support vector subset, and p is the total number of worker machines. In some embodiments, forming the kernel matrix blocks may be efficiently performed on each of the plurality of worker machines 1410 by using a cache-efficient distance matrix computation.

At operation 2030, the processor computes a second kernel matrix block. The second kernel matrix block may be the $(K_{rz})_i^T \Omega_i^{-1} (K_{rz})_i$ value from Equation 27 computed on worker machine, i. To compute the second kernel matrix block, the processor may use the first kernel matrix block, $K_{rz}$, computed at the operation 2025. The processor may also compute the matrix, $\Omega$, using Equation 24. From the matrix, $\Omega$, the processor on each worker machine i may compute the matrix block, $\Omega^{-1}$ such that the matrix block $\Omega^{-1}$ may be:

$$\Omega^{-1} = \begin{pmatrix} \Omega_1^{-1} & \cdots & \cdots & \cdots \\ \cdots & \Omega_2^{-1} & \cdots & \cdots \\ \cdots & \cdots & \cdots & \cdots \\ \cdots & \cdots & \cdots & \Omega_p^{-1} \end{pmatrix}, \text{ for all } i = 1, 2, \ldots p$$

At operation 2035, the processor computes a value of a vector block. The vector block value may be the $(K_{rz})_i^T \Omega_i^{-1} y_{r_i}$ from Equation 28 computed on worker machine, i. At operation 2040, the processor computes the value of a first scalar block. The first scalar block value may be the $y_{r_i} y_{r_i}^T \Omega_i^{-1}$ value from Equation 27 computed on worker machine, i. At operation 2045, the processor computes the value of a second scalar block. The second scalar block value may be the $y_{r_i}^T \Omega_i^{-1} r_{\omega_i}$ value from Equation 28 computed on worker machine, i. At operation 2045, the processor computes the value of a weight residual block. The weight residual value may be the $r_{\omega_i}$ value from Equation 28 computed on worker machine, i.

At operation 2055, the processor sends a first set of sub-results to the main machine 1405. The first set of sub-results include the values computed at the operations 2020-2050. The main machine 1405 receives the first set of sub-results at the operation 1655. At operation 2060, the processor receives values of the first set of variables and the first scalar value sent by the main machine 1405 at the operation 1670. At operation 2065, the processor computes values of the second set of variables and at operation 2070, the processor computes the primal and dual step size values. The second set of variables include the values of $\Delta\xi_i$, $\Delta\theta_i$, $\Delta\sigma_i$, and $\Delta\gamma_i$ computed using Equations 30-33. The primal and dual step size values include values of $\alpha_p^{max}$ and $\alpha_d^{max}$ computed using Equations 34 and 35. At operation 2075, the processor sends a second set of sub-results to the main machine 1405, which receives these results at the operation 1675. The second set of sub-results include the values computed at the operations 2065 and 2070.

Figure 21:
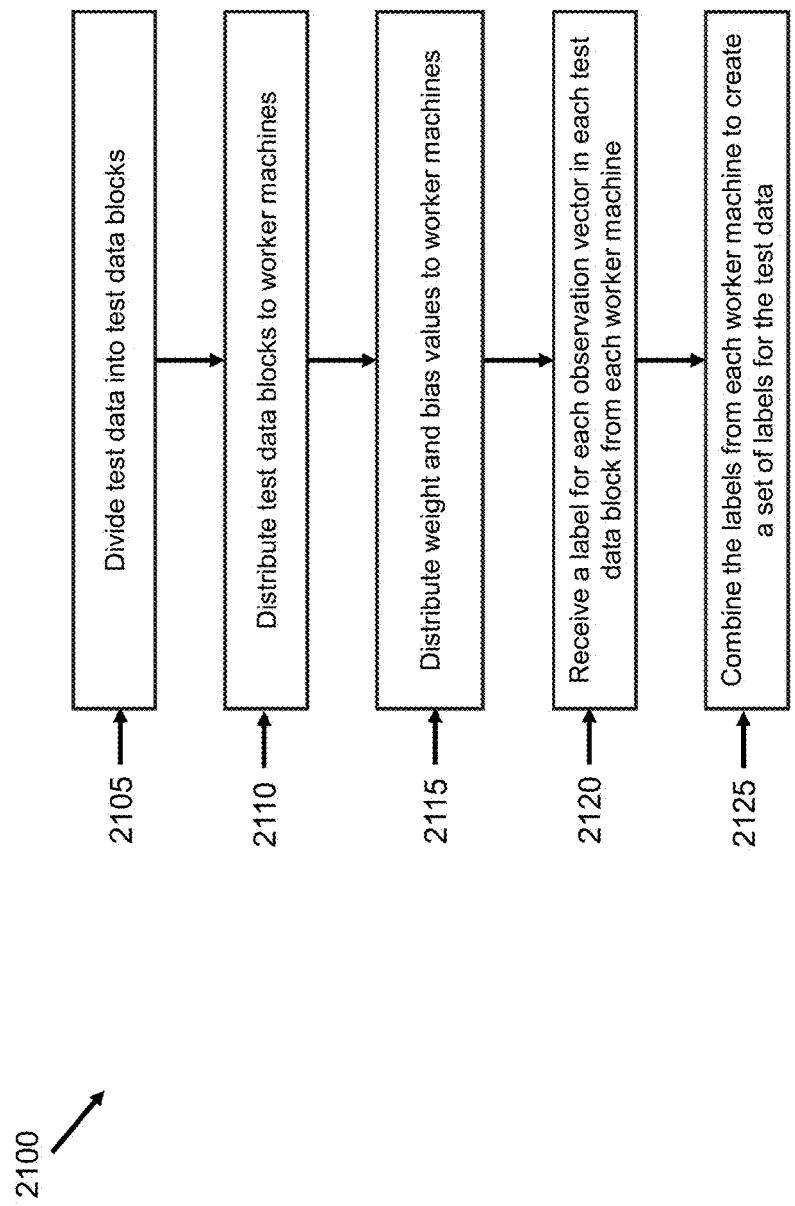
FIG. 21 illustrates a flowchart showing an example process performed by a main machine of the distributed computing system of FIG. 15 for classifying a dataset, according to embodiments of the present technology.

Turning to FIG. 21, an example flowchart outlining operations of a process 2100 is shown, in accordance with some embodiments of the present disclosure. The process 2100 may be used to classify data using the SVM model 1555 that has been trained using the processes 1600-2000. The operations of the process 2100 may be performed on the main machine 1405. The process 2100 may be executed by one or more processors (e.g., the processor 1530) associated with the classifier application 1535 on the main machine 1405. In particular, one or more processors of the main machine 1405 may execute computer-readable instructions (e.g., the classifier computer-readable instructions 1545) to classify data using the trained SVM model 1555. The process 2100 may include other or additional operations depending upon the embodiment.

At operation 2105, the processor divides the test data into P test data blocks. P may be the number of the plurality of worker machines 1410. Thus, if there are 10 worker machines, the test data may be divided into 10 test data blocks. Each of the P test data blocks includes a fourth plurality of observation vectors. The operation 2105 is similar to the operation 1615 but using test data instead of training data. At operation 2110, the processor distributes each of the P test data blocks to one of the plurality of worker machines 1410. Thus, each test data block is sent to one worker machine. At operation 2115, the processor distributes the weight value and the bias value to each of the plurality of worker machines 1410. In particular, the processor sends the weight value and the bias value from the operation 1692 to each of the plurality of worker machines 1410 such that each worker machine has the same weight and bias values.

At operation 2120, the processor receives a label for each of the fourth plurality of observation vectors from each of the plurality of worker machine. At operation 2125, the processor combines the label for each of the fifth plurality of observation vectors from each of the plurality of worker machines 1410 to obtain the set of labels for the fourth plurality of observation vectors. In some embodiments, the main machine 1405 may combine the labels by appending the labels from each of the plurality of worker machines 1410 one after another. In other embodiments, the main machine 1405 may combine the labels in another way.

Figure 22:
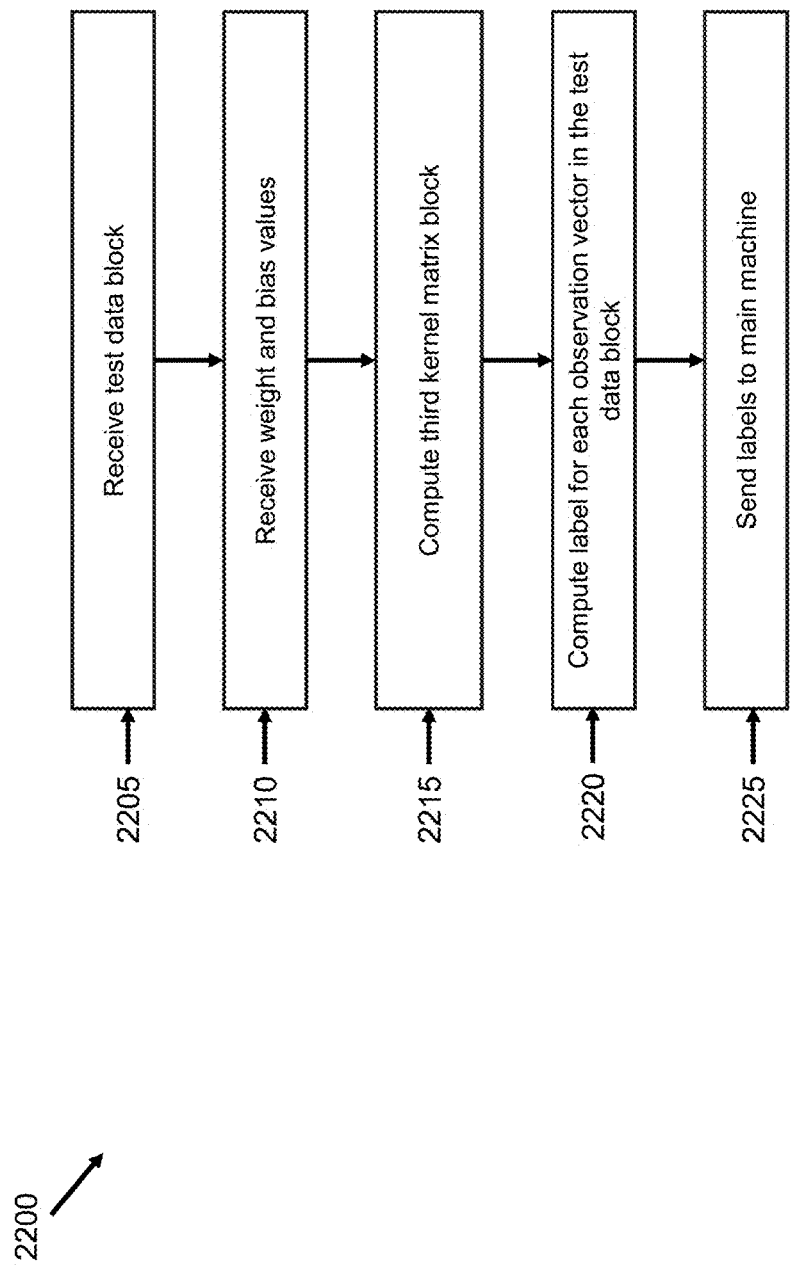
FIG. 22 illustrates a flowchart showing an example process performed by a worker machine of the distributed computing system of FIG. 15 for classifying a dataset, according to embodiments of the present technology.

Turning now to FIG. 22, an example flowchart outlining operations of a process 2200 is shown, in accordance with some embodiments of the present disclosure. The process 2200 may be used to classify data using the SVM model 1555 that has been trained using the processes 1600-2000. The operations of the process 2200 may be performed on each of the plurality of worker machines 1410. The process 2200 may be executed by one or more processors (e.g., the processor 1530) associated with the classifier application 1535 on each of the plurality of worker machines 1410. In particular, one or more processors of each of the plurality of worker machines 1410 may execute computer-readable instructions (e.g., the classifier computer-readable instructions 1545) to classify data using the trained SVM model 1555. The process 2200 may include other or additional operations depending upon the embodiment. In some embodiments, each of the plurality of worker machines 1410 may perform the operations of the process 2200 in parallel responsive to receiving commands and/or data from the main machine 1405 during execution of the process 2100. The description below is with respect to one worker machine. However, all of the plurality of worker machines 1410 perform the same operations in parallel.

At operation 2205, the processor receives the test data block sent by the main machine 1405 at the operation 2110. At operation 2210, the processor receives the weight and bias values sent by the main machine 1405 at the operation 2115. At operation 2215, the processor computes a third kernel matrix block using the kernel function (e.g., RBF kernel function) applied to the third plurality of observation vectors and the fourth plurality of observation vectors. For example, the processor may compute the third kernel matrix block using:

$$K(x, y) = \exp\left(\frac{-\|x-y\|^2}{2\rho^2}\right) \quad \text{Equation 46}$$

In Equation 46 above, $K(x, y)$ is the third kernel matrix block, $K_{ez}$, x is an observation vector from the test data block received at the operation 2205, y is an observation block from the support vector matrix received at the operation 16335, and p is a kernel parameter greater than 0.

At operation 2220, the processor computes the label for each of the fifth plurality of observation vectors using:

$$y_e = \text{sign}((K_{ez})\mu_z + \beta) \quad \text{Equation 47}$$

In Equation 47 above, $y_e$ is the label for each of the fifth plurality of observation vectors, $K_{ez}$ is the third kernel matrix block computed at the operation 2215, $\mu_z$ is the weight value received at the operation 2210, and $\beta$ is the bias value received at the operation 2210.

At operation 2225, the processor sends the computed labels to the main machine 1405, which receives the labels at the operation 2120.

Turning now to FIGS. 23-34, example results of various experiments conducted by the inventors are shown, in accordance with some embodiments of the present disclosure. Referring specifically to FIG. 23, an example table listing example benchmark datasets used by the inventors in the various experiments are shown, in accordance with some embodiments of the present disclosure. Thus, as shown in FIG. 23, the benchmark datasets include an adult dataset 2300, a fashion mnist dataset 2305, a covtype dataset 2310, a suzy dataset 2315, a higgs dataset 2320, and an allstate dataset 2325. These data sets are based on real-world applications. The number of observation vectors (e.g., the first plurality of observation vectors) in the training data for each dataset are shown in the "training size" column, the number of observation vectors in the test data (e.g., the test data of the operation 2105) for each dataset are shown in the "testing size" column, the number of variables in each observation vector are shown in the "#features" column, and the number of classes are shown in the "#classes" column. Because the number of classes is two, each of the datasets include a binary label classification. The fashion nmist dataset 2305 was converted to binary classification by classifying round digits (0, 3, 6, 8, 9) versus non-round digits (1, 2, 4, 5, 7). All training data was scaled to mean 0 and standard deviation 1. The testing data was similarly scaled. The hyperparameters for each the SVM model 1555 were selected through a 10-fold cross validation. For datasets with more than four million observation vectors, default parameters were used in place of k-fold cross validation. In some embodiments, the suzy dataset 2315, the higgs dataset 2320 and the allstate dataset 2325 may be considered large-scale datasets due to the number of observation vectors in those datasets. The adult dataset 2300 and the fashion nmist dataset 2305 may be considered small datasets and the covtype dataset 2310 may be considered a medium dataset. For purposes of this application, a dataset having less than 100,000 observation vectors may be considered a small dataset, a dataset having between 100,000 and 1,000,000 observation vectors may be considered a medium dataset, and a dataset having over 1 million observation vectors may be considered a large-scale dataset.

Figure 24A:
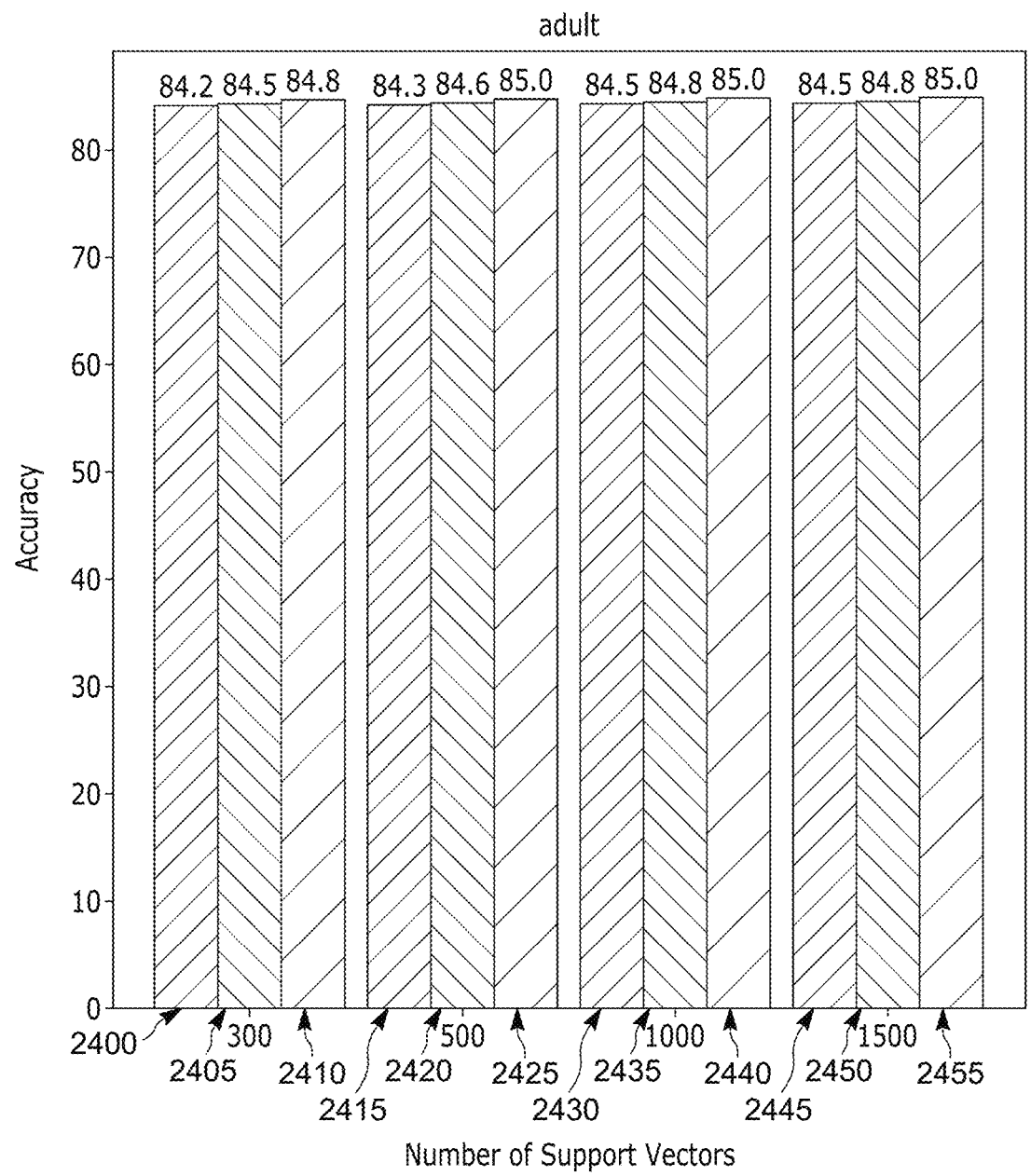
FIGS. 24A and 24B illustrate example graphs showing comparative data generated from a first dataset showing impact of sampling techniques, according to embodiments of the present technology.
Figure 24B:
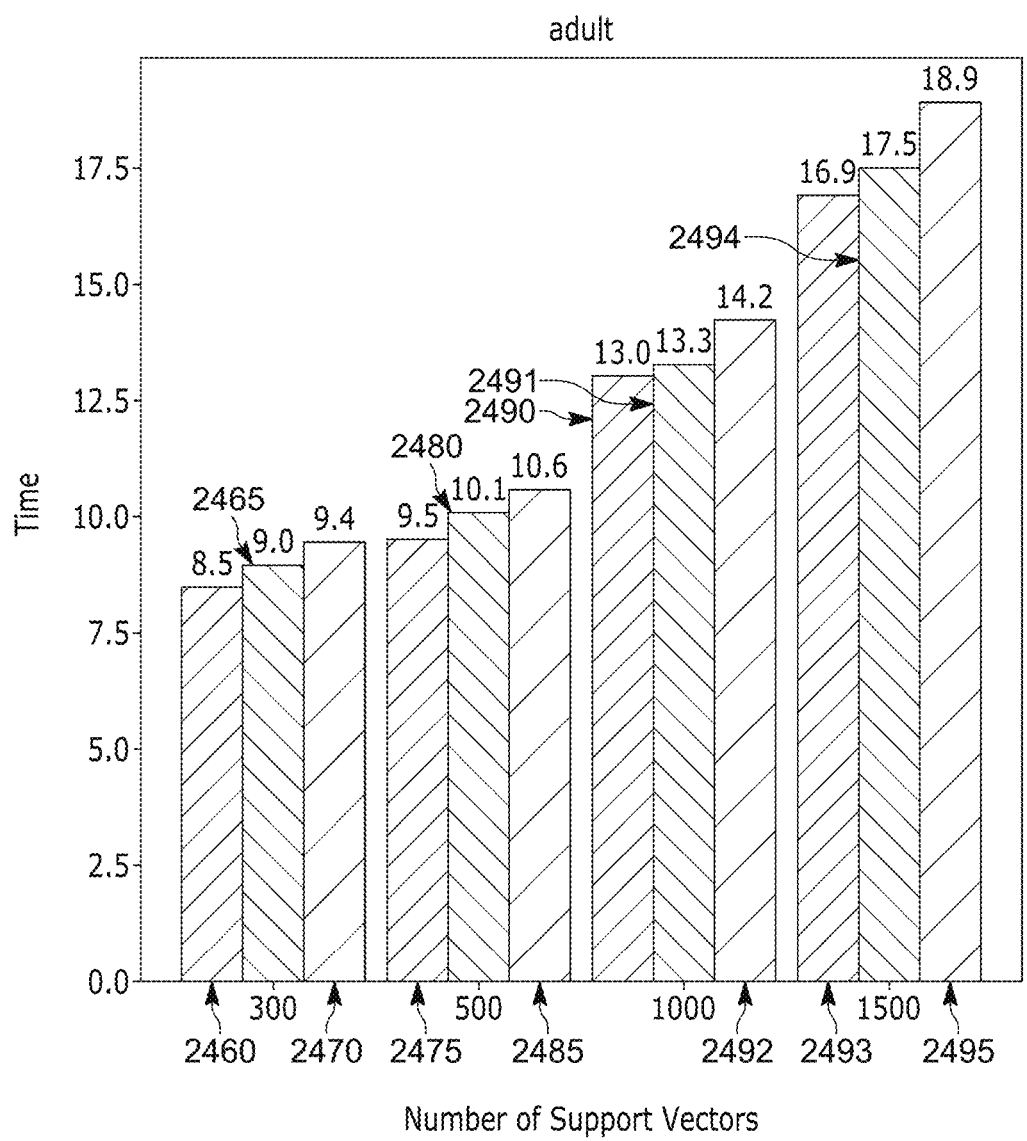
Figure 25A:
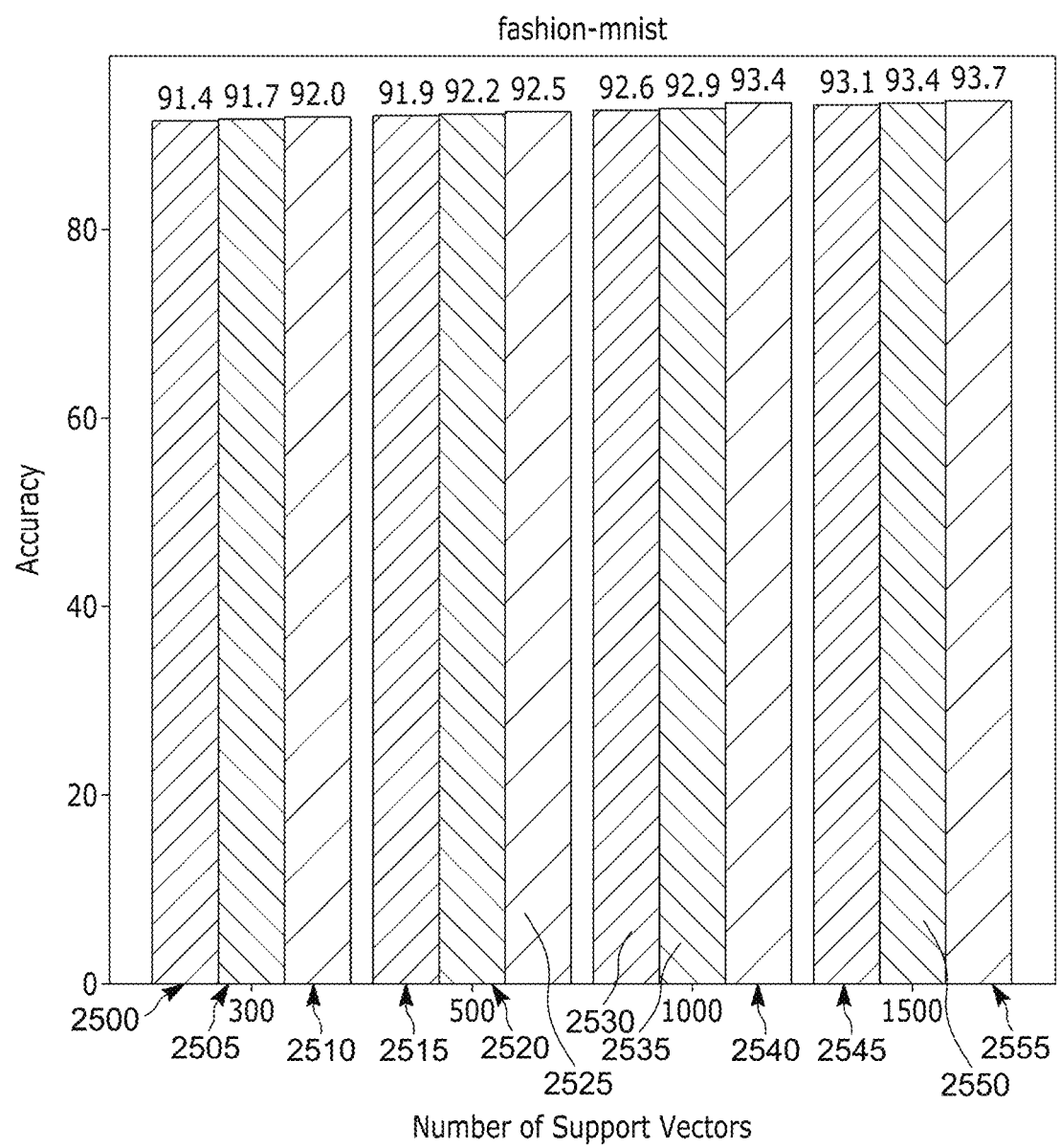
FIGS. 25A and 25B illustrate example graphs showing comparative data generated from a second dataset showing impact of sampling techniques, according to embodiments of the present technology.
Figure 25B:
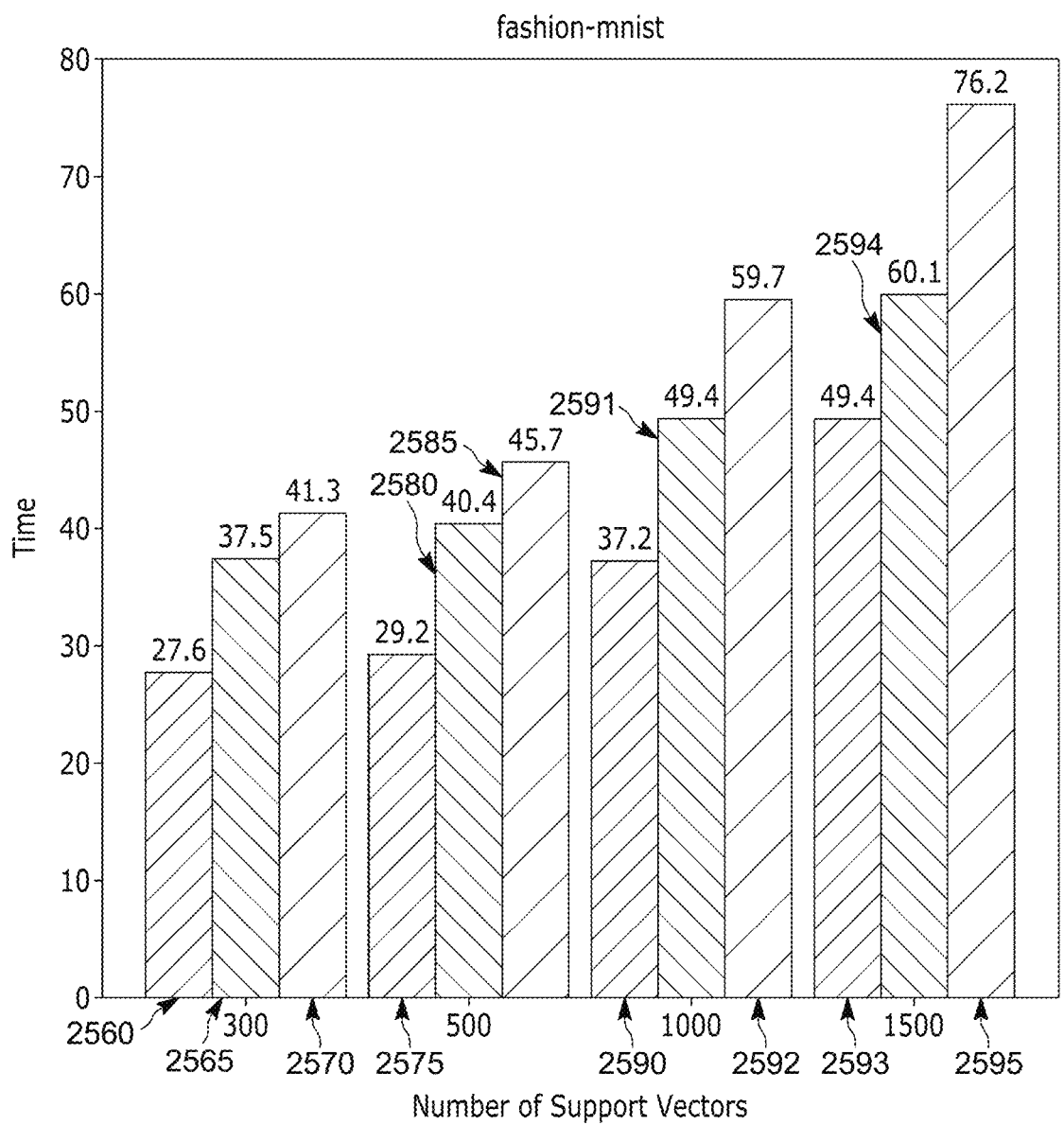
Figure 26A:
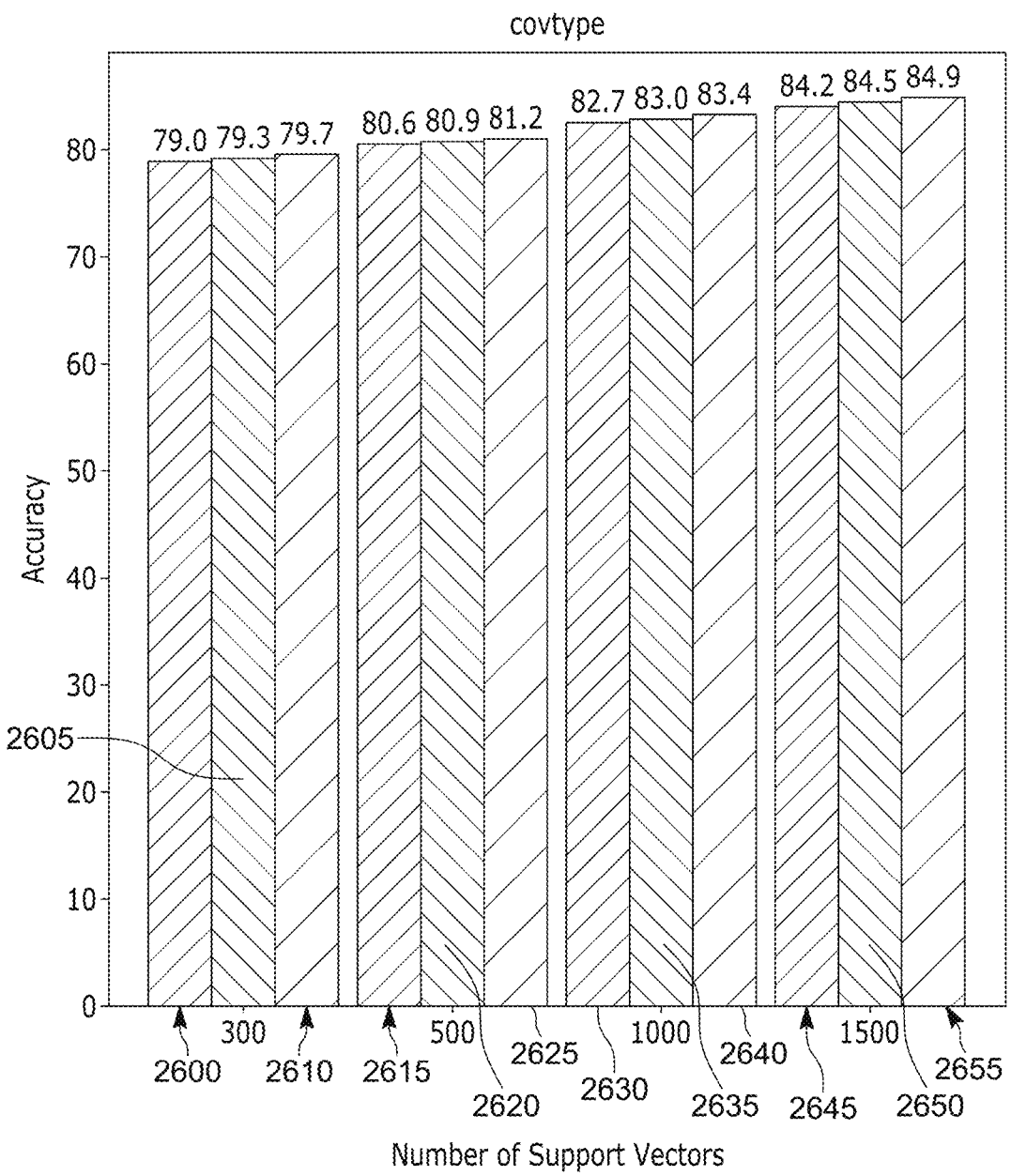
FIGS. 26A and 26B illustrate example graphs showing comparative data generated from a third dataset showing impact of sampling techniques, according to embodiments of the present technology.
Figure 26B:
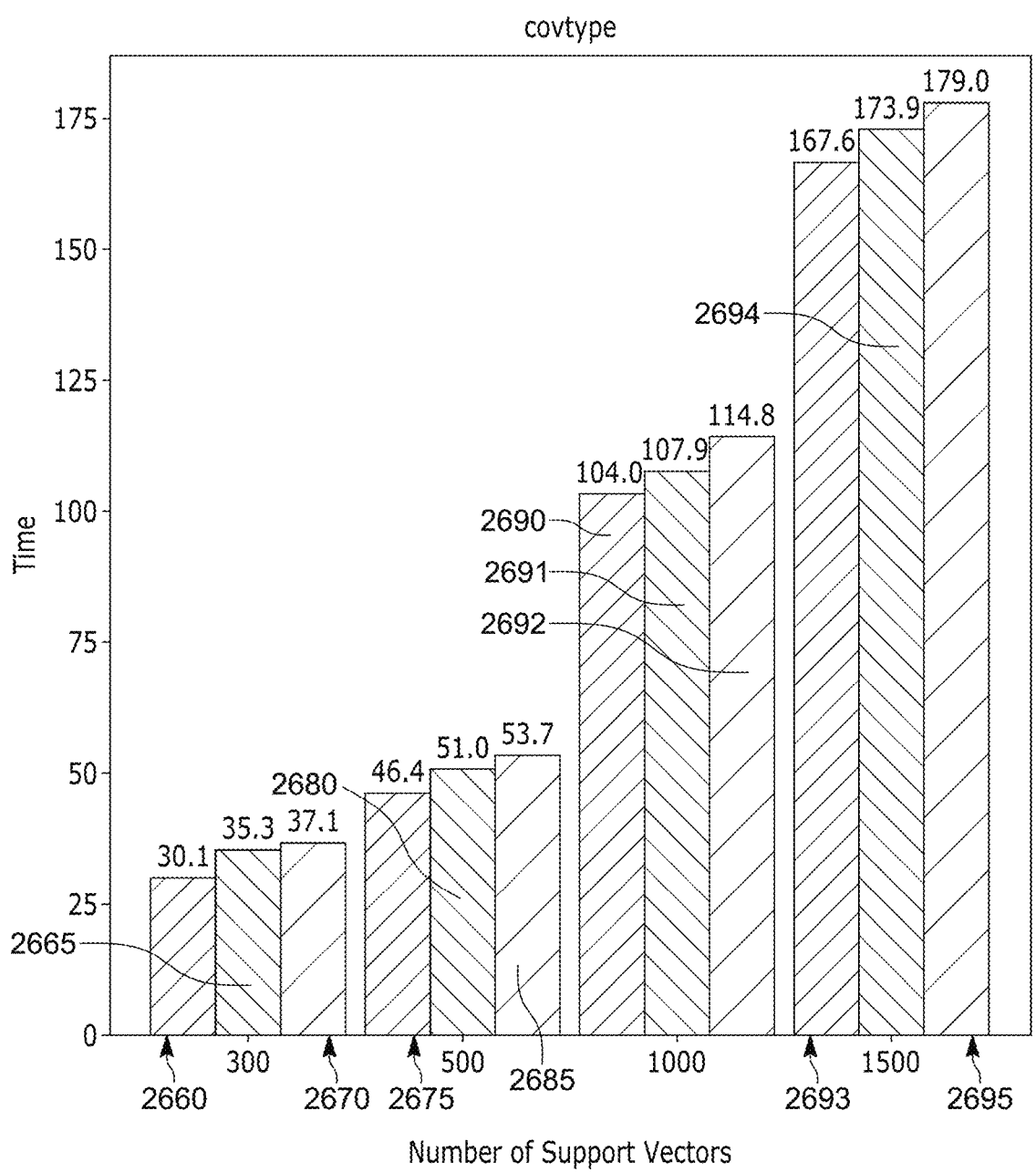

Turning to FIGS. 24A-26B, example graphs showing the impact of sampling is shown, in accordance with some embodiments of the present disclosure. FIGS. 24A and 24B show the impact of sampling in the adult dataset 2300, FIGS. 25A and 25B show the impact of sampling in the fashion nmist dataset 2305, and FIGS. 26A and 26B show the impact of sampling in the covtype dataset 2310. As discussed above, during the training process, the operation 1620 includes determining the support vector subset from the training data. FIGS. 17-19 discuss different ways of sampling the support vector subset. The process 1900 discussed in FIG. 19 is considered "Method 1," the process 1700 discussed in FIG. 17 is considered "Method 2," and the process 1800 discussed in FIG. 18 is considered "Method 3." Each of the FIGS. 24A/24B, 25A/25B, and 26A/26B compare the Methods 1-3 for sampling (e.g., selecting the support vector subset) from the respective datasets.

For each of the three methods, inventors repeated the experiments three times and calculated the average time (in seconds) of selecting the support vector subset and testing accuracy (e.g., of accurately classifying the testing data) using the proposed approach. The standard deviation of the accuracy was negligible for all methods. FIGS. 24A, 25A, and 26A compare the accuracy (in percentages) on Y-axis against the size of the support vector subset (e.g., the number of support vectors) on X-axis, while FIGS. 24B, 25B, and 26B compare the average time on Y-Axis against the size of the support vector subset (e.g., the number of support vectors) on X-axis.

FIG. 24A shows bars 2400, 2405, and 2410 that compare accuracy for 300 support vectors, bars 2415, 2420, and 2425 that compare accuracy for 500 support vectors, bars 2430, 2435, and 2440 that compare accuracy for 1000 support vectors, and bars 2445, 2450, and 2455 that compare accuracy for 1500 support vectors selected from the adult dataset 2300. The bars 2400, 2415, 2430, and 2445 correspond to results for sampling using Method 1, the bars 2405, 2420, 2435, and 2450 correspond to results for sampling using Method 2, while bars 2410, 2425, 2440, and 2455 correspond to results for sampling using Method 3.

FIG. 24B shows bars 2460, 2465, and 2470 that compare accuracy for 300 support vectors, bars 2475, 2480, and 2485 that compare accuracy for 500 support vectors, bars 2490, 2491, and 2492 that compare accuracy for 1000 support vectors, and bars 2493, 2494, and 2495 that compare accuracy for 1500 support vectors selected from the adult dataset 2300. The bars 2460, 2475, 2490, and 2493 correspond to results for sampling using Method 1, the bars 2465, 2480, 2491, and 2494 correspond to results for sampling using Method 2, while bars 2470, 2485, 2492, and 2495 correspond to results for sampling using Method 3.

FIG. 25A shows bars 2500, 2505, and 2510 that compare accuracy for 300 support vectors, bars 2515, 2520, and 2525 that compare accuracy for 500 support vectors, bars 2530, 2535, and 2540 that compare accuracy for 1000 support vectors, and bars 2545, 2550, and 2555 that compare accuracy for 1500 support vectors selected from the fashion nmist dataset 2305. The bars 2500, 2515, 2530, and 2545 correspond to results for sampling using Method 1, the bars 2505, 2520, 2535, and 2550 correspond to results for sampling using Method 2, while bars 2510, 2525, 2540, and 2555 correspond to results for sampling using Method 3.

FIG. 25B shows bars 2560, 2565, and 2570 that compare accuracy for 300 support vectors, bars 2575, 2580, and 2585 that compare accuracy for 500 support vectors, bars 2590, 2591, and 2592 that compare accuracy for 1000 support vectors, and bars 2593, 2594, and 2595 that compare accuracy for 1500 support vectors selected from the fashion nmist dataset 2305. The bars 2560, 2575, 2590, and 2593 correspond to results for sampling using Method 1, the bars 2565, 2580, 2591, and 2594 correspond to results for sampling using Method 2, while bars 2570, 2585, 2592, and 2595 correspond to results for sampling using Method 3.

FIG. 26A shows bars 2600, 2605, and 2610 that compare accuracy for 300 support vectors, bars 2615, 2620, and 2625 that compare accuracy for 500 support vectors, bars 2630, 2635, and 2640 that compare accuracy for 1000 support vectors, and bars 2645, 2650, and 2655 that compare accuracy for 1500 support vectors selected from the covtype dataset 2310. The bars 2600, 2615, 2630, and 2645 correspond to results for sampling using Method 1, the bars 2605, 2620, 2635, and 2650 correspond to results for sampling using Method 2, while bars 2610, 2625, 2640, and 2655 correspond to results for sampling using Method 3.

FIG. 26B shows bars 2660, 2665, and 2670 that compare accuracy for 300 support vectors, bars 2675, 2680, and 2685 that compare accuracy for 500 support vectors, bars 2690, 2691, and 2692 that compare accuracy for 1000 support vectors, and bars 2693, 2694, and 2695 that compare accuracy for 1500 support vectors selected from the covtype dataset 2310. The bars 2660, 2675, 2690, and 2693 correspond to results for sampling using Method 1, the bars 2665, 2680, 2691, and 2694 correspond to results for sampling using Method 2, while bars 2670, 2685, 2692, and 2695 correspond to results for sampling using Method 3.

As seen from FIGS. 24A-26B, in terms of overall time, the Method 1 is the fastest across all datasets for each of the 300, 500, 1000, and 1500 support vectors. In terms of accuracy, Method 3 provides the highest accuracy across all datasets for each of the 300, 500, 1000, and 1500 support vectors, although as the number of support vectors increases, Methods 1 and 2 are close in accuracy to Method 3. Further, the results show that using only 300 support vectors to identify the decision boundary is sufficient to achieve a good accuracy in a very short time. For the adult dataset 2300, increasing the number of support vectors from 300 to 1,500 increases the accuracy by less than 1% when using Methods 1, 2, or 3. For the fashion mnist dataset 2305, increasing the number of support vectors from 300 to 1,500 increases accuracy by 1.69% when using Methods 1 and 2 and by 1.74% when using Method 3. For the covtype dataset 2310, the accuracy is improved by at least 5% when any of the three sampling techniques is used. Thus, although the accuracy increases a bit as the number of support vectors increases, all three proposed sampling methods provide a high accuracy of classification. Thus, using the proposed approach, a smaller number of support vectors may be used to achieve a sufficient level of accuracy.

Figure 27A:
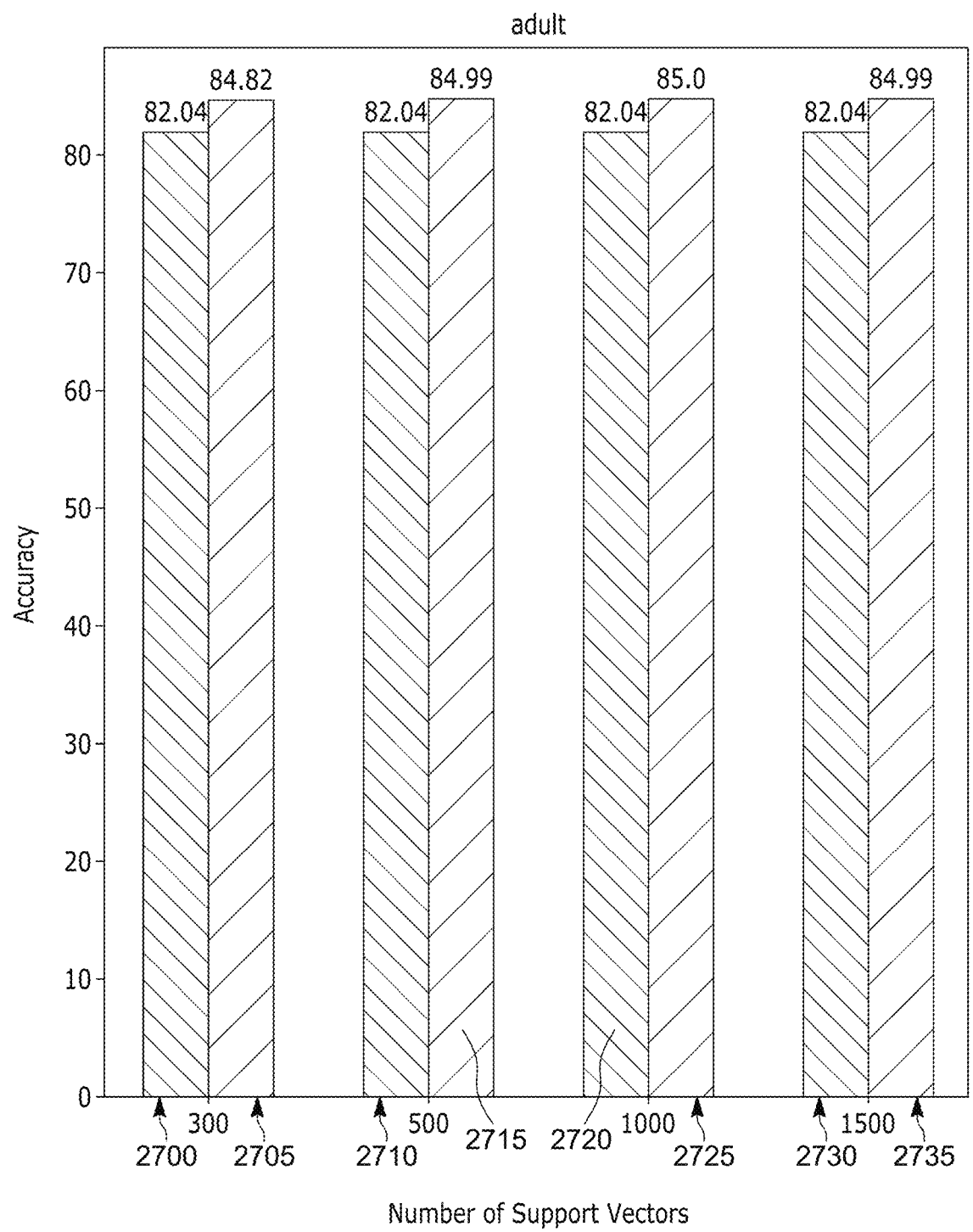
FIGS. 27A and 27B illustrate example graphs showing comparative data generated from the first dataset during trials using an existing technique and the proposed approach of the present disclosure, according to embodiments of the present technology.
Figure 27B:
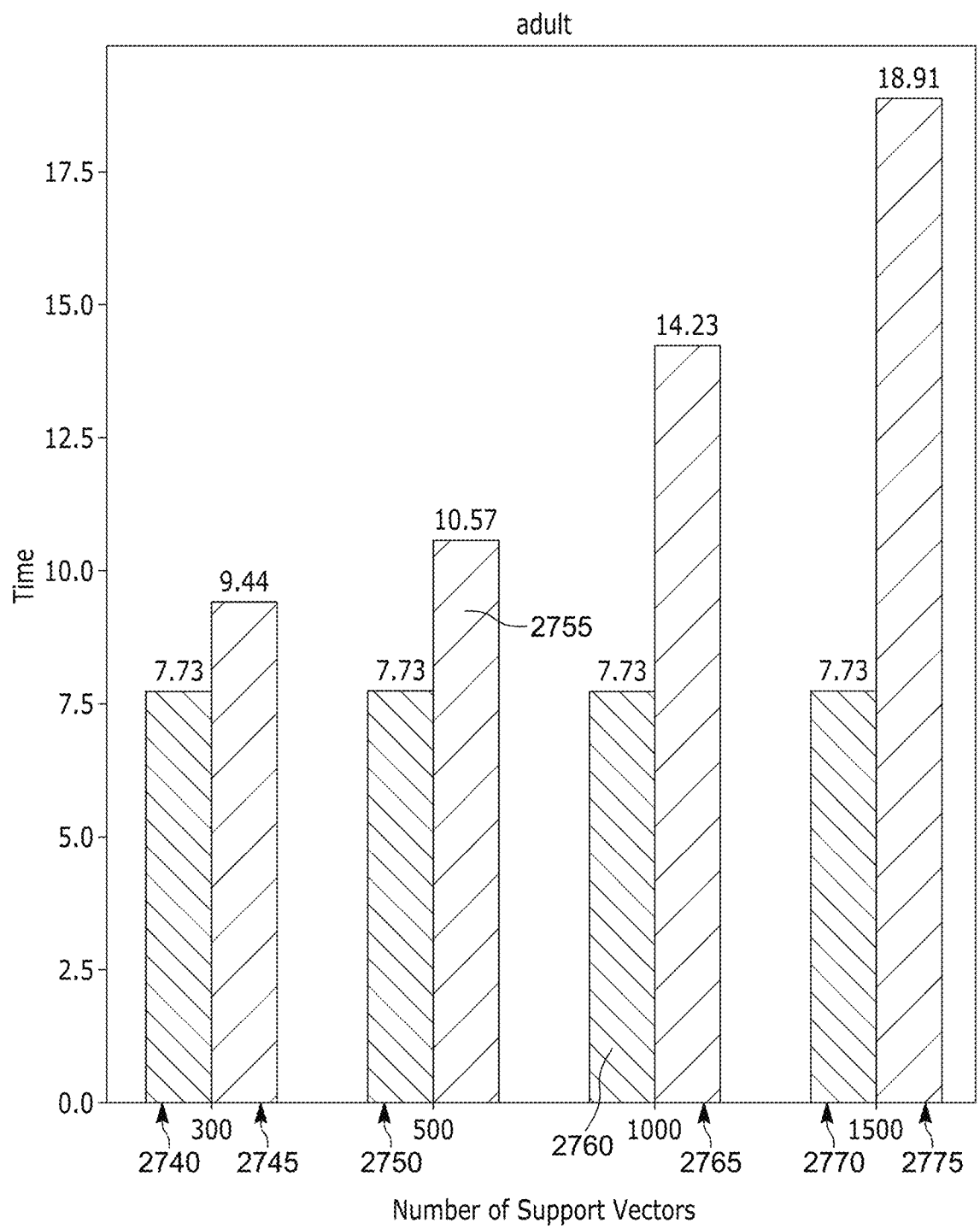
Figure 28A:
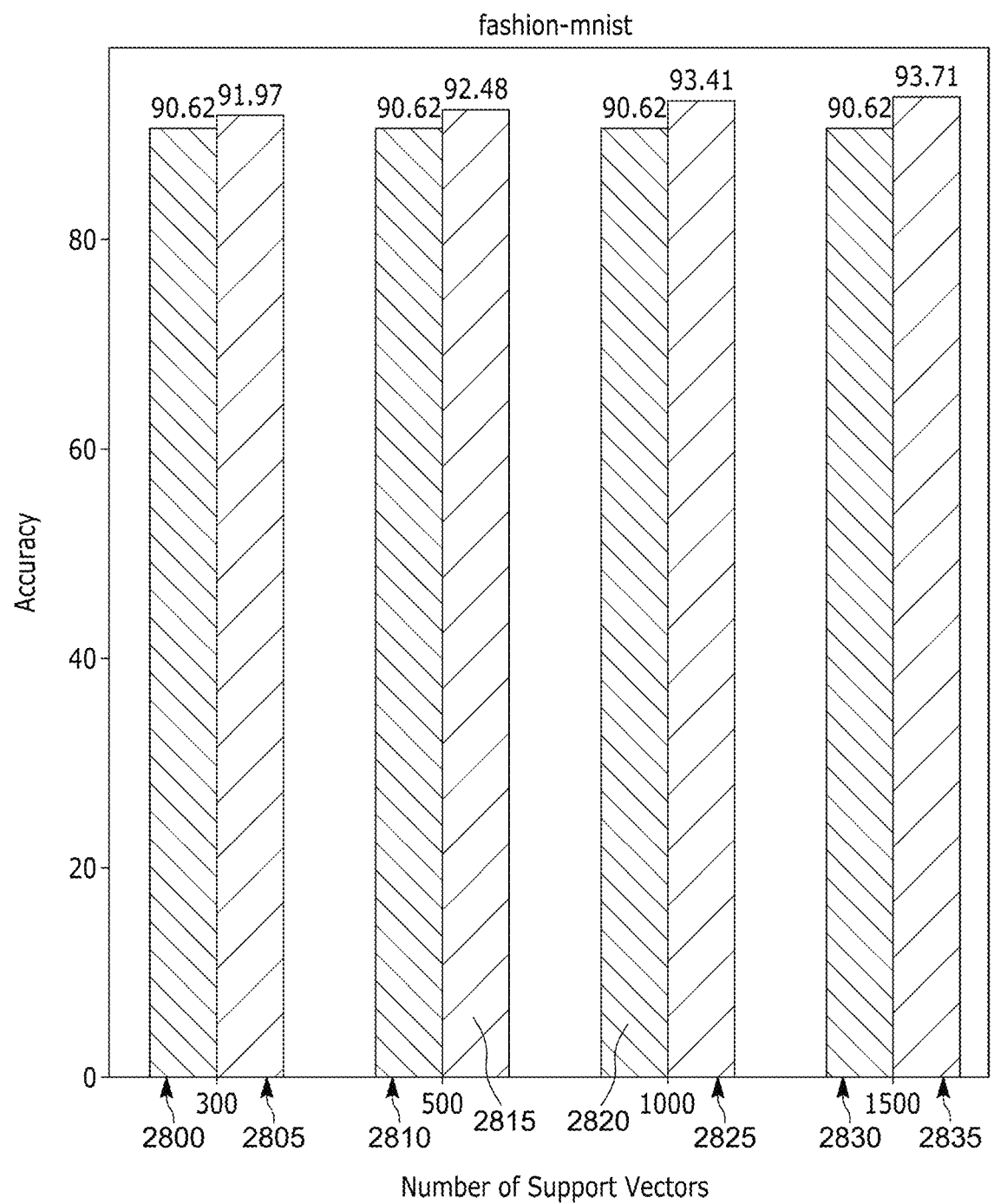
FIGS. 28A and 28B illustrate example graphs showing comparative data generated from the second dataset during trials using an existing technique and the proposed approach of the present disclosure, according to embodiments of the present technology.
Figure 28B:
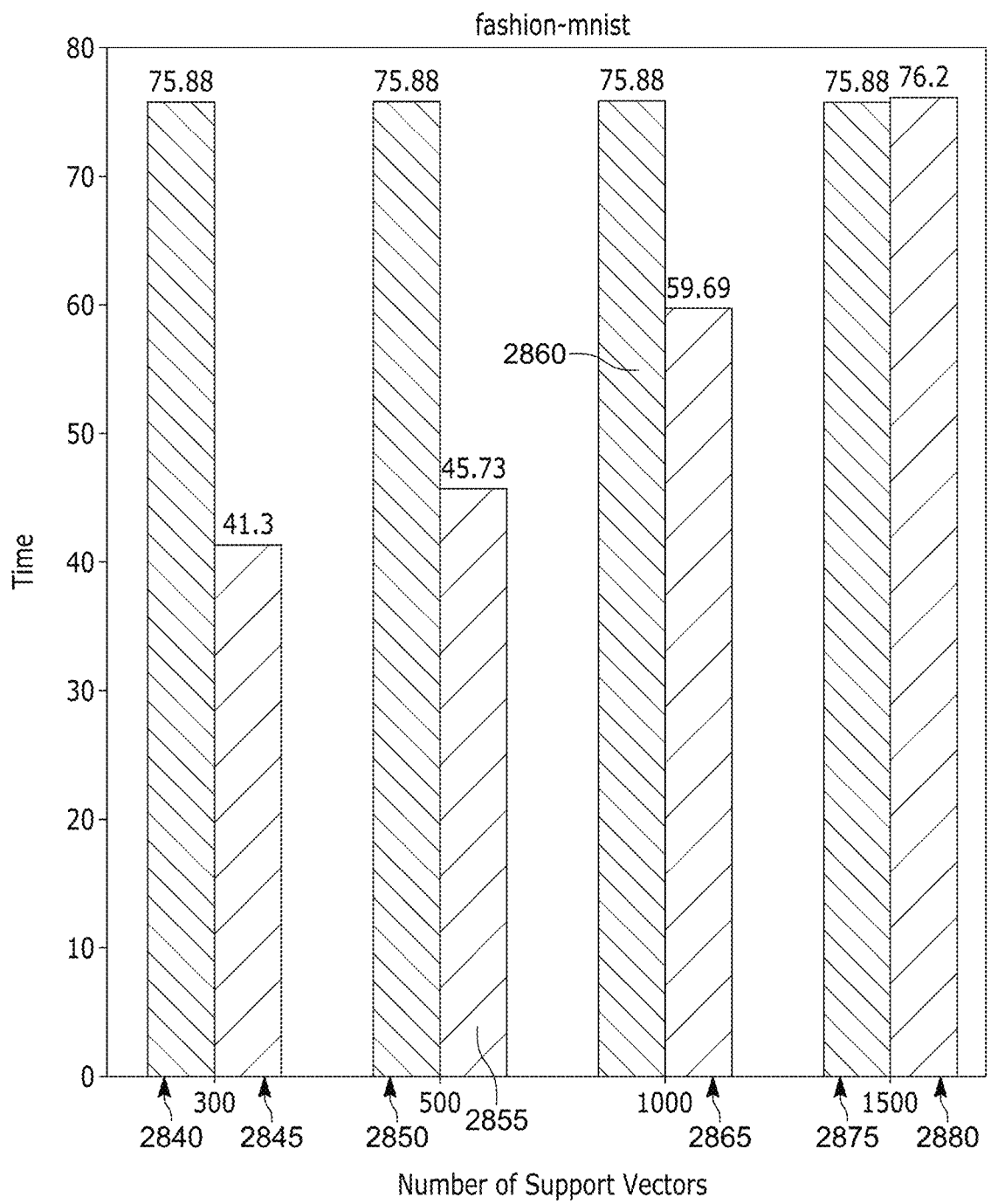
Figure 29A:
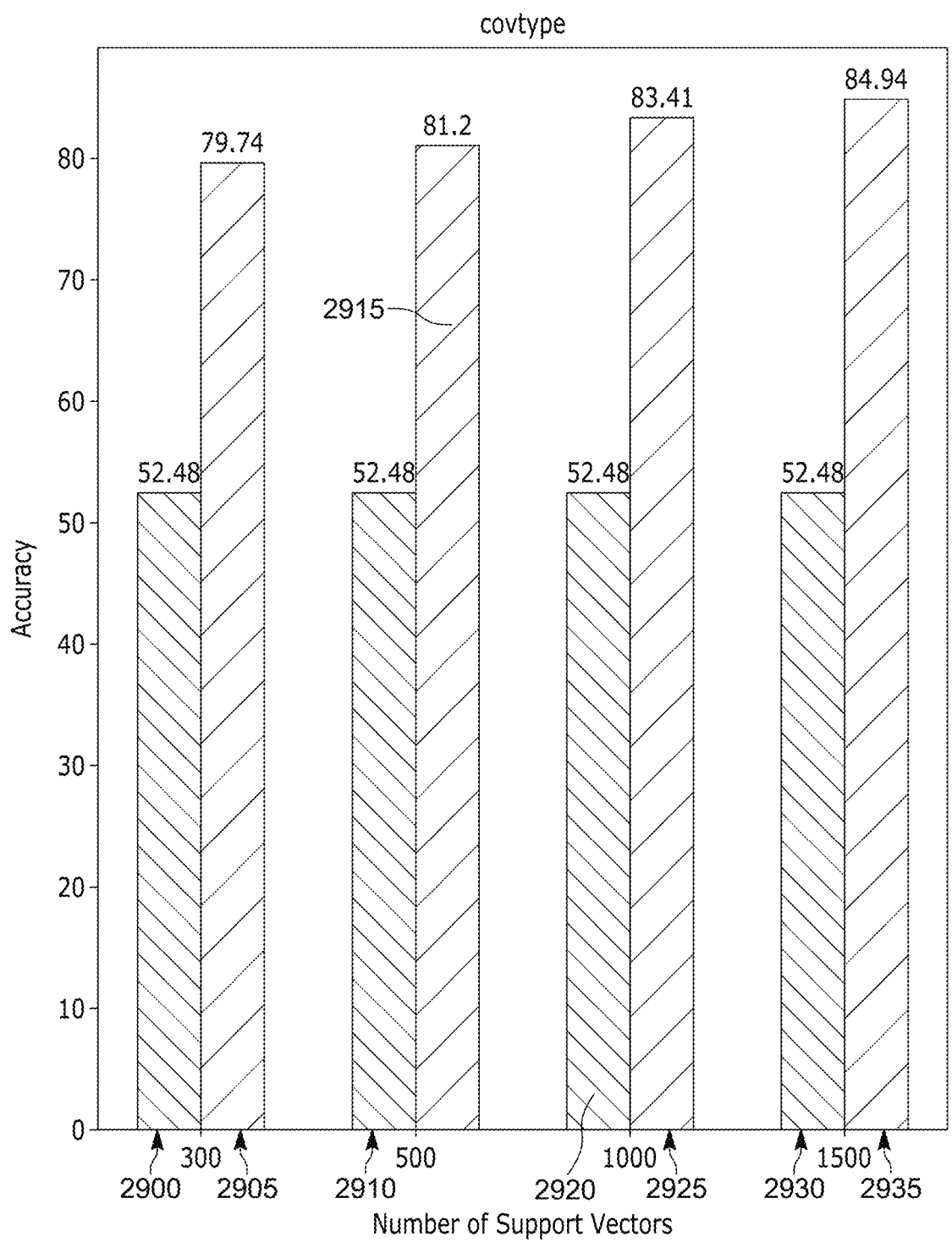
FIGS. 29A and 29B illustrate example graphs showing comparative data generated from the third dataset during trials using an existing technique and the proposed approach of the present disclosure, according to embodiments of the present technology.
Figure 29B:
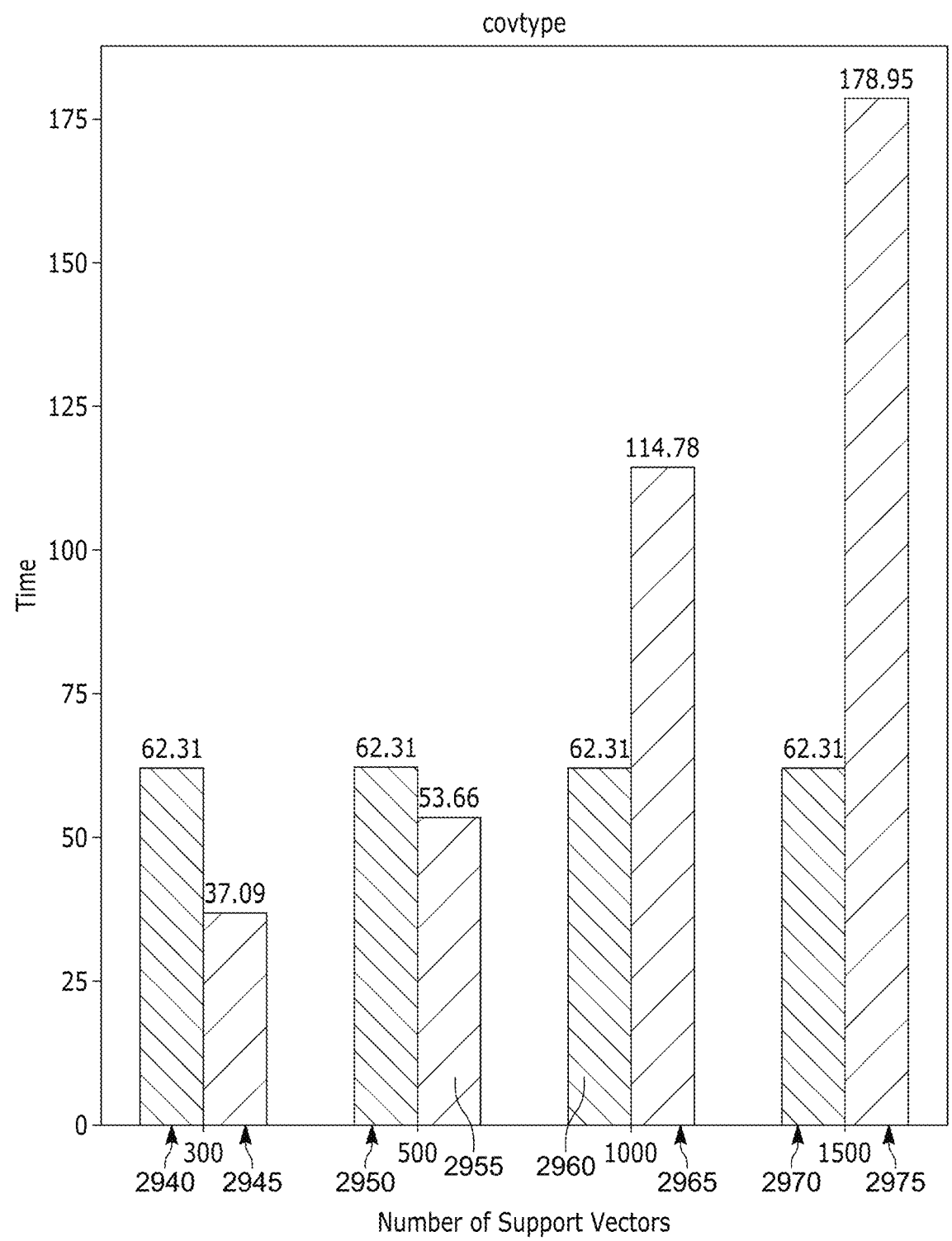

Referring now to FIGS. 27A-29B, example graphs comparing the proposed approach with an existing technique, SVMACHINE procedure provided by SAS Institute Inc. of Cary, North Carolina, are shown, in accordance with some embodiments of the present disclosure. Both techniques were tested using the RBF kernel function. FIGS. 27A and 27B compare the results in the adult dataset 2300, FIGS. 28A and 28B compare the results in the fashion nmist dataset 2305, and FIGS. 29A and 29B compare the results in the covtype dataset 2310. To compare the results, inventors calculated the average time (in seconds) of classifying the testing data and accuracy of classifying the testing data using both the proposed approach and SVMACHINE. FIGS. 27A, 28A, and 29A compare the accuracy (in percentages) on Y-axis against the size of the support vector subset (e.g., the number of support vectors) on X-axis, while FIGS. 27B, 28B, and 29B compare the average time on Y-Axis against the size of the support vector subset (e.g., the number of support vectors) on X-axis. The overall time excludes the time required to perform 10-fold cross validations.

FIG. 27A shows bars 2700 and 2705 that compare accuracy for 300 support vectors, bars 2710 and 2715 that compare accuracy for 500 support vectors, bars 2720 and 2725 that compare accuracy for 1000 support vectors, and bars 2730 and 2735 that compare accuracy for 1500 support vectors selected from the adult dataset 2300. The bars 2700, 2710, 2720, and 2730 correspond to results using SVMACHINE, the bars 2705, 2715, 2725, and 2735 correspond to results using the proposed approach.

FIG. 27B shows bars 2740 and 2745 that compare accuracy for 300 support vectors, bars 2750 and 2755 that compare accuracy for 500 support vectors, bars 2760 and 2765 that compare accuracy for 1000 support vectors, and bars 2770 and 2775 that compare accuracy for 1500 support vectors selected from the adult dataset 2300. The bars 2740, 2750, 2760, and 2770 correspond to results using SVMACHINE, the bars 2745, 2755, 2765, and 2775 correspond to results using the proposed approach.

FIG. 28A shows bars 2800 and 2805 that compare accuracy for 300 support vectors, bars 2810 and 2815 that compare accuracy for 500 support vectors, bars 2820 and 2825 that compare accuracy for 1000 support vectors, and bars 2830 and 2835 that compare accuracy for 1500 support vectors selected from the fashion nmist dataset 2305. The bars 2800, 2810, 2820, and 2830 correspond to results using SVMACHINE, the bars 2805, 2815, 2825, and 2835 correspond to results using the proposed approach.

FIG. 28B shows bars 2840 and 2845 that compare accuracy for 300 support vectors, bars 2850 and 2855 that compare accuracy for 500 support vectors, bars 2860 and 2865 that compare accuracy for 1000 support vectors, and bars 2870 and 2875 that compare accuracy for 1500 support vectors selected from the fashion nmist dataset 2305. The bars 2840, 2850, 2860, and 2870 correspond to results using SVMACHINE, the bars 2845, 2855, 2865, and 2875 correspond to results using the proposed approach.

FIG. 29A shows bars 2900 and 2905 that compare accuracy for 300 support vectors, bars 2910 and 2915 that compare accuracy for 500 support vectors, bars 2920 and 2925 that compare accuracy for 1000 support vectors, and bars 2930 and 2935 that compare accuracy for 1500 support vectors selected from the covtype dataset 2310. The bars 2900, 2910, 2920, and 2930 correspond to results using SVMACHINE, the bars 2905, 2915, 2925, and 2935 correspond to results using the proposed approach.

FIG. 29B shows bars 2940 and 2945 that compare accuracy for 300 support vectors, bars 2950 and 2955 that compare accuracy for 500 support vectors, bars 2960 and 2965 that compare accuracy for 1000 support vectors, and bars 2970 and 2975 that compare accuracy for 1500 support vectors selected from the covtype dataset 2310. The bars 2940, 2950, 2960, and 2970 correspond to results using SVMACHINE, the bars 2945, 2955, 2965, and 2975 correspond to results using the proposed approach.

As seen from FIGS. 27A-29B, the proposed approach is more accurate than SVMACHINE. The difference in accuracy becomes more pronounced as the number of observation vectors in the training data increases. In other words, the proposed approach is significantly more accurate than SVMACHINE for the covtype dataset 2310 compared to the adult dataset 2300 and the fashion nmist dataset 2305. The proposed approach takes a bit longer due to the extra time needed for sampling the datasets to find the appropriate support vector subset, which is expected.

Referring now to FIGS. 30A-32B, example graphs comparing the proposed approach with two other existing techniques, LIBSVM and BudgetedSVM, are shown, in accordance with some embodiments of the present disclosure. LIBSVM is a popular software library for SVM that implements a simple decomposition method. LIBSVM provides a set of tools and Application programming Interfaces for training and using SVM models for classification, regression, and other machine learning tasks. BudgetedSVM is a C++ toolbox containing highly optimized implementations of three algorithms for scalable training of SVM approximators. In the experiments that the inventors conducted, they used a low-rank linearization SVM (LLSVM) algorithm for implementing BudgetedSVM.

Figure 30A:
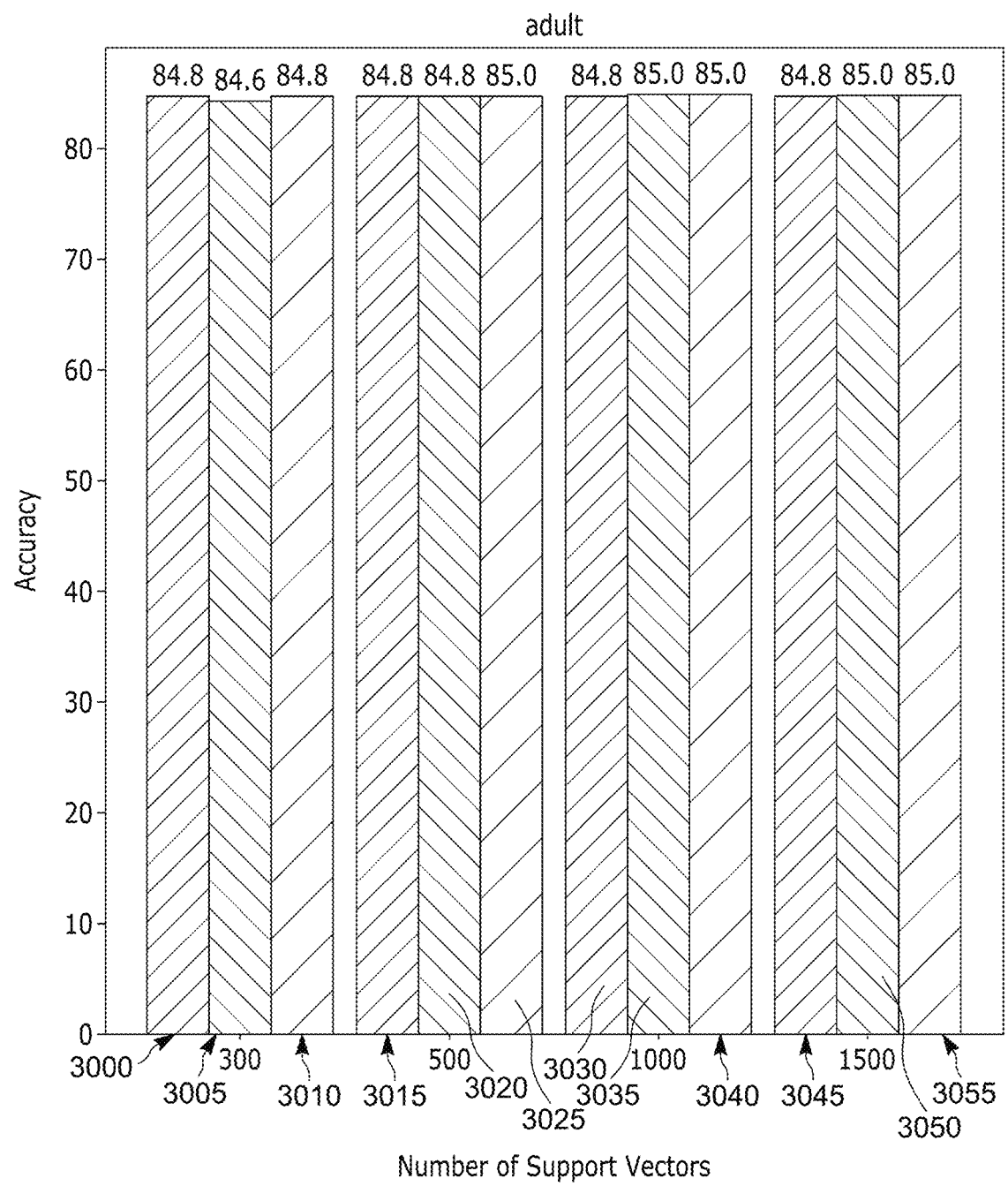
FIGS. 30A and 30B illustrate example graphs showing comparative data generated from the first dataset during trials using additional existing techniques and the proposed approach of the present disclosure, according to embodiments of the present technology.
Figure 30B:
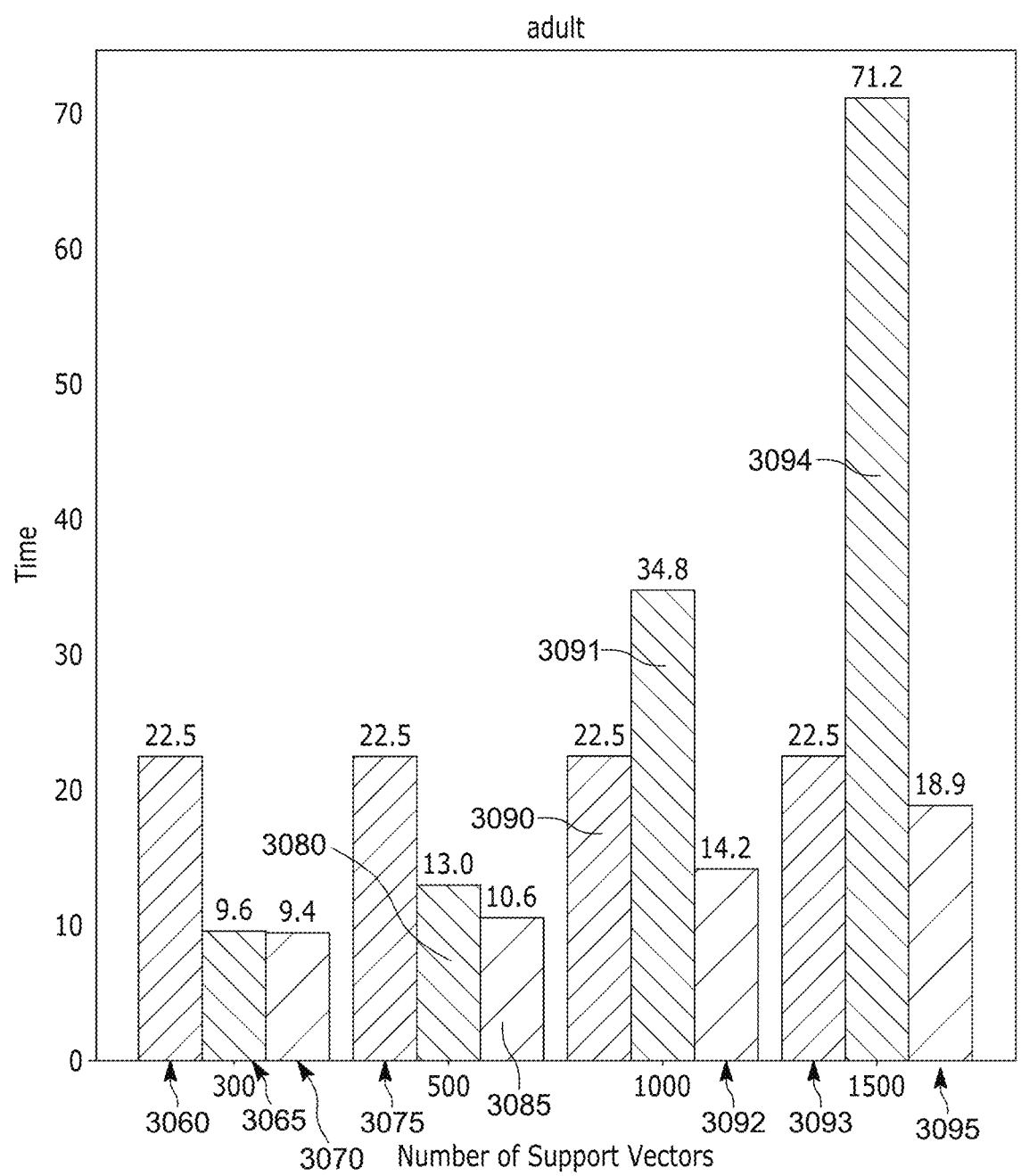
Figure 31A:
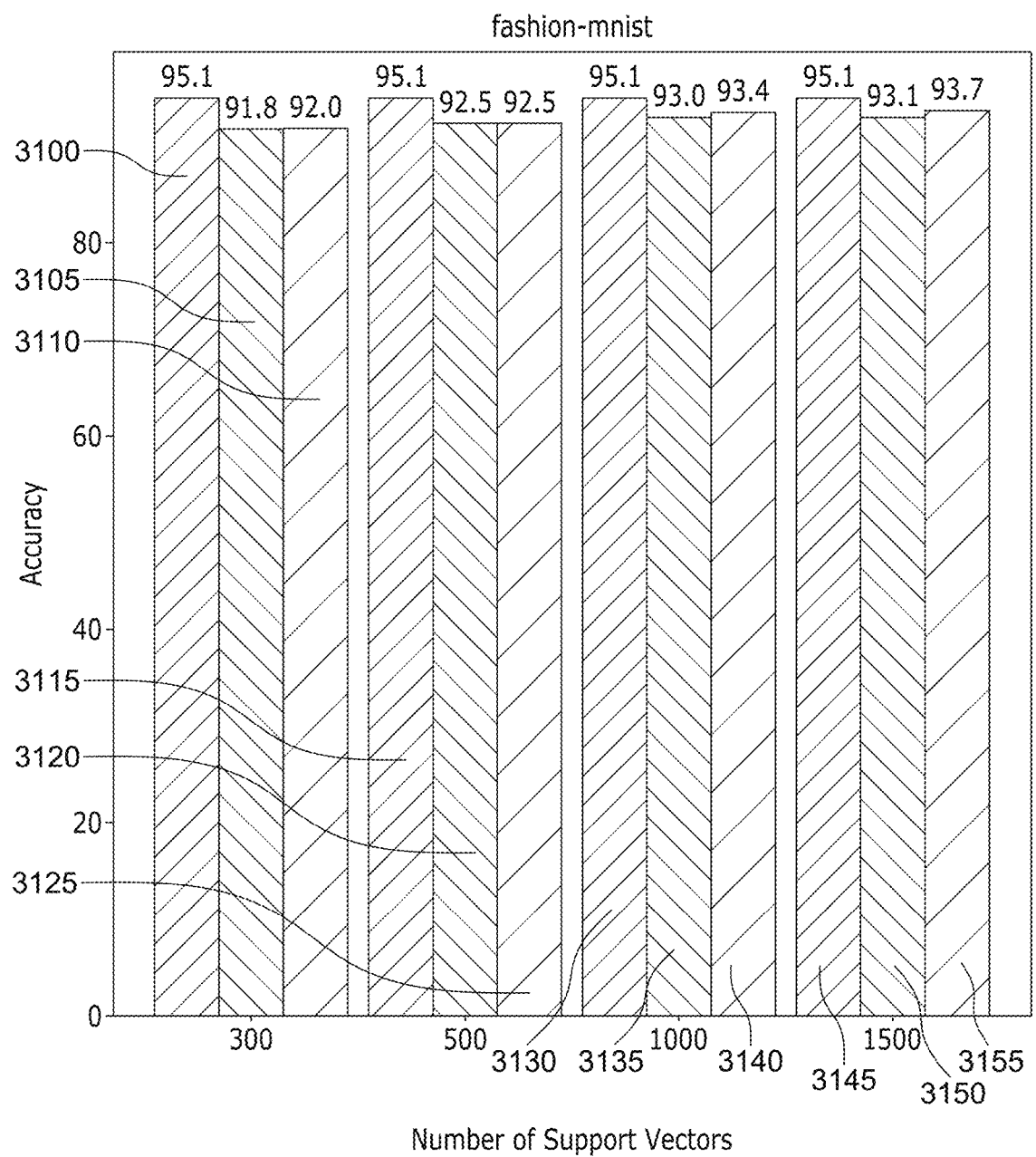
FIGS. 31A and 31B illustrate example graphs showing comparative data generated from the second dataset during trials using additional existing techniques and the proposed approach of the present disclosure, according to embodiments of the present technology.
Figure 31B:
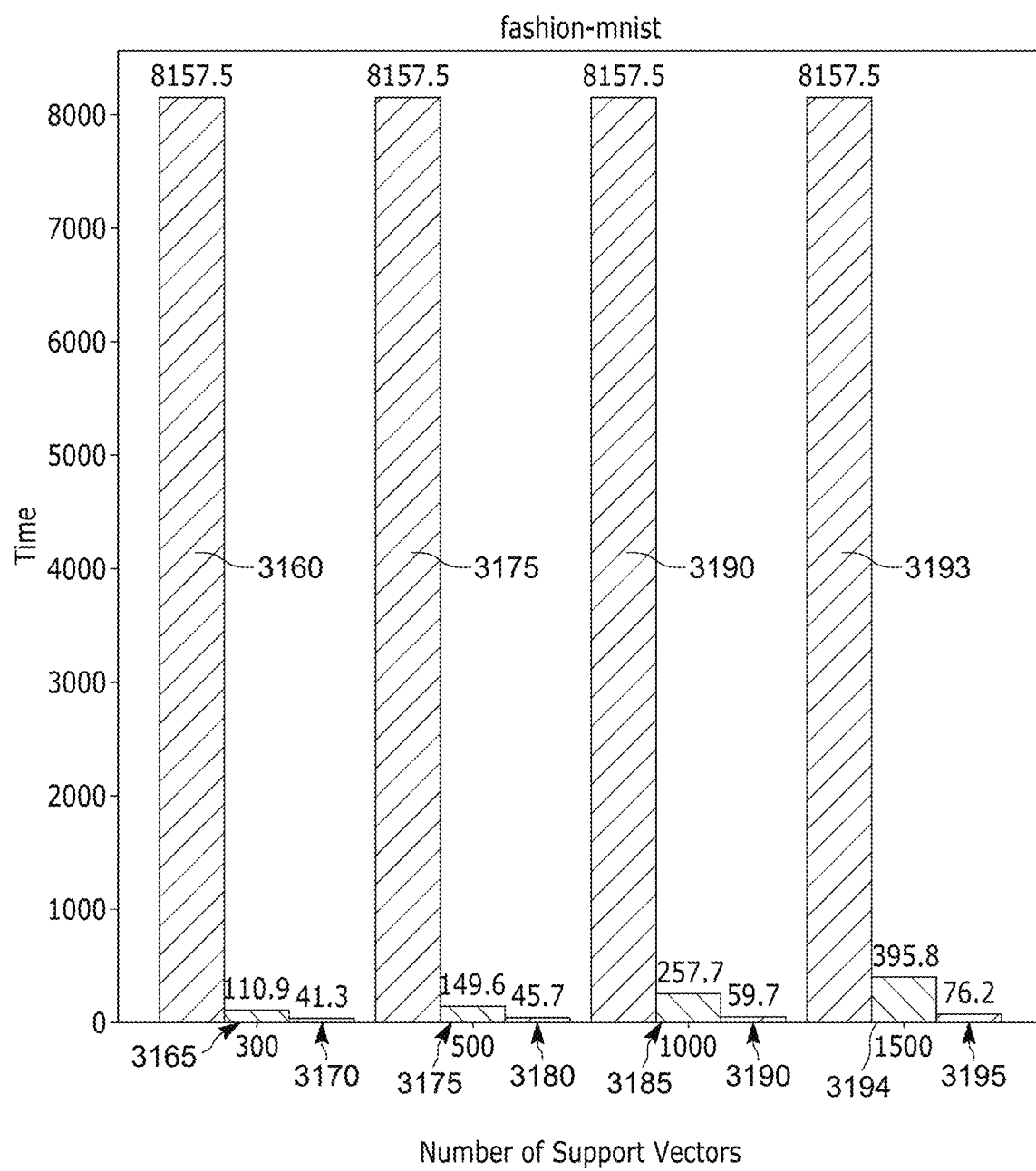
Figure 32A:
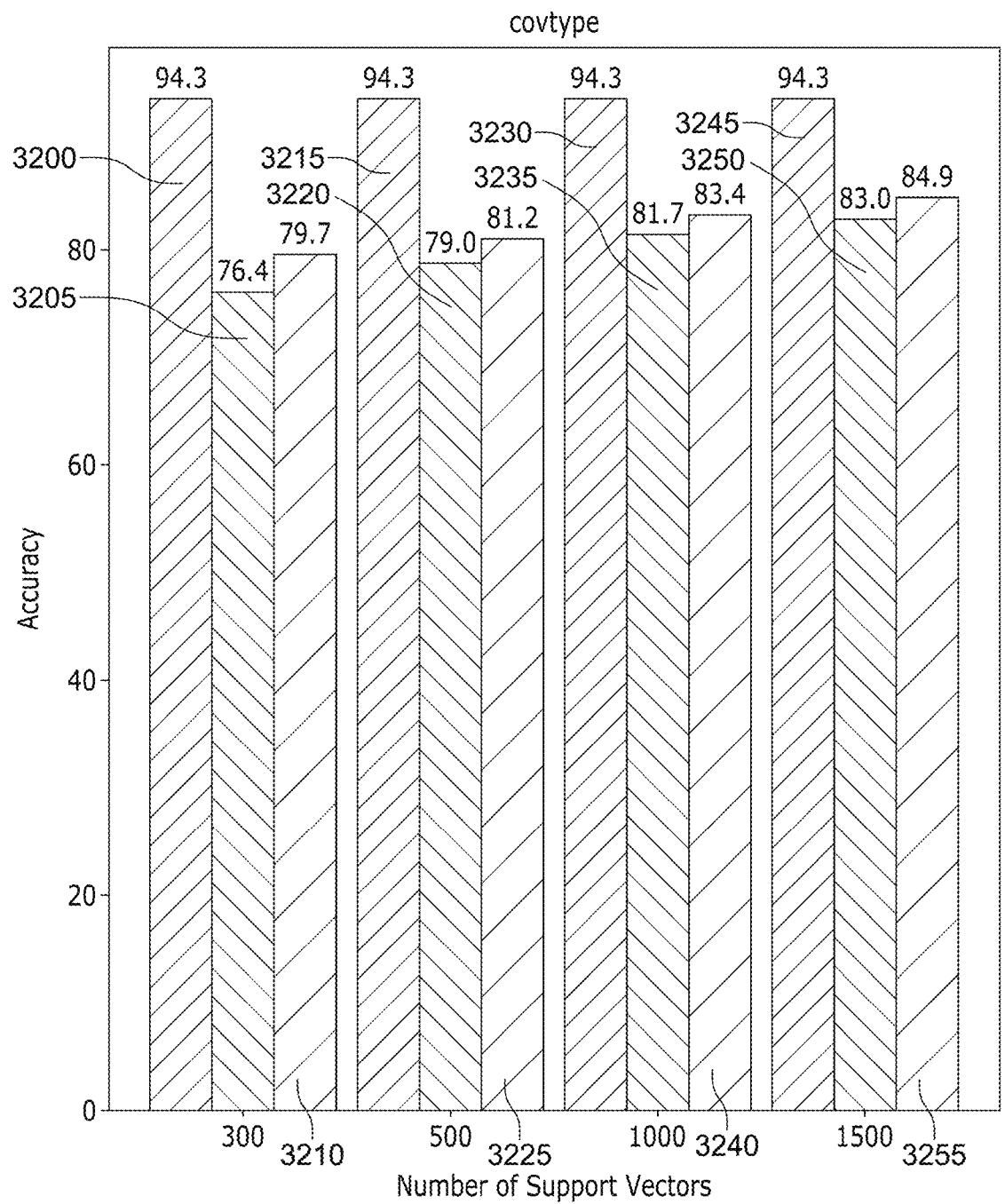
FIGS. 32A and 32B illustrate example graphs showing comparative data generated from the third dataset during trials using additional existing techniques and the proposed approach of the present disclosure, according to embodiments of the present technology.
Figure 32B:
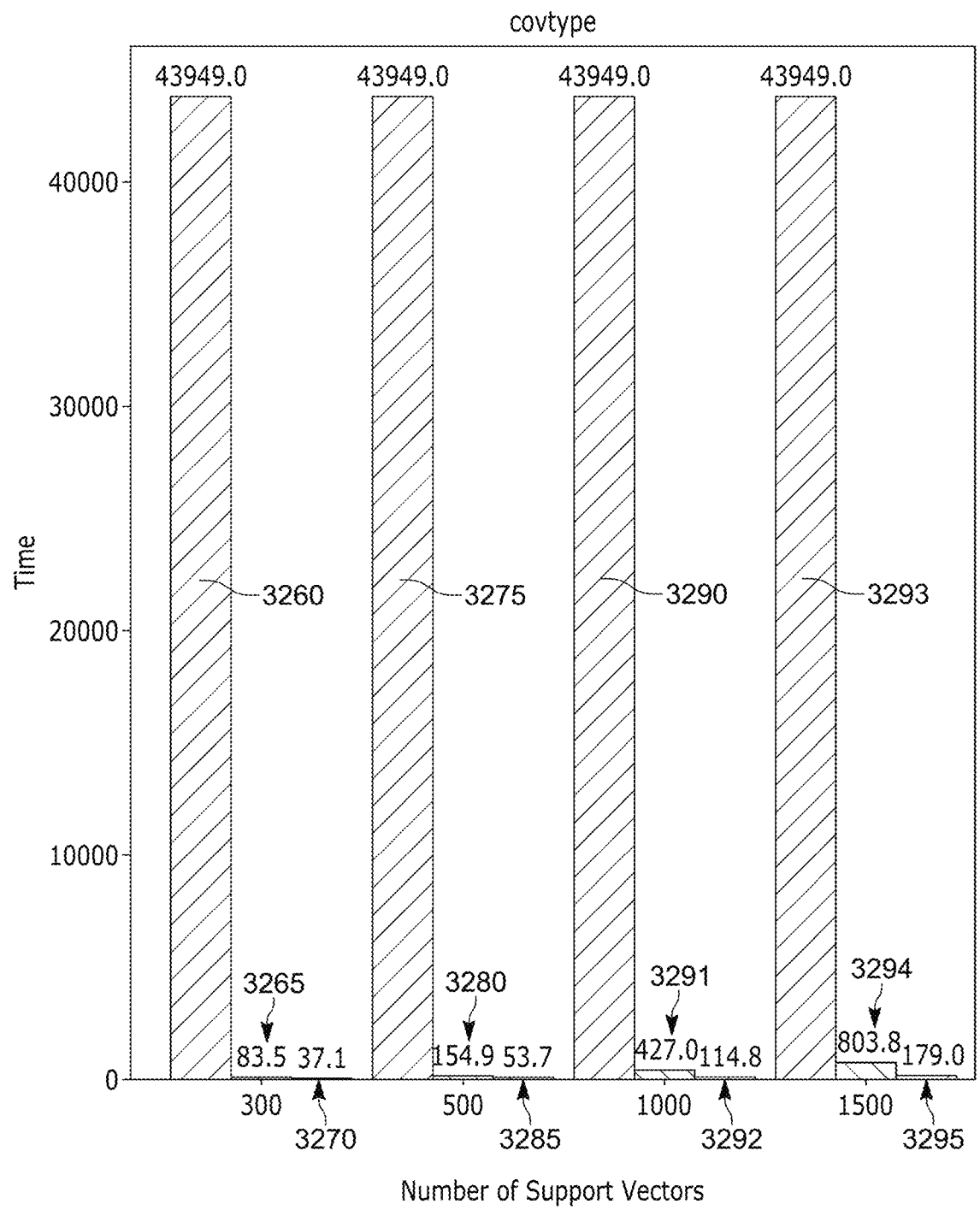

FIGS. 30A and 30B compare the results in the adult dataset 2300, FIGS. 31A and 31B compare the results in the fashion nmist dataset 2305, and FIGS. 32A and 32B compare the results in the covtype dataset 2310. To compare the results, inventors calculated the average time (in seconds) of classifying the testing data and accuracy of classifying the testing data using both the proposed approach, LIBSVM, and BudgetedSVM. FIGS. 30A, 31A, and 32A compare the accuracy (in percentages) on Y-axis against the size of the support vector subset (e.g., the number of support vectors) on X-axis, while FIGS. 30B, 31B, and 32B compare the average time on Y-Axis against the size of the support vector subset (e.g., the number of support vectors) on X-axis. The overall time excluded the time required to perform the 10-fold cross validations. For BudgetedSVM and LIBSVM, the inventors repeated the experiments three times and provided the average of the time and accuracy in FIGS. 30A-32B. The highest standard deviation of the test accuracy achieved by BudgetedSVM and the proposed approach was 0.28% and 0.17&, respectively.

FIG. 30A shows bars 3000, 3005, and 3010 that compare accuracy for 300 support vectors, bars 3015, 3020, and 3025 that compare accuracy for 500 support vectors, bars 3030, 3035, and 3040 that compare accuracy for 1000 support vectors, and bars 3045, 3050, and 3055 that compare accuracy for 1500 support vectors selected from the adult dataset 2300. The bars 3000, 3015, 3030, and 3045 correspond to results for LIBSVM, the bars 3005, 3020, 3035, and 3050 correspond to results for BudgetedSVM, while bars 3010, 3025, 3040, and 3055 correspond to results for the proposed approach.

FIG. 30B shows bars 3060, 3065, and 3070 that compare accuracy for 300 support vectors, bars 3075, 3080, and 3085 that compare accuracy for 500 support vectors, bars 3090, 3091, and 3092 that compare accuracy for 1000 support vectors, and bars 3093, 3094, and 3095 that compare accuracy for 1500 support vectors selected from the adult dataset 2300. The bars 3060, 3075, 3090, and 3093 correspond to results for LIBSVM, the bars 3065, 3080, 3091, and 3094 correspond to results for BudgetedSVM, while bars 3070, 3085, 3092, and 3095 correspond to results for the proposed approach.

FIG. 31A shows bars 3100, 3105, and 3110 that compare accuracy for 300 support vectors, bars 3115, 3120, and 3125 that compare accuracy for 500 support vectors, bars 3130, 3135, and 3140 that compare accuracy for 1000 support vectors, and bars 3145, 3150, and 3155 that compare accuracy for 1500 support vectors selected from the fashion nmist dataset 2305. The bars 3100, 3115, 3130, and 3145 correspond to results for LIBSVM, the bars 3105, 3120, 3135, and 3150 correspond to results for BudgetedSVM, while bars 3110, 3125, 3140, and 3155 correspond to results for the proposed approach.

FIG. 31B shows bars 3160, 3165, and 3170 that compare accuracy for 300 support vectors, bars 3175, 3180, and 3185 that compare accuracy for 500 support vectors, bars 3190, 3191, and 3192 that compare accuracy for 1000 support vectors, and bars 3193, 3194, and 3195 that compare accuracy for 1500 support vectors selected from the fashion nmist dataset 2305. The bars 3160, 3175, 3190, and 3193 correspond to results for LIBSVM, the bars 3165, 3180, 3191, and 3194 correspond to results for BudgetedSVM, while bars 3170, 3185, 3192, and 3195 correspond to results for the proposed approach.

FIG. 32A shows bars 3200, 3205, and 3210 that compare accuracy for 300 support vectors, bars 3215, 3220, and 3225 that compare accuracy for 500 support vectors, bars 3230, 3235, and 3240 that compare accuracy for 1000 support vectors, and bars 3245, 3250, and 3255 that compare accuracy for 1500 support vectors selected from the covtype dataset 2310. The bars 3200, 3215, 3230, and 3245 correspond to results for LIBSVM, the bars 3205, 3220, 3235, and 3250 correspond to results for BudgetedSVM, while bars 3210, 3225, 3240, and 3255 correspond to results for the proposed approach.

FIG. 32B shows bars 3260, 3265, and 3270 that compare accuracy for 300 support vectors, bars 3275, 3280, and 3285 that compare accuracy for 500 support vectors, bars 3290, 3291, and 3292 that compare accuracy for 1000 support vectors, and bars 3293, 3294, and 3295 that compare accuracy for 1500 support vectors selected from the covtype dataset 2310. The bars 3260, 3275, 3290, and 3293 correspond to results for LIBSVM, the bars 3265, 3280, 3291, and 3294 correspond to results for BudgetedSVM, while bars 3270, 3285, 3292, and 3295 correspond to results for the proposed approach.

As seen from FIGS. 30A-32B, in terms of accuracy, the proposed approach is as accurate or more accurate than BudgetedSVM and only slightly less accurate than LIBSVM. Compared to LIBSVM, however, the proposed approach requires much less time as the size of the training data increases. For the fashion mnist dataset 2305, LIBSVM reaches 95.08% accuracy in about 2 hours while the proposed approach achieves 93.71% within 76 seconds. The difference in time becomes even more important when the size of the data becomes larger. Further, for the adult dataset 2300 that has 19,537 observations, LIBSVM uses a support vector subset of size 7,495 and achieves 84.85% accuracy, while the proposed approach achieves the same accuracy while only using 300 support vectors.

When compared to BudgetedSVM, the proposed approach achieves better accuracy for all the datasets. The results also show that the proposed approach is faster than BudgetedSVM. The speedup factor increases as the number of support vectors increases. For example, the proposed approach is at least 3.7× faster than BudgetedSVM for all the datasets when using 1,500 data points as support vectors. Note also that the proposed approach is run on a single machine for these experiments because neither BudgetedSVM nor LIBSVM are capable of distributed computing. With distributed computing provided by the proposed approach, the speedup may be even more. Thus, the proposed approach is as accurate or more accurate than existing techniques, while being significantly faster and using fewer number of support vectors.

As seen from the FIGS. Above, the proposed approach provides acceptable accuracy while dramatically reducing the training time when the dataset is of small or medium size. Using only 200 support vectors is sufficient to achieve the acceptable accuracy. As the training data become large (e.g., for large-scale datasets), conventional techniques require selecting a significantly larger number of support vectors to increase accuracy. On the contrary, with the proposed approach, the same accuracy as that achieved by the conventional techniques is achieved by using only 300 support vectors. By using fewer number of support vectors, the proposed approach requires significantly less memory to store the support vectors. Further, because fewer number of support vectors are used, fewer computations need to be performed, thereby conserving computing resources.

Figure 33:
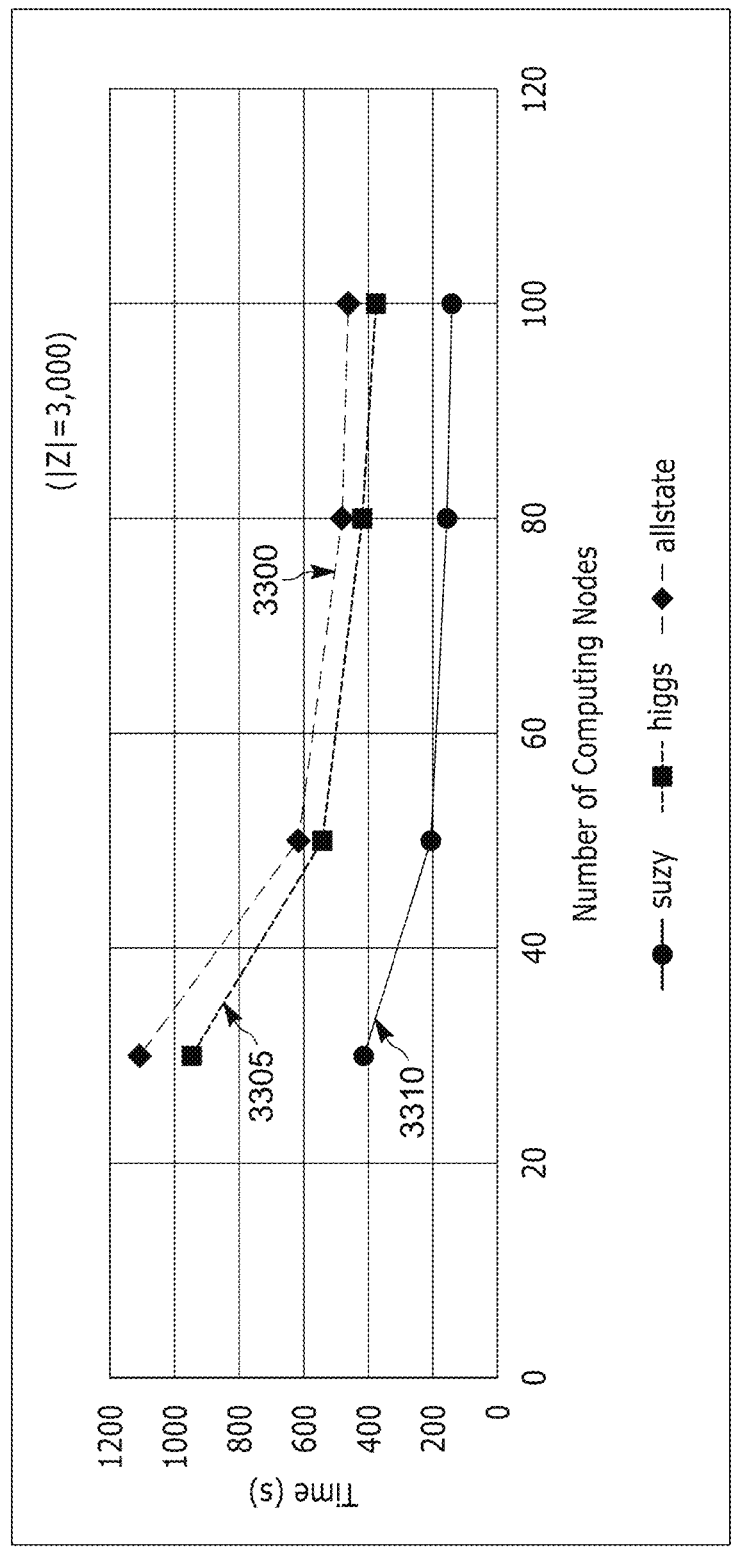
FIG. 33 illustrates an example graph showing how the proposed approach of the present disclosure scales with large scale data sets, according to embodiments of the present technology.
Figure 34:
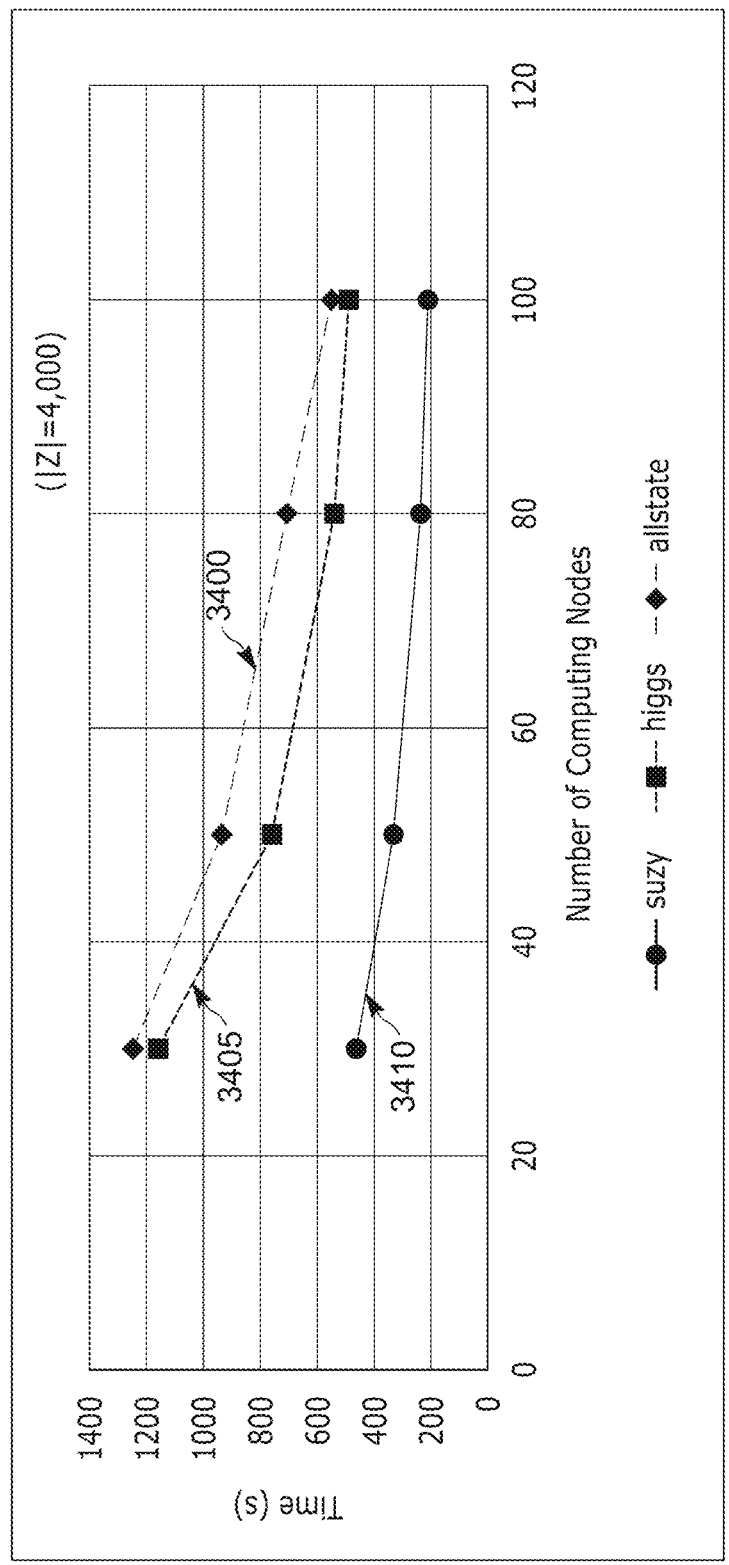
FIG. 34 illustrates another example graph showing how the proposed approach of the present disclosure scales with large scale data sets, according to embodiments of the present technology.

The speed of the proposed approach maybe further increased by increasing the number of computing nodes (e.g., the number of worker machines). For example, FIGS. 33 and 34 show example graphs showing the increase in speed with increasing the number of computing nodes for large-scale datasets. For these speed experiments, inventors used computing nodes where each computing node had an Intel (R) Xeon (R) CPU E5-2680 processor with 2.70 GHz and 265G RAM. FIG. 33 provides the graph when 3000 support vectors are used and FIG. 34 provides the graph when 4000 support vectors are used. Both FIGS. plots time taken to train the SVM model 1555 on Y-axis against the number of computing nodes on X-axis.

In particular, FIG. 33 shows a first plot 3300 for the allstate dataset 2325, a second plot 3305 for the higgs dataset 2320 and a third plot 3310 for the suzy dataset 2315, while FIG. 34 shows a fourth plot 3400 for the allstate dataset 2325, a fifth plot 3405 for the higgs dataset 2320 and a sixth plot 3410 for the suzy dataset 2315. The results from these FIGS. show that the proposed approach scales very well as the number of computing nodes increases. For all the datasets, using 3,000 and 4,000 support vectors allows the proposed approach to achieve acceptable accuracy, and using as many nodes as possible helps speed up the training process. Note that the highest standard deviation of the test accuracy achieved by proposed approach for the three datasets using 3,000 and 4,000 support vectors is 0.84% and 0.72%, respectively.

Inventors also ran LIBSVM and BudgedetSVM on these three large datasets, and found that LIBSVM does not return any result for the three datasets within 2 days. Using 4,000 support vectors, BudgetedSVM cannot finish the training of the higgs dataset 2320 and the allstate dataset 2325 within 2 days. For the suzy dataset 2315, BudgetedSVM returns a solution after 23 hours, and the corresponding accuracy is 69.70%. When using 3,000 support vectors, BudgetedSVM returns a solution after 12 hours, and the accuracy was 59.19% for the suzy dataset 2315. after 27 hours, and the accuracy was 57.96% for the higgs dataset 2320, and after 33 hours, and the accuracy was 99.10% for the allsatte dataset 2325. These results show that the proposed approach runs much faster than LIBSVM and BudgetedSVM and generates better models on large datasets.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising first computer-readable instructions stored thereon that when executed by a first processor of a main machine of a non-linear support vector machine cause the first processor to:
    (A) receive training data comprising a first plurality of observation vectors, wherein a number of the first plurality of observation vectors is greater than 1000;
    (B) divide the training data into P training data blocks, wherein P is a number of a plurality of worker machines operatively associated with the main machine to perform distributed computing, and wherein each of the P training blocks comprises a second plurality of observation vectors;
    (C) determine a support vector subset from the training data, wherein the support vector subset comprises a third plurality of observation vectors;
    (D) distribute (1) each of the P training data blocks to one of the plurality of worker machines; and (2) the support vector subset to each of the plurality of worker machines;
    (E) compute a first kernel matrix from the third plurality of observation vectors based on a kernel function;
    (F) receive a first set of sub-results from each of the plurality of worker machines;
    (G) combine the first set of sub-results to obtain an intermediary matrix, a vector value, a first scalar value, a second scalar value, and a weight residual value;
    (H) solve a linear system based on the first kernel matrix, the intermediary matrix, the vector value, the first scalar value, the second scalar value, and the weight residual value to compute values of a first set of variables;
    (I) distribute the values of the first set of variables and the first scalar value to each of the plurality of worker machines;
    (J) receive a second set of sub-results from each of the plurality of worker machines, wherein the second set of sub-results from each of the plurality of worker machines comprises a step size value that is computed based on a second set of variables computed at each of the plurality of worker machines;
    (K) select one step size value from all of the step size values received in the second set of sub-results;
    (L) send the selected step size value to each of the plurality of worker machines;
    (M) receive updated values of the first set of variables and updated values of the second set of variables computed by each of the plurality of worker machines based on the values of the first set of variables in (H), the values of the second set of variables in (J), and the selected step size value in (K);
    (N) receive a maximum residual error value computed by each of the plurality of worker machines based on the first kernel matrix, the updated values of the first set of variables, and the updated values of the second set of variables;
    (O) select a maximum value from all of the maximum residual error values received from the plurality of worker machines;
    (P) responsive to determining that the selected maximum value satisfies an optimality condition, execute (Q) or responsive to determining that the selected maximum value does not satisfy the optimality condition, distribute the updated values of the first set of variables and the updated values of the second set of variables to each of the plurality of worker machines and repeat (F)-(P);
    (Q) output a weight value and a bias value from the updated values of the first set of variables and the updated values of the second set of variables in (M); and
    (R) predict a label of each of a fourth plurality of observation vectors included in test data using the weight value and the bias value to classify the fourth plurality of observation vectors.

2. The non-transitory computer-readable medium of claim 1, wherein to determine the support vector subset from the training data, the first computer-readable instructions further cause the first processor to:
    divide the first plurality of observation vectors into a first group and a second group, wherein all observation vectors in the first group have a first label and all observation vectors in the second group have a second label;

create N clusters from the observation vectors in each of the first group and the second group, wherein N is a predefined value;
determine a first percentage of the first plurality of observation vectors having the first label and a second percentage of the first plurality of observation vectors having the second label;
compute a first number of observation vectors to be selected from the N clusters of the first group based on the first percentage and a predefined size of the support vector subset;
compute a second number of observation vectors to be selected from the N clusters of the second group based on the second percentage and the predefined size of the support vector subset; and
select the first number of observation vectors from the N clusters in the first group and the second number of observation vectors from the N clusters in the second group to form the third plurality of observation vectors in the support vector subset.

3. The non-transitory computer-readable medium of claim 2, wherein to select the first number of observation vectors and the second number of observation vectors, the first computer-readable instructions further cause the first processor to perform a stratified sampling in each of the N clusters in each of the first group and the second group.

4. The non-transitory computer-readable medium of claim 2, wherein to select the first number of observation vectors and the second number of observation vectors, the first computer-readable instructions further cause the first processor to:
determine a centroid of each of the N clusters of each of the first group and the second group;
select one or more nearest neighbors of the centroid of each of the N clusters of the first group until the first number of observation vectors are selected from the first group; and
select one or more nearest neighbors of the centroid of each of the N clusters of the second group until the second number of observation vectors are selected from the second group.

5. The non-transitory computer-readable medium of claim 1, wherein to determine the support vector subset from the training data, the first computer-readable instructions further cause the first processor to:
divide the first plurality of observation vectors into a first strata and a second strata, wherein all observation vectors in the first strata have a first characteristic and all observation vectors in the second strata have a second characteristic;
determine a first percentage of the first plurality of observation vectors having the first characteristic and a second percentage of the first plurality of observation vectors having the second characteristic;
compute a first number of observation vectors to be selected from the first strata based on the first percentage and a predefined size of the support vector subset;
compute a second number of observation vectors to be selected from the second strata based on the second percentage and the predefined size of the support vector subset; and
select the first number of observation vectors from the first strata and the second number of observation vectors from the second strata to form the third plurality of observation vectors in the support vector subset.

6. The non-transitory computer-readable medium of claim 1, wherein the kernel function is a radial basis function, and wherein the first computer-readable instructions further cause the first processor to compute the first kernel matrix using $$k(x, y) = \exp\left(\frac{-\|x-y\|^2}{2\rho^2}\right)$$

where k(x, y) is the kernel function for the first kernel matrix, x and y correspond to observation vectors from the support vector subset and $\rho>0$ denotes a kernel parameter.

7. The non-transitory computer-readable medium of claim 1, wherein to classify each of the fourth plurality of observation vectors in the test data, the first computer-readable instructions further cause the first processor to:
divide the test data into P test data blocks, wherein each of the P test data blocks comprises a fifth plurality of observation vectors;
distribute each of the P test data blocks to one of the plurality of worker machines;
distribute the weight value and the bias value from (Q) to each of the plurality of worker machines;
receive a label for each of the fifth plurality of observation vectors from each of the plurality of worker machines; and
combine the label for each of the fifth plurality of observation vectors from each of the plurality of worker machines to obtain the set of labels for the fourth plurality of observation vectors.

8. The non-transitory computer-readable medium of claim 7, comprising second computer-readable instructions that when executed by each second processor associated with each of the plurality of worker machines, cause each of the second processor to:
compute a kernel matrix block using the kernel function applied to the third plurality of observation vectors and the fifth plurality of observation vectors; and
compute the label for each of the fifth plurality of observation vectors using $$y_e = \text{sign}((K_{ez})\mu_z + \beta)$$

where $y_e$ is the label for each of the fifth plurality of observation vectors, $K_{ez}$ is the kernel matrix block, $\mu_z$ is the weight value from (Q), and $\beta$ is the bias value from (Q).

9. The non-transitory computer-readable medium of claim 1, wherein the kernel function is a radial basis function, and wherein to compute the intermediary matrix, the non-transitory computer-readable medium comprises second computer-readable instructions that when executed by each second processor associated with each of the plurality of worker machines, cause each of the second processor to:
compute a first kernel matrix block using $$k(x, y) = \exp\left(\frac{-\|x-y\|^2}{2\rho^2}\right)$$

where k(x, y) is the kernel function for the first kernel matrix block, $K_{rz}$, x corresponds to an observation vector from the second plurality of observation vectors and y corresponds to an observation vector from the support vector subset, and $\rho>0$ denotes a kernel parameter; and compute a second kernel matrix block using $$K_{rz}^T \Omega^{-1} K_{rz}$$

where $K_{rz}$ is the first kernel matrix block, $K_{rz}^T$ is a transpose of the first kernel matrix block $K_{rz}$, and $\Omega^{-1}$ is an inverse of matrix $\Omega$ computed using $$\Omega = \Gamma^{-1} \Theta + \Sigma^{-1} \Xi$$

where $\Sigma, \Xi, \Theta, \Gamma$ are diagonal matrices of corresponding named vectors.

10. The non-transitory computer-readable medium of claim 9, wherein the second computer-readable instructions further cause each second processor to compute the vector block using $$K_{rz}^T \Omega^{-1} y_r$$

where $y_r$ is a training label vector comprising training labels associated with the second plurality of observation vectors on a respective worker machine computing the vector block.

11. The non-transitory computer-readable medium of claim 10, wherein the second computer-readable instructions further cause each second processor to compute the first scalar block using $$y_r y_r^T \Omega^{-1} y_r$$

where $y_r^T$ is a transpose of the training label vector.

12. The non-transitory computer-readable medium of claim 11, wherein the second computer-readable instructions further cause each second processor to compute the second scalar block using $$y_r^T \Omega^{-1} r_\omega$$

where $y_r^T$ is a transpose of the training label vector and $r_\omega$ is the weight residual block.

13. The non-transitory computer-readable medium of claim 12, wherein the second computer-readable instructions further cause each second processor to compute the weight residual block using $$r_\omega = r_\theta + \Gamma^{-1} r_\eta - \Sigma^{-1} \Xi (r_\xi + \Xi^{-1} r_\sigma)$$

where $$r_\theta := K_{rz} \mu_z + \beta y_r - e + \xi - \theta$$

$$r_\gamma := \Gamma \Theta e$$

$$r_\xi := \tau e - \gamma - \sigma$$

$$r_\sigma := \Sigma \Xi e$$

$$\xi, \theta, \sigma, \gamma \geq 0$$

$r_{\mu_z}, r_\beta, r_\xi, r_\theta, r_\sigma,$ and $r_\gamma$ are residual values, and $e$ is a vector of all ones.

14. The non-transitory computer-readable medium of claim 13, wherein the linear system is defined using $$\phi \Delta \mu_z = -r_\phi$$

where $$\phi = K_{zz} + K_{rz}^T \Omega^{-1} K_{rz} - \frac{1}{1 + y_r^T \Omega^{-1} y_r} K_{rz}^T \Omega^{-1} y_r y_r^T \Omega^{-1} K_{rz}$$

$$r_\phi = r_{\mu_z} + K_{rz}^T \Omega^{-1} r_\omega + \frac{(r_\beta + y_r^T \Omega^{-1} r_\omega)}{1 + y_r^T \Omega^{-1} y_r} K_{rz}^T \Omega^{-1} y_r; \text{ and}$$

wherein the first set of variables comprises solving for $\Delta \mu_z$ from the optimization program, and computing $\Delta \beta$ using $$\Delta \beta = -\frac{1}{1 + y_r^T \Omega^{-1} y_r} (r_\beta + y_r^T \Omega^{-1} r_\omega + y_r^T \Omega^{-1} K_{rz} \Delta \mu_z)$$

where $$r_\beta := \beta - \gamma_r^T$$

$$r_{\mu_z} := K_{zz} \mu_z - K_{rz}^T \gamma.$$

15. The non-transitory computer-readable medium of claim 14, wherein the second computer-readable instructions further cause each second processor to compute the second set of variables using:

$$\Delta \gamma = -\Omega^{-1} (r_\omega + K_{rz} \Delta \mu_z + y_r \Delta \beta)$$

$$\Delta \xi = -\Sigma^{-1} \Xi (r_\xi + \Xi^{-1} r_\sigma - \Delta y)$$

$$\Delta \theta = -\Gamma^{-1} (y_\gamma + \Theta \Delta \gamma)$$

$$\Delta \sigma = -\Xi^{-1} (r_\sigma + \Sigma \Delta \xi).$$

16. The non-transitory computer-readable medium of claim 15, wherein the second computer-readable instructions further cause each second processor to compute:

a primal step size value using $$\alpha_p^{max} = \min \left\{ 1, -\kappa \min_{j: \Delta \xi_j < 0} \left\{ \frac{\xi_j}{\Delta \xi_j} \right\}, -\kappa \min_{j: \Delta \theta_j < 0} \left\{ \frac{\theta_j}{\Delta \theta_j} \right\} \right\}$$

a dual step size value using $$\alpha_d^{max} = \min \left\{ 1, -\kappa \min_{j: \Delta \sigma_j < 0} \left\{ \frac{\sigma_j}{\Delta \sigma_j} \right\}, -\kappa \min_{j: \Delta \gamma_j < 0} \left\{ \frac{\gamma_j}{\Delta \gamma_j} \right\} \right\}$$

where $j$ is an index.

17. The non-transitory computer-readable medium of claim 16, wherein:

the second computer-readable instructions further cause each second processor to compute:

the updated values of the first set of variables using $$\mu_z^+ = \mu_z + \alpha_p^{max} \Delta \mu_z$$

$$\beta^+ = \beta + \alpha_p^{max} \Delta \beta$$

the updated values of the second set of variables using $$\xi^+ = \xi + \alpha_p^{max} \Delta \xi$$

$$\theta^+ = \theta + \alpha_p^{max} \Delta \theta$$

$$\sigma^+ = \sigma + \alpha_d^{max} \Delta \sigma$$

$$y^+ = y + \alpha_d^{max} \Delta y.$$

18. A system comprising:
a first memory having first computer-readable instructions stored thereon; and
a first processor of a main machine of a non-linear support vector machine that executes the first computer-readable instructions to:

(A) receive training data comprising a first plurality of observation vectors, wherein a number of the first plurality of observation vectors is greater than 1000;
(B) divide the training data into P training data blocks, wherein P is a number of a plurality of worker machines operatively associated with the main machine to perform distributed computing, and wherein each of the P training blocks comprises a second plurality of observation vectors;
(C) determine a support vector subset from the training data, wherein the support vector subset comprises a third plurality of observation vectors;
(D) distribute (1) each of the P training data blocks to one of the plurality of worker machines; and (2) the support vector subset to each of the plurality of worker machines;
(E) compute a first kernel matrix from the third plurality of observation vectors based on a kernel function;
(F) receive a first set of sub-results from each of the plurality of worker machines;
(G) combine the first set of sub-results to obtain an intermediary matrix, a vector value, a first scalar value, a second scalar value, and a weight residual value;
(H) solve a linear system based on the first kernel matrix, the intermediary matrix, the vector value, the first scalar value, the second scalar value, and the weight residual value to compute values of a first set of variables;
(I) distribute the values of the first set of variables and the first scalar value to each of the plurality of worker machines;
(J) receive a second set of sub-results from each of the plurality of worker machines, wherein the second set of sub-results from each of the plurality of worker machines comprises a step size value that is computed based on a second set of variables computed at each of the plurality of worker machines;
(K) select one step size value from all of the step size values received in the second set of sub-results;
(L) send the selected step size value to each of the plurality of worker machines;
(M) receive updated values of the first set of variables and updated values of the second set of variables computed by each of the plurality of worker machines based on the values of the first set of variables in (H), the values of the second set of variables in (J), and the selected step size value in (K);
(N) receive a maximum residual error value computed by each of the plurality of worker machines based on the first kernel matrix, the updated values of the first set of variables, and the updated values of the second set of variables;
(O) select a maximum value from all of the maximum residual error values received from the plurality of worker machines;
(P) responsive to determining that the selected maximum value satisfies an optimality condition, execute (Q) or responsive to determining that the selected maximum value does not satisfy the optimality condition, distribute the updated values of the first set of variables and the updated values of the second set of variables to each of the plurality of worker machines and repeat (F)-(P);
(Q) output a weight value and a bias value from the updated values of the first set of variables and the updated values of the second set of variables in (M); and
(R) predict a label of each of a fourth plurality of observation vectors included in test data using the weight value and the bias value to classify the fourth plurality of observation vectors.

19. The system of claim 18, wherein to determine the support vector subset from the training data, the first computer-readable instructions further cause the first processor to:
divide the first plurality of observation vectors into a first group and a second group, wherein all observation vectors in the first group have a first label and all observation vectors in the second group have a second label;
create N clusters from the observation vectors in each of the first group and the second group, wherein N is a predefined value;
determine a first percentage of the first plurality of observation vectors having the first label and a second percentage of the first plurality of observation vectors having the second label;
compute a first number of observation vectors to be selected from the N clusters of the first group based on the first percentage and a predefined size of the support vector subset;
compute a second number of observation vectors to be selected from the N clusters of the second group based on the second percentage and the predefined size of the support vector subset; and
select the first number of observation vectors from the N clusters in the first group and the second number of observation vectors from the N clusters in the second group to form the third plurality of observation vectors in the support vector subset.

20. The system of claim 19, wherein to select the first number of observation vectors and the second number of observation vectors, the first computer-readable instructions further cause the first processor to perform a stratified sampling in each of the N clusters in each of the first group and the second group.

21. The system of claim 19, wherein to select the first number of observation vectors and the second number of observation vectors, the first computer-readable instructions further cause the first processor to:
determine a centroid of each of the N clusters of each of the first group and the second group;
select one or more nearest neighbors of the centroid of each of the N clusters of the first group until the first number of observation vectors are selected from the first group; and
select one or more nearest neighbors of the centroid of each of the N clusters of the second group until the second number of observation vectors are selected from the second group.

22. The system of claim 18, wherein to determine the support vector subset from the training data, the first computer-readable instructions further cause the first processor to:
divide the first plurality of observation vectors into a first strata and a second strata, wherein all observation vectors in the first strata have a first characteristic and all observation vectors in the second strata have a second characteristic;

determine a first percentage of the first plurality of observation vectors having the first characteristic and a second percentage of the first plurality of observation vectors having the second characteristic;

compute a first number of observation vectors to be selected from the first strata based on the first percentage and a predefined size of the support vector subset;

compute a second number of observation vectors to be selected from the second strata based on the second percentage and the predefined size of the support vector subset; and select the first number of observation vectors from the first strata and the second number of observation vectors from the second strata to form the third plurality of observation vectors in the support vector subset.

23. The system of claim 18, wherein the kernel function is a radial basis function, and wherein the first computer-readable instructions further cause the first processor to compute the first kernel matrix using $$k(x, y) = \exp\left(\frac{-\|x - y\|^2}{2\rho^2}\right)$$

where k(x, y) is the kernel function for the first kernel matrix, x and y correspond to observation vectors from the support vector subset and $\rho > 0$ denotes a kernel parameter.

24. The system of claim 18, wherein to classify each of the fourth plurality of observation vectors in the test data, the first computer-readable instructions further cause the first processor to:

divide the test data into P test data blocks, wherein each of the P test data blocks comprises a fifth plurality of observation vectors;

distribute each of the P test data blocks to one of the plurality of worker machines;

distribute the weight value and the bias value from (Q) to each of the plurality of worker machines;

receive a label for each of the fifth plurality of observation vectors from each of the plurality of worker machines; and combine the label for each of the fifth plurality of observation vectors from each of the plurality of worker machines to obtain the set of labels for the fourth plurality of observation vectors.

25. The system of claim 24, further comprising:

a second memory comprising second computer-readable instructions stored thereon; and a second processor associated with each of the plurality of worker machines that executes the second computer-readable instructions to:

compute a kernel matrix block using the kernel function applied to the third plurality of observation vectors and the fifth plurality of observation vectors; and compute the label for each of the fifth plurality of observation vectors using $$y_e = \text{sign}((K_{ez})\mu_z + \beta)$$

where $y_e$ is the label for each of the fifth plurality of observation vectors, $K_{ez}$ is the kernel matrix block, $\mu_z$ is the weight value from (Q), and $\beta$ is the bias value from (Q).

26. The system of claim 18, wherein the kernel function is a radial basis function, and wherein to compute the intermediary matrix, the system comprises:

a second memory comprising second computer-readable instructions stored thereon; and a second processor associated with each of the plurality of worker machines that executes the second computer-readable instructions to:

compute a first kernel matrix block using $$k(x, y) = \exp\left(\frac{-\|x - y\|^2}{2\rho^2}\right)$$

where k(x, y) is the kernel function for the first kernel matrix block, $K_{rz}$, x corresponds to an observation vector from the second plurality of observation vectors and y corresponds to an observation vector from the support vector subset, and $\rho > 0$ denotes a kernel parameter; and compute a second kernel matrix block using $$K_{rz}^T \Omega^{-1} K_{rz}$$

where $K_{rz}$ is the first kernel matrix block, $K_{rz}^T$ is a transpose of the first kernel matrix block $K_{rz}$, and $\Omega^{-1}$ is an inverse of matrix $\Omega$ computed using $$\Omega = \Gamma^{-1}\Theta + \Sigma^{-1}\Xi$$

where $\Sigma, \Xi, \Theta, \Gamma$ are diagonal matrices of corresponding named vectors.

27. The system of claim 26, wherein the second computer-readable instructions further cause each second processor to:

compute the vector block using $$K_{rz}^T \Omega^{-1} y_r$$

where $y_r$ is a training label vector comprising training labels associated with the second plurality of observation vectors on a respective worker machine computing the vector block;

compute the first scalar block using $$y_r y_r^T \Omega^{-1} y_r$$

where $y_r^T$ is a transpose of the training label vector;

compute the second scalar block using $$y_r^T \Omega^{-1} r_\omega$$

where $y_r^T$ is a transpose of the training label vector and $r_\omega$ is the weight residual block; and compute the weight residual block using $$r_\omega = r_\theta + \Gamma^{-1} r_\eta - \Sigma^{-1} \Xi (r_\xi + \Xi^{-1} r_\sigma)$$

where $$r_\theta := K_{rz}\mu_z + \beta y_r - e + \xi - \theta$$

$$r_\gamma := \Gamma \Theta e$$

$$r_\xi = \tau e - \gamma - \sigma$$

$$r_\sigma := \Sigma \Xi e$$

$$\xi, \theta, \sigma, \gamma \geq 0$$

$r_{\mu_z}, r_\beta, r_\xi, r_\theta, r_\sigma,$ and $r_\gamma$ are residual values, and e is a vector of all ones.

28. The system of claim 27, wherein the linear system is defined using $$\phi \Delta \mu_z = -r_\phi$$

where $$\phi = K_{zz} + K_{rz}^T \Omega^{-1} K_{rz} - \frac{1}{1+y_r^T \Omega^{-1} y_r} K_{rz}^T \Omega^{-1} y_r y_r^T \Omega^{-1} K_{rz}$$

$$r_\phi = r_{\mu_z} + K_{rz}^T \Omega^{-1} r_\omega + \frac{(r_\beta + y_r^T \Omega^{-1} r_\omega)}{1+y_r^T \Omega^{-1} y_r} K_{rz}^T \Omega^{-1} y_r; \text{ and}$$

wherein the first set of variables comprises solving for $\Delta\mu_z$ from the optimization program, and computing $\Delta\beta$ using $$\Delta\beta = -\frac{1}{1+y_r^T \Omega^{-1} y_r}(r_\beta + y_r^T \Omega^{-1} r_\omega + y_r^T \Omega^{-1} K_{rz} \Delta\mu_z)$$

where $r_\beta := \beta - \gamma_r^T$ $r_{\mu_z} = K_{zz}\mu_z - K_{rz}^T \gamma.$ 29. A method comprising:
(A) receiving, by a first processor of a main machine of a non-linear support vector machine executing first computer-readable instructions stored on a memory, training data comprising a first plurality of observation vectors, wherein a number of the first plurality of observation vectors is greater than 1000;
(B) dividing, by the first processor, the training data into P training data blocks, wherein P is a number of a plurality of worker machines operatively associated with the main machine to perform distributed computing, and wherein each of the P training blocks comprises a second plurality of observation vectors;
(C) determining, by the first processor, a support vector subset from the training data, wherein the support vector subset comprises a third plurality of observation vectors;
(D) distributing, by the first processor, (1) each of the P training data blocks to one of the plurality of worker machines; and (2) the support vector subset to each of the plurality of worker machines;
(E) computing, by the first processor, a first kernel matrix from the third plurality of observation vectors based on a kernel function;
(F) receiving, by the first processor, a first set of sub-results from each of the plurality of worker machines;
(G) combining, by the first processor, the first set of sub-results to obtain an intermediary matrix, a vector value, a first scalar value, a second scalar value, and a weight residual value;
(H) solving, by the first processor, a linear system based on the first kernel matrix, the intermediary matrix, the vector value, the first scalar value, the second scalar value, and the weight residual value to compute values of a first set of variables;
(I) distributing, by the first processor, the values of the first set of variables and the first scalar value to each of the plurality of worker machines;
(J) receiving, by the first processor, a second set of sub-results from each of the plurality of worker machines, wherein the second set of sub-results from each of the plurality of worker machines comprises a step size value that is computed based on a second set of variables computed at each of the plurality of worker machines;
(K) selecting, by the first processor, one step size value from all of the step size values received in the second set of sub-results;
(L) sending, by the first processor, the selected step size value to each of the plurality of worker machines;
(M) receiving, by the first processor, updated values of the first set of variables and updated values of the second set of variables computed by each of the plurality of worker machines based on the values of the first set of variables in (H), the values of the second set of variables in (J), and the selected step size value in (K);
(N) receiving, by the first processor, a maximum residual error value computed by each of the plurality of worker machines based on the first kernel matrix, the updated values of the first set of variables, and the updated values of the second set of variables;
(O) selecting, by the first processor, a maximum value from all of the maximum residual error values received from the plurality of worker machines;
(P) responsive to determining that the selected maximum value satisfies an optimality condition, executing, by the first processor, (Q) or responsive to determining that the selected maximum value does not satisfy the optimality condition, distributing, by the first processor, the updated values of the first set of variables and the updated values of the second set of variables to each of the plurality of worker machines and repeat (F)-(P);
(Q) outputting, by the first processor, a weight value and a bias value from the updated values of the first set of variables and the updated values of the second set of variables in (M); and
(R) predicting, by the first processor, a label of each of a fourth plurality of observation vectors included in test data using the weight value and the bias value to classify the fourth plurality of observation vectors.

30. The method of claim 29, wherein for determining the support vector subset from the training data, the method further comprises:
dividing, by the first processor, the first plurality of observation vectors into a first group and a second group, wherein all observation vectors in the first group have a first label and all observation vectors in the second group have a second label;
creating, by the first processor, N clusters from the observation vectors in each of the first group and the second group, wherein N is a predefined value;
determining, by the first processor, a first percentage of the first plurality of observation vectors having the first label and a second percentage of the first plurality of observation vectors having the second label;
computing, by the first processor, a first number of observation vectors to be selected from the N clusters of the first group based on the first percentage and a predefined size of the support vector subset;
computing, by the first processor, a second number of observation vectors to be selected from the N clusters of the second group based on the second percentage and the predefined size of the support vector subset; and
selecting, by the first processor, the first number of observation vectors from the N clusters in the first group and the second number of observation vectors from the N clusters in the second group to form the third plurality of observation vectors in the support vector subset.

* * * * *

UNITED STATES PATENT AND TRADEMARK OFFICE
CERTIFICATE OF CORRECTION

PATENT NO. : 12,353,501 B1  
APPLICATION NO. : 18/918265  
DATED : July 8, 2025  
INVENTOR(S) : Riadh Omheni et al.

Page 1 of 3

It is certified that error appears in the above-identified patent and that said Letters Patent is hereby corrected as shown below:

In the Claims

Claim 9, Column 73, Line 3:  
Delete the phrase "$K_{rz}{}^T \Omega^{-1} K_{rz}$" and replace with --$K_{rz}^T \Omega^{-1} K_{rz}$--.

Claim 9, Column 73, Line 4:  
Delete the phrase "$K_{rz}{}^T$" and replace with --$K_{rz}^T$--.

Claim 10, Column 73, Line 15:  
Delete the phrase "$K_{rz}{}^T \Omega^{-1} y_r$" and replace with --$K_{rz}^T \Omega^{-1} y_r$--.

Claim 11, Column 73, Line 25:  
Delete the phrase "$y_r y_r{}^T \Omega^{-1} y_r$" and replace with --$y_r y_r^T \Omega^{-1} y_r$--.

Claim 11, Column 73, Line 26:  
Delete the phrase "$y_r{}^T$" and replace with --$y_r^T$--.

Claim 12, Column 73, Line 32:  
Delete the phrase "$y_r{}^T \Omega^{-1} r_\omega$" and replace with --$y_r^T \Omega^{-1} r_\omega$--.

Claim 12, Column 73, Line 33:  
Delete the phrase "$y_r{}^T$" and replace with --$y_r^T$--.

Claim 13, Column 73, Line 40:  
Delete the phrase "$r_\omega = r_\theta + \Gamma^{-1} r_\eta - \Sigma^{-1} \Xi (r_\xi + \Xi^{-1} r_\sigma)$" and replace with --$r_\omega = r_\theta + \Gamma^{-1} r_\gamma - \Sigma^{-1} \Xi (r_\xi + \Xi^{-1} r_\sigma)$--.

Signed and Sealed this  
Fifth Day of August, 2025

Coke Morgan Stewart  
*Acting Director of the United States Patent and Trademark Office*

CERTIFICATE OF CORRECTION (continued)

Claim 14, Column 74, Line 6:

Delete the phrase "$\Delta\beta = -\frac{1}{1+y_r^T\Omega^{-1}y_r}(r_\beta + y_r^T\Omega^{-1}r_\omega + y_r^T\Omega^{-1}K_{rz}\Delta\mu_z)$," and replace with
--$\Delta\beta = -\frac{1}{1+y_r^T\Omega^{-1}y_r}(r_\beta + y_r^T\Omega^{-1}r_\omega + y_r^T\Omega^{-1}K_{rz}\Delta\mu_z)$--.

Claim 14, Column 74, Line 11:

Delete the phrase "$r_\beta := \beta - \gamma_r{}^T$," and replace with --$r_\beta := \beta - \gamma_r^T$--.

Claim 14, Column 74, Line 13:

Delete the phrase "$r_{\mu_z} := K_{zz}\mu_z - K_{rz}{}^T\gamma$." and replace with --$r_{\mu_z} := K_{zz}\mu_z - K_{rz}^T\gamma$--.

Claim 17, Column 74, Lines 50-52:

Delete the phrase "
$$\mu_z^+ = \mu_z + \alpha_p{}^{max}\Delta\mu_z$$
$$\beta^+ = \beta + \alpha_p{}^{max}\Delta\beta$$
" and replace with --
$$\mu_z^+ = \mu_z + \alpha_p^{max}\Delta\mu_z$$
$$\beta^+ = \beta + \alpha_p^{max}\Delta\beta$$
--.

Claim 17, Column 74, Lines 54-61:

Delete the phrase "
$$\xi^+ = \xi + \alpha_p{}^{max}\Delta\xi$$
$$\theta^+ = \theta + \alpha_p{}^{max}\Delta\theta$$
$$\sigma^+ = \sigma + \alpha_d{}^{max}\Delta\sigma$$
$$\gamma^+ = \gamma + \alpha_d{}^{max}\Delta\gamma.$$
" and replace with --
$$\xi^+ = \xi + \alpha_p^{max}\Delta\xi$$
$$\theta^+ = \theta + \alpha_p^{max}\Delta\theta$$
$$\sigma^+ = \sigma + \alpha_d^{max}\Delta\sigma$$
$$\gamma^+ = \gamma + \alpha_d^{max}\Delta\gamma.$$
--.

Claim 26, Column 78, Line 23:

Delete the phrase "$K_{rz}{}^T\Omega^{-1}K_{rz}$" and replace with --$K_{rz}^T\Omega^{-1}K_{rz}$--.

Claim 26, Column 78, Line 24:

Delete the phrase "$K_{rz}{}^T$" and replace with --$K_{rz}^T$--.

Claim 27, Column 78, Line 34:

Delete the phrase "$K_{rz}{}^T\Omega^{-1}y_r$" and replace with --$K_{rz}^T\Omega^{-1}y_r$--.

Claim 27, Column 78, Line 41:

Delete the phrase "$y_r y_r{}^T\Omega^{-1}y_r$" and replace with --$y_r y_r^T\Omega^{-1}y_r$--.

Claim 27, Column 78, Line 42:

Delete the phrase "$y_r{}^T$" and replace with --$y_r^T$--.

Claim 27, Column 78, Line 45:

Delete the phrase "$y_r{}^T\Omega^{-1}r_\omega$" and replace with --$y_r^T\Omega^{-1}r_\omega$--.

CERTIFICATE OF CORRECTION (continued)
U.S. Pat. No. 12,353,501 B1

Claim 27, Column 78, Line 46:
Delete the phrase "$y_r{}^T$" and replace with --$y_r^T$--.

Claim 27, Column 78, Line 50:
Delete the phrase "$r_\omega = r_\theta + \Gamma^{-1}r_\eta - \Sigma^{-1}\Xi(r_\xi + \Xi^{-1}r_\sigma)$" and replace with --$r_\omega = r_\theta + \Gamma^{-1}r_\gamma - \Sigma^{-1}\Xi(r_\xi + \Xi^{-1}r_\sigma)$--.

Claim 28, Column 79, Lines 20-22:
Delete the phrase "$$r_\beta := \beta - \gamma_r{}^T$$ $$r_{\mu_z} := K_{zz}\mu_z - K_{rz}{}^T\gamma.$$" and replace with --$$r_\beta := \beta - \gamma_r^T\gamma$$ $$r_{\mu_z} := K_{zz}\mu_z - K_{rz}^T\gamma.$$--.